US 12,184,839 B2

(12) United States Patent
Ma et al.

(10) Patent No.: US 12,184,839 B2
(45) Date of Patent: *Dec. 31, 2024

(54) INTRA PREDICTION METHOD AND DEVICE

(71) Applicant: HUAWEI TECHNOLOGIES CO., LTD., Guangdong (CN)

(72) Inventors: Xiang Ma, Moscow (RU); Jianle Chen, San Diego, CA (US); Yin Zhao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,528

(22) Filed: Aug. 28, 2023

(65) Prior Publication Data

US 2024/0107005 A1 Mar. 28, 2024

Related U.S. Application Data

(63) Continuation of application No. 17/222,820, filed on Apr. 5, 2021, now Pat. No. 11,743,451, which is a
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/186* (2014.11)

(58) Field of Classification Search
CPC ............... H04N 19/105; H04N 19/132; H04N 19/147; H04N 19/159; H04N 19/186;
(Continued)

(56) References Cited

U.S. PATENT DOCUMENTS 11,743,451 B2 * 8/2023 Ma .................. H04N 19/105
375/240.02
2012/0287995 A1 11/2012 Budagavi
(Continued)

FOREIGN PATENT DOCUMENTS

CN 103782596 A 5/2014
CN 103918269 A 7/2014
(Continued)

OTHER PUBLICATIONS

"Enhanced Cross-Component Linear Model for Chroma Intra-Prediction in Video Coding"—Kai Zhang, Jianle Chen, Li Zhang, Xiang Li, Marta Karczewicz; IEEE Transactions on Image Processing, vol. 27, No. 8, Aug. 2018 (Year: 2018).*
(Continued)

*Primary Examiner* — Mainul Hasan

(57) ABSTRACT

An intra prediction method by using cross component liner prediction mode (CCLM), includes: determining a luma block corresponding to a current chroma block; obtaining luma reference samples of the luma block based on determining L available chroma reference samples of the current chroma block, wherein the obtained luma reference samples of the luma block are down-sampled luma reference samples; calculating linear model coefficients based on the luma reference samples and chroma reference samples that correspond to the luma reference samples; and obtaining a prediction for the current chroma block based on the linear model coefficients and values of a down-sampled luma block of the luma block.

22 Claims, 23 Drawing Sheets

Related U.S. Application Data continuation of application No. PCT/CN2019/109733, filed on Sep. 30, 2019.

(60) Provisional application No. 62/742,356, filed on Oct. 6, 2018, provisional application No. 62/742,355, filed on Oct. 6, 2018, provisional application No. 62/742,275, filed on Oct. 6, 2018, provisional application No. 62/742,266, filed on Oct. 5, 2018.

(51) Int. Cl.
  *H04N 19/159* (2014.01)
  *H04N 19/176* (2014.01)
  *H04N 19/186* (2014.01)

(58) Field of Classification Search
  CPC ...... H04N 19/59; H04N 19/593; H04N 19/70; H04N 19/11
  See application file for complete search history.

(56) References Cited

U.S. PATENT DOCUMENTS

| | | | | |
|---|---|---|---|---|
| 2014/0233650 | A1* | 8/2014 | Zhang | H04N 19/159 375/240.12 |
| 2014/0355667 | A1 | 12/2014 | Lei et al. | |
| 2015/0365684 | A1* | 12/2015 | Chen | H04N 19/11 375/240.13 |
| 2016/0119631 | A1 | 4/2016 | Kawamura et al. | |
| 2016/0277762 | A1* | 9/2016 | Zhang | H04N 19/593 |
| 2017/0150176 | A1 | 5/2017 | Zhang et al. | |
| 2018/0063527 | A1 | 3/2018 | Chen et al. | |
| 2018/0077426 | A1* | 3/2018 | Zhang | H04N 19/157 |
| 2018/0176594 | A1* | 6/2018 | Zhang | H04N 19/59 |
| 2018/0220138 | A1* | 8/2018 | He | H04N 19/136 |
| 2020/0413062 | A1* | 12/2020 | Onno | H04N 19/186 |
| 2021/0352271 | A1* | 11/2021 | Choi | H04N 19/159 |

FOREIGN PATENT DOCUMENTS

| | | | | |
|---|---|---|---|---|
| CN | 105474639 | A | 4/2016 | |
| CN | 107409209 | A | 11/2017 | |
| WO | WO-2013006986 | A1 * | 1/2013 | ........... H04N 19/105 |
| WO | 2013067944 | A1 | 5/2013 | |
| WO | WO-2020053804 | A1 * | 3/2020 | ........... H04N 19/105 |

OTHER PUBLICATIONS

Xiang Ma et al, CE3-related: Improved multi-directional LM, JVET of ITU-T and ISO/IEC, JVET-K0336 version 2 (released on Jul. 13, 2018).

JVET-L0340 (version 2), Ma, Xiang et al., CE3: CCLM/MDLM using simplified coefficients derivation method (Test 5.6.1, 5.6.2 and 5.6.3), Joint Video Experts Team (JVET) of ITU-T SG 16 WP 3 and ISO/IEC JTC 1/SC 29/WG 11, Sep. 28, 2018, 9 pages.

JVET-L0342 (version 3), Ma, Xiang et al., CE3-related: Classification-based mean value for CCLM coefficients derivation, Joint Video Experts Team (JVET) of ITU-T SG 16 WP 3 and ISO/IEC JTC 1/SC 29/WG 11, Oct. 2, 2018, 8 pages.

JVET-E0027 (version 3), Han, Yu et al., Decoder-Side Direct Mode Prediction, Joint Video Exploration Team (JVET) of ITU-T SG 16 WP 3 and ISO/IEC JTC 1/SC 29/WG 11, Jan. 3, 2017, 7 pages.

Document: JVET-K0512r1, Adarsh K. Ramasubramonian, Cross-check of JVET-K0204: On cross-component linear model simplification, Joint Video Exploration Team (JVET) of ITU-T SG 16 WP 3 and ISO/IECJTC 1/SC 29/WG11, 11th Meeting: Ljubljana, SI, Jul. 10-18, 2018, total 4 pages. XP030199968.

Document: JCTVC-H0544, Xingyu Zhang et al, CE6.a: New modes (LML and LMA) for chroma intra prediction, Joint Collaborative Team on Video Coding (JCT-VC) of ITU-T SG16 WP3 and ISO/IEC JTC1/SC29/WG11, 8th Meeting: San Jos , CA, USA, Feb. 1-10, 2012, total 7 pages.

Document: JVET-G1001-v1, Jianle Chen et al, Algorithm Description of Joint Exploration Test Model 7 (JEM 7), Joint Video Exploration Team (JVET) of ITU-T SG 16 WP 3 and ISO/IEC JTC 1/SC 29/WG 11, 7th Meeting: Torino, IT, Jul. 13-21, 2017, total 50 pages.

Document: JVET-K0204-v3, Guillaume Laroche et al, Non-CE3: On cross-component linear model simplification, Joint Video Experts Team (JVET) of ITU-T SG 16 WP 3 and ISO/IEC JTC 1/SC 29/WG 11, 11th Meeting: Ljubljana, SI, Jul. 10-18, 2018, total 7 pages.

ITU-T H.223(Jul. 2001), Series H: Audiovisual and Multimedia Systems, Infrastructure of audiovisual services—Transmission multiplexing and synchronization, Multiplexing protocol for low bit rate multimedia communication, total 74 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

JVET-L0338, Xiang Ma et al., CE3: Multi-directional LM (MDLM) (Test 5.4.1 and 5.4.2), Joint Video Experts Team (JVET) of ITU-T SG 16 WP 3 and ISO/IEC JTC 1/SC 29/WG 11, Sep. 29, 2018, 4 pages.

JVET-L0340, Xiang Ma et al., CE3: CCLM/MDLM using simplified coefficients derivation method (Test 5.6.1, 5.6.2 and 5.6.3), Joint Video Experts Team (JVET) of ITU-T SG 16 WP 3 and ISO/IEC JTC 1/SC 29/WG 11, Sep. 29, 2018, 6 pages.

* cited by examiner

Guide:
 ✕ = Location of luma sample
 ○ = Location of chroma sample

INTRA PREDICTION METHOD AND DEVICE

CROSS-REFERENCE TO RELATED APPLICATIONS

This application is a continuation of U.S. patent application Ser. No. 17/222,820, filed on Apr. 5, 2021, which is a continuation of International Application No. PCT/CN2019/109733, filed on Sep. 30, 2019, which claims the benefit of priority to U.S. Provisional Patent Application No. 62/742,266, filed Oct. 5, 2018 and U.S. Provisional Patent Application No. 62/742,355, filed Oct. 6, 2018 and U.S. Provisional Patent Application No. 62/742,275, filed Oct. 6, 2018 and U.S. Provisional Patent Application No. 62/742,356, filed Oct. 6, 2018. All of the afore-mentioned patent applications are hereby incorporated by reference in their entireties.

TECHNICAL FIELD

The embodiments of the present disclosure generally relates to the field of video coding and more particularly to the field of intra-prediction with Cross-component linear model prediction (CCLM).

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable. High Efficiency Video Coding is the latest video compression issued by ISO/IEC Moving Picture Experts Group and ITU-T Video Coding Experts Group as ISO/IEC 23008-2 MPEG-H Part 2 or called ITU-T H.265, and offers about double the data compression ratio at the same level of video quality, or substantially improved video quality at the same bit rate.

SUMMARY

Examples of the present disclosure provide intra prediction apparatuses and methods for encoding and decoding an image which can improve the efficiency of cross-component linear model prediction (CCLM), thereby improving the coding efficiency of a video signal. The disclosure is elaborated in the examples and claims contained in this file.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

According to a first aspect, the disclosure relates to a method for performing intra prediction using a linear model, the method comprising: determining a luma block corresponding to a current chroma block; obtaining luma reference samples of the luma block based on determining L available chroma reference samples of the current chroma block, wherein the obtained luma reference samples of the luma block are down-sampled luma reference samples; calculating linear model coefficients based on the luma reference samples and chroma reference samples that correspond to the luma reference samples; and obtaining a prediction for the current chroma block based on the linear model coefficients and values of a down-sampled luma block of the luma block. The chroma reference samples of the current chroma block comprises neighboring reconstructed samples of the current chroma block. The L available chroma reference samples are determined from the neighboring reconstructed samples. Likewise, the neighboring samples of the luma block are also neighboring reconstructed samples of the luma block (i.e. neighboring reconstructed luma samples). In an example, the obtained luma reference samples of the luma block are obtained by down-sampling the neighboring reconstructed luma samples that are selected based on the available chroma reference samples.

In existing methods, the luma reference samples are used to determine the availability of reference samples for determining linear model coefficients. In some scenarios, however, an available luma reference sample does not have a corresponding chroma reference sample, which might lead to coding errors. The technologies presented herein address this problem by determining the availability of reference samples via examining the availability of the chroma reference samples. In some examples, a chroma reference sample is available if the chroma reference sample is not outside the current picture, slice or title, and the reference sample has been reconstructed. In some examples, a chroma reference sample is available if the chroma reference sample is not outside the current picture, slice or title, the reference sample has been reconstructed, the reference sample is not omitted based on an encoding decision, and so on. The available reference samples of the current chroma block may be available reconstructed neighboring samples of the chroma block. Luma reference samples corresponding to the available chroma reference samples are utilized to determine the linear model coefficients.

In a possible implementation form of the method according to the first aspect as such, wherein the determining L available chroma reference samples comprises: determining that L top neighboring chroma samples of the current chroma block are available, wherein $1<=L<=W2$ and W2 indicates a top reference sample range, and L and W2 are positive integer, and wherein the L top neighboring chroma samples are used as the available chroma reference samples.

In a possible implementation form of the method according to any preceding implementation of the first aspect or the first aspect as such, wherein W2 equals to either 2*W or W+H, wherein W represents a width of the current chroma block and H represents a height of the current chroma block.

In a possible implementation form of the method according to any preceding implementation of the first aspect or the first aspect as such, wherein the determining L available chroma reference samples comprises: determining that L left neighboring chroma samples of the current chroma block are available, wherein 1<=L<=H2 and H2 indicates a left reference sample range, and L and H2 are positive integer, and wherein the L left neighboring chroma samples are used as the available chroma reference samples.

In a possible implementation form of the method according to any preceding implementation of the first aspect or the first aspect as such, wherein H2 equals to either 2*H or W+H, wherein W represents a width of the current chroma block and H represents a height of the current chroma block.

In a possible implementation form of the method according to any preceding implementation of the first aspect or the first aspect as such, wherein the determining L available chroma reference samples comprises: determining that L1 top neighboring chroma samples and L2 left neighboring chroma samples of the current chroma block are available, wherein 1<=L1<=W2, 1<=L2<=H2, W2 indicates a top reference sample range, and H2 indicates a left reference sample range, and wherein L1, L2, W2 and H2 are positive integer and L1+L2=L, and wherein the L1 top neighboring chroma samples and the L2 left neighboring chroma samples are used as the available chroma reference samples.

In a possible implementation form of the method according to any preceding implementation of the first aspect or the first aspect as such, wherein the luma reference samples are obtained by down-sampling only the neighboring samples that are above the luma block and that are selected based on the L available chroma reference samples, or by down-sampling only the neighboring samples that are left to the luma block and that are selected based on the L available chroma reference samples. For example, if L is 4, the luma reference samples are obtained by down-sampling 24 neighboring samples that are above the luma block and that are selected based on the four available chroma reference samples, or by down-sampling 24 neighboring samples that are left to the luma block and that are selected based on the four available chroma reference samples, wherein a 6 tap filter is used for the down-sampling process.

In a possible implementation form of the method according to any preceding implementation of the first aspect or the first aspect as such, wherein the down-sampled luma block of the luma block is obtained by down-sampling a reconstructed luma block of the luma block that corresponds to the current chroma block.

In a possible implementation form of the method according to any preceding implementation of the first aspect or the first aspect as such, wherein only one row of neighboring reconstructed luma samples of the reconstructed version of the luma block are used to obtain the luma reference samples when the luma reference samples are obtained based on only neighboring samples above the luma block and when a top row of the current chroma block is overlapped with a top row of a current coding tree unit (CTU).

In a possible implementation form of the method according to any preceding implementation of the first aspect or the first aspect as such, wherein the calculating linear model coefficients based on the luma reference samples and the chroma reference samples that correspond to the luma reference samples, comprises: determining a maximum luma value and a minimum luma value based on the luma reference samples; obtaining a first chroma value based at least in part upon a position of a luma reference sample associated with the maximum luma value; obtaining a second chroma value based at least in part upon a position of a luma reference sample associated with the minimum luma value; calculating linear model coefficients based on the first chroma value, the second chroma value, the maximum luma value and the minimum luma value.

In a possible implementation form of the method according to any preceding implementation of the first aspect or the first aspect as such, wherein the obtaining a first chroma value based at least in part upon a position of a luma reference sample associated with the maximum luma value comprises obtaining a first chroma value based at least in part upon one or more positions of one or more luma reference samples associated with the maximum luma value; and wherein the obtaining a second chroma value based at least in part upon a position of a luma reference sample associated with the minimum luma value comprises obtaining a second chroma value based at least in part upon one or more positions of one or more luma reference samples associated with the minimum luma value.

In a possible implementation form of the method according to any preceding implementation of the first aspect or the first aspect as such, wherein the linear model coefficients α and β are calculated based on:

$$\alpha = \frac{y_B - y_A}{x_B - x_A},$$

$$\beta = y_A - \alpha x_A$$

wherein $x_B$ represents the maximum luma value, $y_B$ represents the first chroma value, $x_A$ represents the minimum luma value, and $y_A$ represents the second chroma value.

In a possible implementation form of the method according to any preceding implementation of the first aspect or the first aspect as such, wherein the prediction for the current chroma block is obtained based on:

$$\text{pred}_C(i,j) = \alpha \cdot \text{rec}_L'(i,j) + \beta,$$

wherein $\text{pred}_C(i,j)$ represents a predicted value of a chroma sample of the current chroma block, and $\text{rec}_L'(i,j)$ represents a sample value of a corresponding luma sample of the down-sampled luma block of a reconstructed luma block of the luma block.

In a possible implementation form of the method according to any preceding implementation of the first aspect or the first aspect as such, wherein only one column of neighboring reconstructed luma samples of the reconstructed luma block are used to obtain the luma reference samples when the luma reference samples are obtained based on only the neighboring samples left to the luma block and the current chroma block is at a left boundary of a current coding tree unit (CTU).

In a possible implementation form of the method according to any preceding implementation of the first aspect or the first aspect as such, wherein the linear model comprises a multi-directional linear model (MDLM).

According to a second aspect, the disclosure relates to a method for performing intra prediction using a linear model, the method comprising: determining a luma block corresponding to a current chroma block; obtaining luma reference samples of the luma block based on determining L available chroma reference samples of the current chroma block, wherein the obtained luma reference samples of the luma block are down-sampled luma reference samples that are obtained by down-sampling neighboring samples of the luma block (i.e. neighboring reconstructed luma samples) that correspond to the L available chroma reference samples; calculating linear model coefficients based on the luma reference samples and chroma reference samples that correspond to the luma reference samples; and obtaining a prediction for the current chroma block based on the linear model coefficients and values of a down-sampled luma block of the luma block. The chroma reference samples of the current chroma block comprises neighboring reconstructed samples of the current chroma block. The L available chroma reference samples are determined from the neighboring reconstructed samples. Likewise, the neighboring samples of the luma block are also neighboring reconstructed samples of the luma block (i.e. neighboring reconstructed luma samples). The obtained luma reference samples of the luma block are obtained by down-sampling the neighboring reconstructed luma samples that correspond to the available chroma reference samples.

For "the neighboring reconstructed luma samples that correspond to the available chroma reference samples", the correspondence between the neighboring reconstructed luma samples and the available chroma reference samples" is not limited to "one-to-one correspondence", it also can be understood that the correspondence between the neighboring reconstructed luma samples and the available chroma reference samples" may be "M-to-N correspondence". For example, if a 6 tap filter is used for the down-sampling, M=24, N=4.

According to a third aspect, the invention relates to a device for encoding video data, the device comprising: a video data memory; and a video encoder, wherein the video encoder is configured to: determine a luma block corresponding to a current chroma block; obtain luma reference samples of the luma block based on determining L available chroma reference samples of the current chroma block (or by determining L available chroma reference samples of the current chroma block), wherein the obtained luma reference samples of the luma block are down-sampled luma reference samples that are obtained by down-sampling neighboring samples of the luma block (i.e. neighboring reconstructed luma samples) that correspond to the L available chroma reference samples; calculate linear model coefficients for a linear model based on the luma reference samples and chroma reference samples that correspond to the luma reference samples; and obtain a prediction for the current chroma block based on the linear model coefficients and values of a down-sampled version of the luma block. For example, if L is 4, the obtained luma reference samples of the luma block are four down-sampled luma reference samples that are obtained by down-sampling 24 neighboring samples of the luma block (i.e. neighboring reconstructed luma samples) that correspond to four available chroma reference samples, wherein a 6 tap filter is used for the down-sampling process.

According to a fourth aspect, the invention relates to a device for decoding video data, comprising: a video data memory; and a video decoder, wherein the video decoder is configured to: determining a luma block corresponding to a current chroma block; obtaining luma reference samples of the luma block based on determining L available chroma reference samples of the current chroma block, wherein the obtained luma reference samples of the luma block are down-sampled luma reference samples; calculating linear model coefficients based on the luma reference samples and chroma reference samples that correspond to the luma reference samples; and obtaining a prediction for the current chroma block based on the linear model coefficients and values of a down-sampled luma block of the luma block.

In existing approaches, the luma reference samples are used to determine the availability of reference samples for determining linear model coefficients. In some scenarios, however, an available luma reference sample does not have a corresponding chroma reference sample, which might lead to coding errors. The technologies presented herein address this problem by determining the availability of reference samples via examining the availability of the chroma reference samples. In some examples, a chroma reference sample is available if the chroma reference sample is not outside the current picture, slice or title, and the reference sample has been reconstructed. In some examples, a chroma reference sample is available if the chroma reference sample is not outside the current picture, slice or title, the reference sample has been reconstructed, the reference sample is not omitted based on an encoding decision, and so on. The available chroma reference samples of the current chroma block may be available reconstructed neighboring samples of the chroma block (i.e. available reconstructed neighboring chroma samples). Luma reference samples corresponding to the available chroma reference samples are utilized to determine the linear model coefficients.

In a possible implementation form of the device according to the third or fourth aspect as such, wherein the determining L available chroma reference samples comprises: determining that L top neighboring chroma samples of the current chroma block are available, wherein $1<=L<=W2$ and W2 indicates a top reference sample range, and L and W2 are positive integer, and wherein the L top neighboring chroma samples are used as the available chroma reference samples.

In a possible implementation form of the device according to any preceding implementation of the third or fourth aspect or the third or fourth aspect as such, wherein W2 equals to either 2*W or W+H, wherein W represents a width of the current chroma block and H represents a height of the current chroma block.

In a possible implementation form of the device according to any preceding implementation of the third or fourth aspect or the third or fourth aspect as such, wherein the determining L available chroma reference samples comprises: determining that L left neighboring chroma samples of the current chroma block are available, wherein $1<=L<=H2$ and H2 indicates a left reference sample range, and L and H2 are positive integer, and wherein the L left neighboring chroma samples are used as the available chroma reference samples.

In a possible implementation form of the device according to any preceding implementation of the third or fourth aspect or the third or fourth aspect as such, wherein H2 equals to either 2*H or W+H, wherein W represents a width of the current chroma block and H represents a height of the current chroma block.

In a possible implementation form of the device according to any preceding implementation of the third or fourth aspect or the third or fourth aspect as such, wherein the determining L available chroma reference samples comprises: determining that L1 top neighboring chroma samples and L2 left neighboring chroma samples of the current chroma block are available, wherein $1<=L1<=W2$, $1<=L2<=H2$, W2 indicates a top reference sample range, and H2 indicates a left reference sample range, and wherein L1, L2, W2 and H2 are positive integer and $L1+L2=L$, and wherein the L1 top neighboring chroma samples and the L2 left neighboring chroma samples are used as the available chroma reference samples.

In a possible implementation form of the device according to any preceding implementation of the third or fourth aspect or the third or fourth aspect as such, wherein the luma reference samples are obtained by down-sampling only the neighboring samples that are above the luma block and that are selected based on the L available chroma reference samples, or by down-sampling only the neighboring samples that are left to the luma block and that are selected based on the L available chroma reference samples.

In a possible implementation form of the device according to any preceding implementation of the third or fourth aspect or the third or fourth aspect as such, wherein the down-sampled luma block of the luma block is obtained by down-sampling a reconstructed luma block of the luma block that corresponds to the current chroma block.

In a possible implementation form of the device according to any preceding implementation of the third or fourth aspect or the third or fourth aspect as such, wherein only one row of neighboring reconstructed luma samples of the reconstructed version of the luma block are used to obtain the luma reference samples when the luma reference samples are obtained based on only neighboring samples above the luma block and when a top row of the current chroma block is overlapped with a top row of a current coding tree unit (CTU).

In a possible implementation form of the method according to any preceding implementation of the third or fourth aspect or the third or fourth aspect as such, wherein the linear model coefficients $\alpha$ and $\beta$ are calculated based on:

$$\alpha = \frac{y_B - y_A}{x_B - x_A},$$
$$\beta = y_A - \alpha x_A$$

wherein $x_B$ represents the maximum luma value, $y_B$ represents the first chroma value, $x_A$ represents the minimum luma value, and $y_A$ represents the second chroma value.

In a possible implementation form of the method according to any preceding implementation of the third or fourth aspect or the third or fourth aspect as such, wherein the prediction for the current chroma block is obtained based on:

pred$_C$(i,j)=$\alpha$·rec$_L$'(i,j)+$\beta$, wherein pred$_C$(i,j) represents a predicted value of a chroma sample of the current chroma block, and rec'$_L$(i,j) represents a sample value of a corresponding luma sample of the down-sampled luma block of a reconstructed luma block of the luma block.

In a possible implementation form of the method according to any preceding implementation of the third or fourth aspect or the third or fourth aspect as such, wherein only one column of neighboring reconstructed luma samples of the reconstructed luma block are used to obtain the luma reference samples when the luma reference samples are obtained based on only the neighboring samples left to the luma block and the current chroma block is at a left boundary of a current coding tree unit (CTU).

In a possible implementation form of the device according to any preceding implementation of the third or fourth aspect or the third or fourth aspect as such, wherein the linear model comprises a multi-directional linear model (MDLM).

According to a fifth aspect the invention relates to a method for coding an intra chroma prediction mode in a bitstream for a video signal, the method comprising: performing intra prediction for a chroma block of the video signal based on an intra chroma prediction mode, wherein the intra chroma prediction mode is selected from a first set of modes, a second set of modes comprising at least one of a CCLM_L mode or a CCLM_T mode, or a third set of modes; and generating a bitstream for the video signal by including a syntax element indicating the intra chroma prediction mode, wherein a number of bits of the syntax element if the intra chroma prediction mode is selected from the first set of modes is smaller than the number of bits of the syntax element if the intra chroma prediction mode is selected from the second set of modes, and the number of bits of the syntax element if the intra chroma prediction mode is selected from the second set of modes is smaller than the number of bits of the syntax element if the intra chroma prediction mode is selected from the third set of modes.

The proposed method for encoding the intra chroma prediction mode allows the CCLM_L and CCLM_T to be represented using binary strings and be included in the bitstream of a video signal.

In a possible implementation form of the method according to the fifth aspect as such, wherein the first set of modes comprises at least one of a derived mode (DM) or a cross component linear model (CCLM) prediction mode, and wherein the third set of modes comprises at least one of a vertical mode, a horizontal mode, a DC mode or a Planar mode.

In a possible implementation form of the method according to any preceding implementation of the fifth aspect or the fifth aspect as such, wherein a syntax element for the DM mode is 0; a syntax element for the CCLM mode is 10; a syntax element for the CCLM_L mode is 1110; a syntax element for the CCLM_T mode is 1111; a syntax element for the Planar mode is 11000; a syntax element for the Vertical mode is 11001; a syntax element for the Horizontal mode is 11010; and a syntax element for the DC mode is 11011.

In a possible implementation form of the method according to any preceding implementation of the fifth aspect or the fifth aspect as such, wherein a syntax element for the DM mode is 00; a syntax element for the CCLM mode is 10; a syntax element for the CCLM_L mode is 110; a syntax element for the CCLM_T mode is 111; a syntax element for the Planar mode is 0100; a syntax element for the Vertical mode is 0101; a syntax element for the Horizontal mode is 0110; and a syntax element for the DC mode is 0111.

According to a sixth aspect the invention relates to a method for decoding an intra chroma prediction mode in a bitstream for a video signal, the method comprising: parsing a plurality of syntax elements from a bitstream of a video signal; determining an intra chroma prediction mode based on a syntax element from the plurality of syntax elements, wherein the intra chroma prediction mode is determined from one of a first set of modes, a second set of modes comprising at least one of a CCLM_L mode or a CCLM_T mode, or a third set of modes, and a number of bits of the syntax element if the intra chroma prediction mode is selected from the first set of modes is smaller than the number of bits of the syntax element if the intra chroma prediction mode is selected from the second set of modes, and the number of bits of the syntax element if the intra chroma prediction mode is selected from the second set of modes is smaller than the number of bits of the syntax element if the intra chroma prediction mode is selected from the third set of modes; and performing intra prediction for a current chroma block of the video signal based on the intra chroma prediction mode.

According to a seventh aspect the invention relates to a device for encoding video data, the device comprising: a video data memory; and a video encoder, wherein the video encoder is configured to: perform intra prediction for a chroma block of the video signal based on an intra chroma prediction mode, wherein the intra chroma prediction mode is selected from a first set of modes, a second set of modes comprising at least one of a CCLM_L mode or a CCLM_T mode, or a third set of modes; and generate a bitstream for the video signal by including a syntax element indicating the intra chroma prediction mode, wherein a number of bits of the syntax element if the intra chroma prediction mode is selected from the first set of modes is smaller than the number of bits of the syntax element if the intra chroma prediction mode is selected from the second set of modes, and the number of bits of the syntax element if the intra chroma prediction mode is selected from the second set of modes is smaller than the number of bits of the syntax element if the intra chroma prediction mode is selected from the third set of modes.

According to an eighth aspect the invention relates to a device for decoding video data, the device comprising: a video data memory; and a video decoder, wherein the video decoder is configured to: parse a plurality of syntax elements from a bitstream of a video signal; determine an intra chroma prediction mode based on a syntax element from the plurality of syntax elements, wherein the intra chroma prediction mode is determined from one of a first set of modes, a second set of modes comprising at least one of a CCLM_L mode or a CCLM_T mode, or a third set of modes, and a number of bits of the syntax element if the intra chroma prediction mode is selected from the first set of modes is smaller than the number of bits of the syntax element if the intra chroma prediction mode is selected from the second set of modes, and the number of bits of the syntax element if the intra chroma prediction mode is selected from the second set of modes is smaller than the number of bits of the syntax element if the intra chroma prediction mode is selected from the third set of modes; and perform intra prediction for a current chroma block of the video signal based on the intra chroma prediction mode.

The proposed device for encoding video data and the device for decoding video data allows the CCLM_L and CCLM_T to be represented using binary strings and be included in the bitstream of a video signal at the encoding device and be decoded at the decoding device. In a possible implementation form of the device according to the seventh and eighth aspect as such, wherein the first set of modes comprises at least one of a derived mode (DM) or a cross component linear model (CCLM) prediction mode, and wherein the third set of modes comprises at least one of a vertical mode, a horizontal mode, a DC mode or a Planar mode.

In a possible implementation form of the device according to any preceding implementation of the seventh and eighth aspect or the seventh and eighth aspect as such, wherein a syntax element for the DM mode is 0; a syntax element for the CCLM mode is 10; a syntax element for the CCLM_L mode is 1110; a syntax element for the CCLM_T mode is 1111; a syntax element for the Planar mode is 11000; a syntax element for the Vertical mode is 11001; a syntax element for the Horizontal mode is 11010; and a syntax element for the DC mode is 11011.

In a possible implementation form of the method according to any preceding implementation of the seventh and eighth aspect or the seventh and eighth aspect as such, wherein a syntax element for the DM mode is 00; a syntax element for the CCLM mode is 10; a syntax element for the CCLM_L mode is 110; a syntax element for the CCLM_T mode is 111; a syntax element for the Planar mode is 0100; a syntax element for the Vertical mode is 0101; a syntax element for the Horizontal mode is 0110; and a syntax element for the DC mode is 0111.

According to a ninth aspect the invention relates to a method for performing intra prediction using cross component linear model (CCLM) prediction mode, the method comprising: determining a luma block corresponding to a current chroma block; obtaining luma reference samples of the luma block by down-sampling neighboring samples of the luma block, wherein the luma reference samples include only luma reference samples obtained based on the neighboring samples above the luma block or only luma reference samples obtained based on the neighboring samples left to the luma block; determining a maximum luma value and a minimum luma value based on the luma reference samples; obtaining a first chroma value based at least in part upon one or more positions of one or more luma reference samples associated with the maximum luma value; obtaining a second chroma value based at least in part upon one or more positions of one or more luma reference samples associated with the minimum luma value; calculating linear model coefficients based on the first chroma value, the second chroma value, the maximum luma value and the minimum luma value; and generating a prediction for the current chroma block based on the linear model coefficients and values of a down-sampled version of the luma block.

In a possible implementation form of the method according to the ninth aspect as such, wherein a number of the luma reference samples is larger than or equal to a width of the current chroma block or is larger than or equal to a height of the current chroma block.

In a possible implementation form of the method according to any preceding implementation of the ninth aspect or the ninth aspect as such, wherein the luma reference samples used in determining the maximum luma value and the minimum luma value are available luma reference samples of the luma block.

In a possible implementation form of the method according to any preceding implementation of the ninth aspect or the ninth aspect as such, wherein the available luma reference samples of the luma block are determined based on available chroma reference samples of the current chroma block.

In a possible implementation form of the method according to any preceding implementation of the ninth aspect or the ninth aspect as such, wherein up to 2*W luma reference samples are used to derive the linear model coefficients when the luma reference samples are obtained based on only the neighboring samples above the luma block, and wherein W represents a width of the current chroma block.

In a possible implementation form of the method according to any preceding implementation of the ninth aspect or the ninth aspect as such, wherein up to 2*H luma reference samples are used to derive the linear model coefficients when the luma reference samples are obtained based on only the neighboring samples left to the luma block, and wherein H represents a height of the current chroma block.

In a possible implementation form of the method according to any preceding implementation of the ninth aspect or the ninth aspect as such, wherein up to N available luma reference samples are used to derive the linear model coefficients; N is a sum of W and H; W represents a width of the current chroma block; and H represents a height of the current chroma block.

In a possible implementation form of the method according to any preceding implementation of the ninth aspect or the ninth aspect as such, wherein the linear model coefficients $\alpha$ and $\beta$ are calculated based on:

$$\alpha = \frac{y_B - y_A}{x_B - x_A},$$

$$\beta = y_A - \alpha x_A$$

wherein $x_B$ represents the maximum luma value, $y_B$ represents the first chroma value, $x_A$ represents the minimum luma value, and $y_A$ represents the second chroma value.

In a possible implementation form of the method according to any preceding implementation of the ninth aspect or the ninth aspect as such, wherein the prediction for the current chroma block is obtained based on:

$$pred_C(i,j)=\alpha \cdot rec_L'(i,j)+\beta,$$

wherein $pred_C(i,j)$ represents a predicted value of a chroma sample of the current chroma block, and $rec'_L(i,j)$ represents a sample value of a corresponding luma sample of the down-sampled version of a reconstructed version of the luma block.

In a possible implementation form of the method according to any preceding implementation of the ninth aspect or the ninth aspect as such, wherein the down-sampled version of the luma block is obtained by down-sampling a reconstructed version of the luma block that corresponds to the current chroma block.

In a possible implementation form of the method according to any preceding implementation of the ninth aspect or the ninth aspect as such, wherein only one row of neighboring reconstructed luma samples of the reconstructed version of the luma block are used to obtain the luma reference samples when the luma reference samples are obtained based on only the neighboring samples above the luma block and when a top row of the current chroma block is overlapped with a top row of a current coding tree unit (CTU) or the current chroma block is at a top boundary of a current coding tree unit (CTU).

In a possible implementation form of the method according to any preceding implementation of the ninth aspect or the ninth aspect as such, wherein only one column of neighboring reconstructed luma samples of the reconstructed luma block are used to obtain the luma reference samples when the luma reference samples are obtained based on only the neighboring samples left to the luma block and the current chroma block is at a left boundary of a current coding tree unit (CTU).

In a possible implementation form of the method according to any preceding implementation of the ninth aspect or the ninth aspect as such, wherein the CCLM comprises a multi-directional linear model (MDLM).

According to a tenth aspect, the invention relates to an encoder configured to perform a method according to any preceding implementation of the ninth aspect or the ninth aspect as such.

According to an eleventh aspect the invention relates to an decoder configured to perform a method according to any preceding implementation of the ninth aspect or the ninth aspect as such.

According to an eleventh aspect, the invention relates to an intra prediction method by using cross component liner prediction mode (CCLM), comprising:
obtaining reference samples of a current luma block, wherein the reference samples only belong to a top template of the current luma block;
obtaining a max luma value and a min luma value based on the reference samples;
obtaining a first chroma value based on a sample position of the max luma value;
obtaining a second chroma value based on a sample position of the min luma value;
calculating linear model coefficients based on the first chroma value, the second chroma value, the max luma value and the min luma value; and
obtaining a predictor for a current chroma block based on the linear model coefficients,
wherein the current chroma block corresponds to the current luma block.

In a possible implementation form of the method according to the eleventh aspect as such, wherein the number of the reference samples is larger than or equal to a width of the current chroma block.

In a possible implementation form of the method according to any preceding implementation of the eleventh aspect or the eleventh aspect as such, wherein the reference samples are available.

In a possible implementation form of the method according to any preceding implementation of the eleventh aspect or the eleventh aspect as such, wherein the method further comprises:
checking the availability of the reference samples within a range, a length of the range is 2*W, or a length of the range is a sum of W and H, wherein W represents a width of the current chroma block, H represents a height of the current chroma block.

In a possible implementation form of the method according to any preceding implementation of the eleventh aspect or the eleventh aspect as such, wherein up to 2*W available reference samples are used to derive the linear model coefficients, wherein W represents a width of the current chroma block.

In a possible implementation form of the method according to any preceding implementation of the eleventh aspect or the eleventh aspect as such, wherein up to N available reference samples are used to derive the linear model coefficients, wherein N is a sum of W and H, wherein W represents a width of the current chroma block, H represents a height of the current chroma block.

In a possible implementation form of the method according to any preceding implementation of the eleventh aspect or the eleventh aspect as such, wherein the linear model coefficients $\alpha$ and $\beta$ are calculated based on:

$$\alpha = \frac{y_B - y_A}{x_B - x_A}$$

$$\beta = y_A - \alpha x_A$$

wherein $x_B$ represents the max luma value, $y_B$ represents the first chroma value, $x_A$ represents the min luma value, and $y_A$ represents the second chroma value.

In a possible implementation form of the method according to any preceding implementation of the eleventh aspect or the eleventh aspect as such, wherein the predictor for the current chroma block is obtained based on:

$$pred_C(i,j)=\alpha \cdot rec_L'(i,j)+\beta$$

Where $pred_C(i,j)$ represents a chroma sample, and $rec_L(i,j)$ represents a corresponding reconstructed luma sample.

In a possible implementation form of the method according to any preceding implementation of the eleventh aspect or the eleventh aspect as such, wherein the number of the reference samples is equal to or larger than a size of the current chroma block.

In a possible implementation form of the method according to any preceding implementation of the eleventh aspect or the eleventh aspect as such, wherein the reference samples are down-sampled luma samples.

In a possible implementation form of the method according to any preceding implementation of the eleventh aspect or the eleventh aspect as such, wherein only one row of neighboring reconstructed luma samples are used to obtain the reference samples when the current chroma block is at a top boundary.

In a possible implementation form of the method according to any preceding implementation of the eleventh aspect or the eleventh aspect as such, wherein the CCLM is a multi-directional linear model (MDLM), and the linear model coefficients are used to obtain the MDLM.

In a possible implementation form of the method according to any preceding implementation of the eleventh aspect or the eleventh aspect as such, wherein the method is called as CCIP_T.

According to a twelfth aspect, the invention relates to an intra prediction method by using cross component liner prediction mode (CCLM), comprising:
 obtaining reference samples of a current luma block, wherein the reference samples only belong to a left template of the current luma block;
 obtaining a max luma value and a min luma value based on the reference samples;
 obtaining a first chroma value based on a sample position of the max luma value;
 obtaining a second chroma value based on a sample position of the min luma value;
 calculating linear model coefficients based on the first chroma value, the second chroma value, the max luma value and the min luma value; and
 obtaining a predictor for a current chroma block based on the linear model coefficients, wherein the current chroma block corresponds to the current luma block.

In a possible implementation form of the method according to the twelfth aspect as such, wherein the number of the reference samples is larger than or equal to a height of the current chroma block.

In a possible implementation form of the method according to any preceding implementation of the twelfth aspect or the twelfth aspect as such, wherein the reference samples are available.

In a possible implementation form of the method according to any preceding implementation of the twelfth aspect or the twelfth aspect as such, wherein the method further comprises:
 checking the availability of the reference samples within a range, a length of the range is 2*H, or a length of the range is a sum of W and H, wherein W represents a width of the current chroma block, H represents a height of the current chroma block.

In a possible implementation form of the method according to any preceding implementation of the twelfth aspect or the twelfth aspect as such, wherein up to 2*H available reference samples are used to derive the linear model coefficients, where H represents a height of the current chroma block.

In a possible implementation form of the method according to any preceding implementation of the twelfth aspect or the twelfth aspect as such, wherein up to N available reference samples are used to derive the linear model coefficients, wherein N is a sum of W and H, wherein W represents a width of the current chroma block, H represents a height of the current chroma block.

In a possible implementation form of the method according to any preceding implementation of the twelfth aspect or the twelfth aspect as such, wherein the linear model coefficients $\alpha$ and $\beta$ are calculated based on:

$$\alpha = \frac{y_B - y_A}{x_B - x_A}$$

$$\beta = y_A - \alpha x_A$$

wherein $x_B$ represents the max luma value, $y_B$ represents the first chroma value, $x_A$ represents the min luma value, and $y_A$ represents the second chroma value.

In a possible implementation form of the method according to any preceding implementation of the twelfth aspect or the twelfth aspect as such, wherein the predictor for the current chroma block is obtained based on:

$$\text{pred}_C(i,j) = \alpha \cdot \text{rec}_L'(i,j) + \beta$$

Where $\text{pred}_C(i,j)$ represents a chroma sample, and $\text{rec}_L(i,j)$ represents a corresponding reconstructed luma sample.

In a possible implementation form of the method according to any preceding implementation of the twelfth aspect or the twelfth aspect as such, wherein the number of the reference samples is equal to or larger than a size of the current chroma block.

In a possible implementation form of the method according to any preceding implementation of the twelfth aspect or the twelfth aspect as such, wherein the reference samples are down-sampled luma samples.

In a possible implementation form of the method according to any preceding implementation of the twelfth aspect or the twelfth aspect as such, wherein only one column of neighboring reconstructed luma samples are used to obtain the reference samples when a current block of the current chroma block is at a left boundary.

In a possible implementation form of the method according to any preceding implementation of the twelfth aspect or the twelfth aspect as such, wherein the CCLM is a multi-directional linear model (MDLM), and the linear model coefficients are used to obtain the MDLM.

In a possible implementation form of the method according to any preceding implementation of the twelfth aspect or the twelfth aspect as such, wherein the method is called as CCIP_L.

According to an thirteenth aspect, the invention relates to an intra prediction method by using cross component liner prediction mode (CCLM), comprising:
 obtaining reference samples of a current luma block, wherein the reference samples only belong to a top template of the current luma block, or only belong to a left template of the current luma block;
 obtaining chroma samples of a current chroma block, wherein the current chroma block corresponds to the current luma block;
 calculating linear model coefficients based on the reference samples and the chroma samples; and
 obtaining a predictor for the current chroma block based on the linear model coefficients.

In a possible implementation form of the method according to the thirteenth aspect as such, wherein up to N reference samples are used to derive the linear model coefficients, wherein N is a sum of W and H, wherein W represents a width of the current chroma block, H represents a height of the current chroma block.

In a possible implementation form of the method according to any preceding implementation of the thirteenth aspect or the thirteenth aspect as such, wherein when the reference samples only belong to the top template of the current luma block, the number of the reference samples is larger than or equal to a width of the current chroma block.

In a possible implementation form of the method according to any preceding implementation of the thirteenth aspect or the thirteenth aspect as such, wherein when the reference samples only belong to the top template of the current luma block, up to 2*W reference samples are used to derive the linear model coefficients, wherein W represents a width of the current chroma block.

In a possible implementation form of the method according to any preceding implementation of the thirteenth aspect or the thirteenth aspect as such, wherein when the reference samples only belong to the left template of the current luma block, the number of the reference samples is larger than or equal to a height of the current luma block.

In a possible implementation form of the method according to any preceding implementation of the thirteenth aspect or the thirteenth aspect as such, wherein when the reference samples only belong to the left template of the current luma block, up to 2*H reference samples are used to derive the linear model coefficients, wherein W represents a height of the current chroma block.

In a possible implementation form of the method according to any preceding implementation of the thirteenth aspect or the thirteenth aspect as such, wherein the number of the reference samples is equal to or larger than a size of the current chroma block.

In a possible implementation form of the method according to any preceding implementation of the thirteenth aspect or the thirteenth aspect as such, wherein the reference samples are down-sampled luma samples.

In a possible implementation form of the method according to any preceding implementation of the thirteenth aspect or the thirteenth aspect as such, wherein only one row of neighboring reconstructed luma samples are used to obtain the reference samples when the reference samples only belong to a top template of the current luma block, and a current block of the current chroma block is at a top boundary.

In a possible implementation form of the method according to any preceding implementation of the thirteenth aspect or the thirteenth aspect as such, wherein only one column of neighboring reconstructed luma samples are used to obtain the reference samples when the reference samples only belong to a left template of the current luma block, and a current block of the current chroma block is at a left boundary.

In a possible implementation form of the method according to any preceding implementation of the thirteenth aspect or the thirteenth aspect as such, wherein the CCLM is a multi-directional linear model (MDLM), and the linear model coefficients are used to obtain the MDLM.

In a possible implementation form of the method according to any preceding implementation of the thirteenth aspect or the thirteenth aspect as such, wherein the reference samples are available.

According to an fourteenth aspect, the invention relates to a decoder comprising processing circuitry for carrying out the method according to any one of preceding implementation of the eleventh aspect or the eleventh aspect as such.

According to an fifteenth aspect, the invention relates to a decoder comprising processing circuitry for carrying out the method according to any one of preceding implementation of the twelfth aspect or the twelfth aspect as such.

According to an sixteenth aspect, the invention relates to a decoder comprising processing circuitry for carrying out the method according to any one of preceding implementation of the thirteenth aspect or the thirteenth aspect as such.

According to a seventeenth aspect, the invention relates to an intra prediction method by using cross component liner prediction mode (CCLM), comprising:
  obtaining reference samples of a current luma block, wherein the reference samples only belong to a top template of the current luma block;
  obtaining a max luma value and a min luma value based on the reference samples;
  obtaining a first chroma value and a second chroma value based on the max luma value and the min luma value;
  calculating linear model coefficients based on the first chroma value, the second chroma value, the max luma value and the min luma value;
  obtaining a predictor for the current block based on the linear model coefficients.

In a possible implementation form of the method according to the seventeenth aspect as such, wherein the number of the reference samples is larger than or equal to a width of a current chroma block.

In a possible implementation form of the method according to any preceding implementation of the seventeenth aspect or the seventeenth aspect as such, wherein the reference samples are available.

In a possible implementation form of the method according to any preceding implementation of the seventeenth aspect or the seventeenth aspect as such, wherein up to 2*W reference samples are used to derive the model coefficients.

In a possible implementation form of the method according to any preceding implementation of the seventeenth aspect or the seventeenth aspect as such, wherein the method is called as CCIP_T.

According to an eighteenth aspect, the invention relates to an intra prediction method by using cross component liner prediction mode (CCLM), comprising:
  obtaining reference samples of a current luma block, wherein the reference samples only belong to a left template of the current luma block;
  obtaining a max luma value and a min luma value based on the reference samples;
  obtaining a first chroma value and a second chroma value based on the max luma value and the min luma value;
  calculating linear model coefficients based on the first chroma value, the second chroma value, the max luma value and the min luma value;
  obtaining a predictor for the current block based on the linear model coefficients.

In a possible implementation form of the method according to the eighteenth aspect as such, wherein the number of the reference samples is larger than or equal to a height of a current chroma block.

In a possible implementation form of the method according to any preceding implementation of the eighteenth aspect or the eighteenth aspect as such, wherein the reference samples are available.

In a possible implementation form of the method according to any preceding implementation of the eighteenth aspect or the eighteenth aspect as such, wherein up to 2*H reference samples are used to derive the model coefficients.

In a possible implementation form of the method according to any preceding implementation of the eighteenth aspect or the eighteenth aspect as such, wherein the method is called as CCIP_L.

According to a nineteenth aspect, the invention relates to a decoder to perform the method according to any preceding implementation of the seventeenth aspect or the seventeenth aspect as such.

According to a twentieth aspect, the invention relates to a decoder to perform the method according to any preceding implementation of the eighteenth aspect or the eighteenth aspect as such.

According to a twenty-first aspect, the invention relates to a method for intra prediction using linear model, comprising: obtaining reference samples of a current luma block; obtaining a max luma value and a min luma value based on the reference samples; obtaining a first chroma value and a second chroma value based on the position of a luma sample with the max luma value and the position of a luma sample with the min luma value; calculating linear model coefficients based on the first chroma value, the second chroma value, the max luma value and the min luma value; obtaining a predictor for a current block based on the linear model coefficients; wherein the obtaining reference samples of a current luma block, comprises: determining L available chroma template samples of a current chroma block, wherein the reference samples of the current luma block are L luma template samples which correspond to the L available chroma template samples, or determining L available neighboring chroma samples of a current chroma block, wherein the reference samples of the current luma block are L neighboring luma samples which correspond to the L available neighboring chroma samples, L>=1 and is positive integer.

In a possible implementation form of the method according to the twenty-first aspect as such, wherein the step of determining L available chroma template samples of a current chroma block, comprising:
  checking the availability of top neighboring chroma samples of the current chroma block;
  if L top neighboring chroma samples are available, the reference samples of the current luma block are L neighboring luma samples which correspond to the L top neighboring chroma samples, wherein L>=1 and L<=W2, wherein W2 indicates a top template sample range, and L and W2 are positive integer.

In a possible implementation form of the method according to any preceding implementation of the twenty-first aspect or the twenty-first aspect as such, wherein the step of determining L available chroma template samples of a current chroma block, comprising:
  checking the availability of left neighboring chroma samples of the current chroma block;
  if L left neighboring chroma samples are available, the reference samples of the current luma block are L neighboring luma samples which correspond to the L left neighboring chroma samples, wherein L>=1 and L<=H2, wherein H2 indicates a left template sample range, and L and H2 are positive integer.

In a possible implementation form of the method according to any preceding implementation of the twenty-first aspect or the twenty-first aspect as such, wherein the step of determining L available chroma template samples of a current chroma block, comprising:
  checking the availability of top neighboring chroma samples of the current chroma block, and the availability of left neighboring chroma samples of the current chroma block;
  if L1 top neighboring chroma samples are available and L2 left neighboring chroma samples are available, the reference samples of the current luma block include or are L1 neighboring luma samples which correspond to the L1 top neighboring chroma samples and L2 neighboring luma samples which correspond to the L2 left neighboring chroma samples, wherein L2>=1 and L2<=H2, wherein H2 indicates a left template sample range, and L and H2 are positive integer; wherein L1>=1 and L1<=W2, wherein W2 indicates a top template sample range, and L1 and W2 are positive integer, and L=L1+L2.

In a possible implementation form of the method according to any preceding implementation of the twenty-first aspect or the twenty-first aspect as such, wherein if L neighboring chroma samples are available in the template range, then L template luma samples and L template chroma samples are used to obtain the model coefficients.

In a possible implementation form of the method according to any preceding implementation of the twenty-first aspect or the twenty-first aspect as such, wherein the reference samples are available.

In a possible implementation form of the method according to any preceding implementation of the twenty-first aspect or the twenty-first aspect as such, wherein the linear model coefficients α and β are calculated based on:

$$\alpha = \frac{y_B - y_A}{x_B - x_A}$$

$$\beta = y_A - \alpha x_A$$

wherein $x_B$ represents the max luma value, $y_B$ represents the first chroma value, $x_A$ represents the min luma value, and $y_A$ represents the second chroma value.

In a possible implementation form of the method according to any preceding implementation of the twenty-first aspect or the twenty-first aspect as such, wherein the predictor for the current chroma block is obtained based on:

$$\text{pred}_C(i,j) = \alpha \cdot \text{rec}_L'(i,j) + \beta$$

Where $\text{pred}_C(i,j)$ represents a chroma sample, and $\text{rec}_L(i,j)$ represents a corresponding reconstructed luma sample.

In a possible implementation form of the method according to any preceding implementation of the twenty-first aspect or the twenty-first aspect as such, wherein the number of the reference samples is equal to or larger than a size of the current luma block.

In a possible implementation form of the method according to any preceding implementation of the twenty-first aspect or the twenty-first aspect as such, wherein the reference samples are down-sampled luma samples.

In a possible implementation form of the method according to any preceding implementation of the twenty-first aspect or the twenty-first aspect as such, wherein only one row of neighboring reconstructed luma samples are used to obtain the reference samples when a current block of the current chroma block is at a top boundary.

In a possible implementation form of the method according to any preceding implementation of the twenty-first aspect or the twenty-first aspect as such, wherein the linear model is a multi-directional linear model (MDLM), and the linear model coefficients are used to obtain the MDLM.

In a possible implementation form of the method according to any preceding implementation of the twenty-first aspect or the twenty-first aspect as such, wherein the method is called as CCIP_T or the method is called as CCIP_L.

In a possible implementation form of the method according to any preceding implementation of the twenty-first aspect or the twenty-first aspect as such, wherein the reference samples only belong to a top template of the current luma block, or only belong to a left template of the current luma block, or wherein the reference samples belong to a top template of the current luma block and a left template of the current luma block.

According to a twenty-second aspect, the invention relates to a decoder comprising processing circuitry for carrying out the method according to preceding implementation of the twenty-first aspect or the twenty-first aspect as such.

According to a twenty-third aspect, the invention relates to a encoder comprising processing circuitry for carrying out the method according to preceding implementation of the twenty-first aspect or the twenty-first aspect as such.

According to a twenty-fourth aspect, the invention relates to an binarization method for chroma mode, comprising:
performing intra prediction using linear model (such as multi-directional linear model, MDLM); and
generating a bitstream including a plurality of syntax elements, wherein the plurality of syntax elements indicate or include CCLM mode, CCIP_L mode or CCIP_T mode.

In a possible implementation form of the method according to the twenty-fourth aspect as such, wherein
a first indicator (77) indicate CCLM mode, intra_chroma_pred_mode index is 4
a second indicator (78) indicate CCIP_L mode, intra_chroma_pred_mode index is 5
a third indicator (79) indicate CCIP_T mode, intra_chroma_pred_mode index is 6.

In a possible implementation form of the method according to any preceding implementation of the twenty-fourth aspect or the twenty-fourth aspect as such, wherein IntraPredModeC[xCb][yCb] depends on intra_chroma_pred_mode[xCb][yCb] and IntraPredModeY[xCb][yCb] when sps_cclm_enabled_flag is equal to 1.

According to a twenty-fifth aspect, the invention relates to a method of decoding implemented by a decoding device, comprising:
parsing from a bitstream a plurality of syntax elements, wherein the plurality of syntax elements indicate or include CCLM mode, CCIP_L mode or CCIP_T mode; and
performing intra prediction using the indicated linear model.

In a possible implementation form of the method according to the twenty-fifth aspect as such, wherein
a first indicator (77) indicate CCLM mode, intra_chroma_pred_mode index is 4
a second indicator (78) indicate CCIP_L mode, intra_chroma_pred_mode index is 5
a third indicator (79) indicate CCIP_T mode, intra_chroma_pred_mode index is 6.

In a possible implementation form of the method according to any preceding implementation of the twenty-fifth aspect or the twenty-fifth aspect as such, wherein IntraPredModeC[xCb][yCb] depends on intra_chroma_pred_mode[xCb][yCb] and IntraPredModeY[xCb][yCb] when sps_cclm_enabled_flag is equal to 1.

According to a twenty-sixth aspect, the invention relates to a decoder comprising processing circuitry for carrying out the method according to any preceding implementation of the twenty-fourth and twenty-fifth aspect or the twenty-fourth and twenty-fifth aspect as such.

According to a twenty-seventh aspect, the invention relates to an encoder comprising processing circuitry for carrying out the method according to any preceding implementation of the twenty-fourth and twenty-fifth aspect or the twenty-fourth and twenty-fifth aspect as such.

According to a twenty-eighth aspect, the invention relates to computer readable medium storing instructions which when executed on a processor cause the processor to perform the method according to any preceding implementation of the twenty-fourth and twenty-fifth aspect or the twenty-fourth and twenty-fifth aspect as such.

According to a twenty-eighth aspect, the invention relates to a decoder, comprises:
one or more processors; and
a non-transitory computer-readable storage medium coupled to the processors and storing programming for execution by the processors, wherein the programming, when executed by the processors, configures the decoder to carry out the method according to according to any preceding implementation of the twenty-fourth and twenty-fifth aspect or the twenty-fourth and twenty-fifth aspect as such.

According to a twenty-eighth aspect, the invention relates to an encoder, comprising:
one or more processors; and
a non-transitory computer-readable storage medium coupled to the processors and storing programming for execution by the processors, wherein the programming, when executed by the processors, configures the encoder to carry out the method according to according to any preceding implementation of the twenty-fourth and twenty-fifth aspect or the twenty-fourth and twenty-fifth aspect as such.

According to a twenty-ninth aspect, the invention relates to an intra prediction method by using cross component liner prediction mode (CCLM), comprising:
obtaining reference samples of a current luma block,
obtaining a max luma value and a min luma value based on the reference samples;
obtaining a first chroma value and a second chroma value based on the max luma value and the min luma value;
calculating linear model coefficients based on the first chroma value, the second chroma value, the max luma value and the min luma value;
obtaining a predictor for the current block based on the linear model coefficients;
wherein, the availability of template samples is checking the neighboring chroma samples.

According to a thirtieth aspect, the invention relates to decoder to perform the method according to the twenty-eighth aspect as such.

According to a thirty-first aspect, the invention relates to decoder to perform the method according to the twenty-ninth aspect as such.

According to a thirty-second aspect, the invention relates to decoder to perform the method according to the twenty-eighth aspect or the twenty-ninth aspect.

According to a thirty-third aspect, an apparatus is provided, which comprises modules/units/components/circuits to perform at least a part of the steps of the above method according to any preceding implementation of the any preceding aspect or the any preceding aspect as such.

The apparatus according to the thirty-third aspect can be extended into implementation forms corresponding to the implementation forms of a method according to the any preceding aspect. Hence, an implementation form of the apparatus comprises the feature(s) of the corresponding implementation form of the method according to the any preceding aspect.

The advantages of the apparatuses according to the any preceding aspect aspect are the same as those for the corresponding implementation forms of the method according to the any preceding aspect.

For the purpose of clarity, any one of the foregoing examples may be combined with any one or more of the other foregoing examples to create a new example within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more examples are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
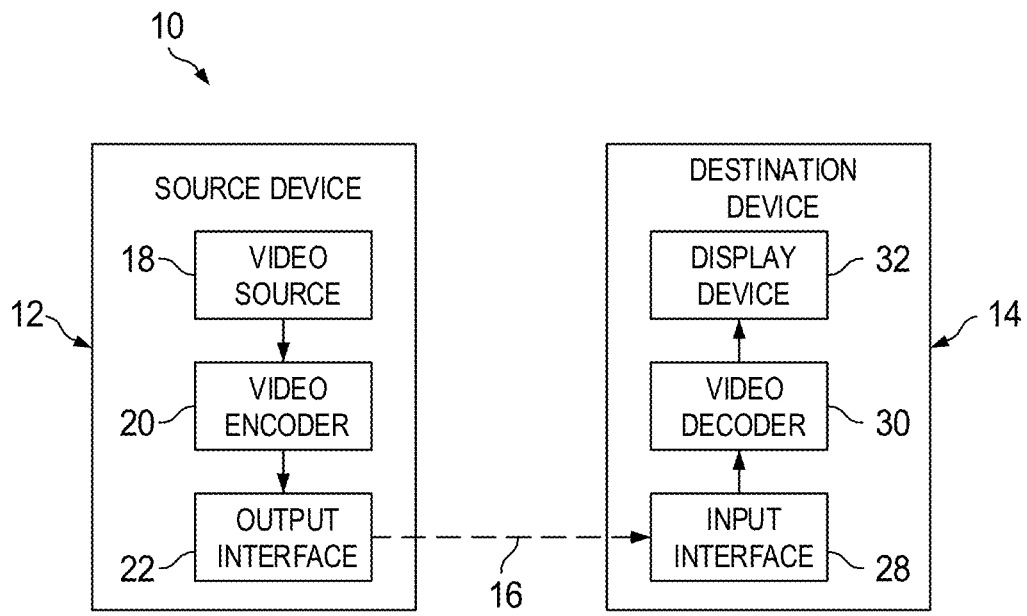
FIG. 1A is a block diagram illustrating an example coding system that may implement examples of the invention.

FIG. 1A is a block diagram illustrating an example coding system 10 that may utilize bidirectional prediction techniques. As shown in FIG. 1A, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1A, source device 12 includes video source 18, video encoder 20, and output interface 22. Destination device 14 includes input interface 28, video decoder 300, and display device 32. In accordance with this disclosure, video encoder 200 of source device 12 and/or the video decoder 300 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1A is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 200 and video decoder 300 may operate according to a video coding standard, such as the High Efficiency Video Coding (HEVC) standard presently under development, and may conform to the HEVC Test Model (HM). Alternatively, video encoder 200 and video decoder 300 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1A, in some aspects, video encoder 200 and video decoder 300 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Figure 1B:
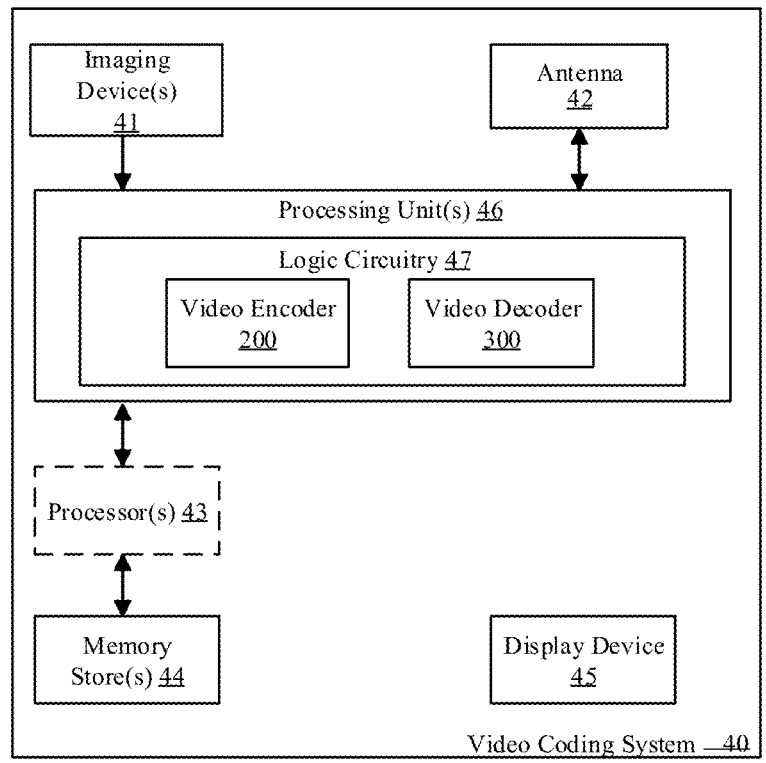
FIG. 1B is a block diagram illustrating another example coding system that may implement examples of the invention.
Figure 2:
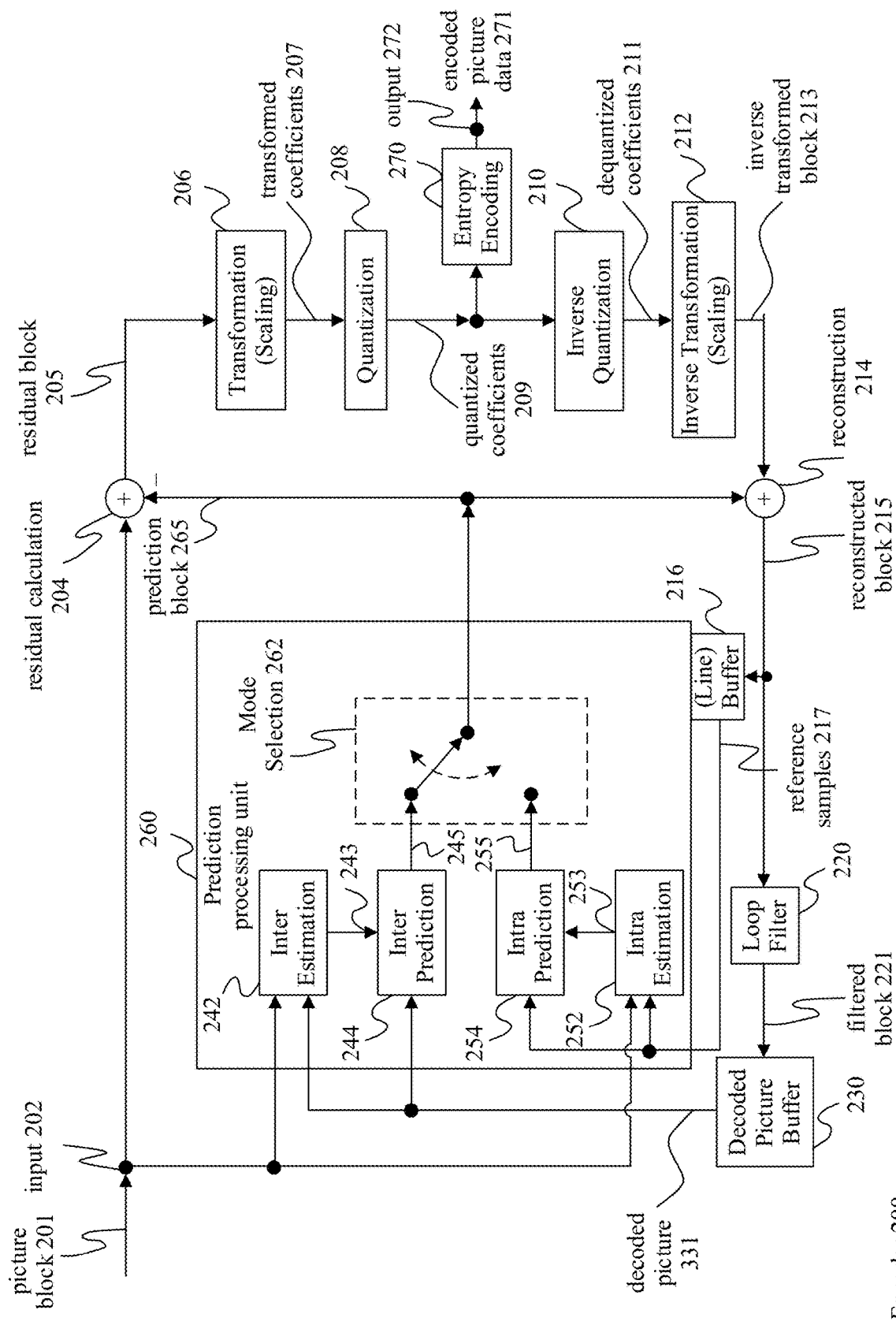
FIG. 2 is a block diagram illustrating an example video encoder that may implement examples of the invention.
Figure 3:
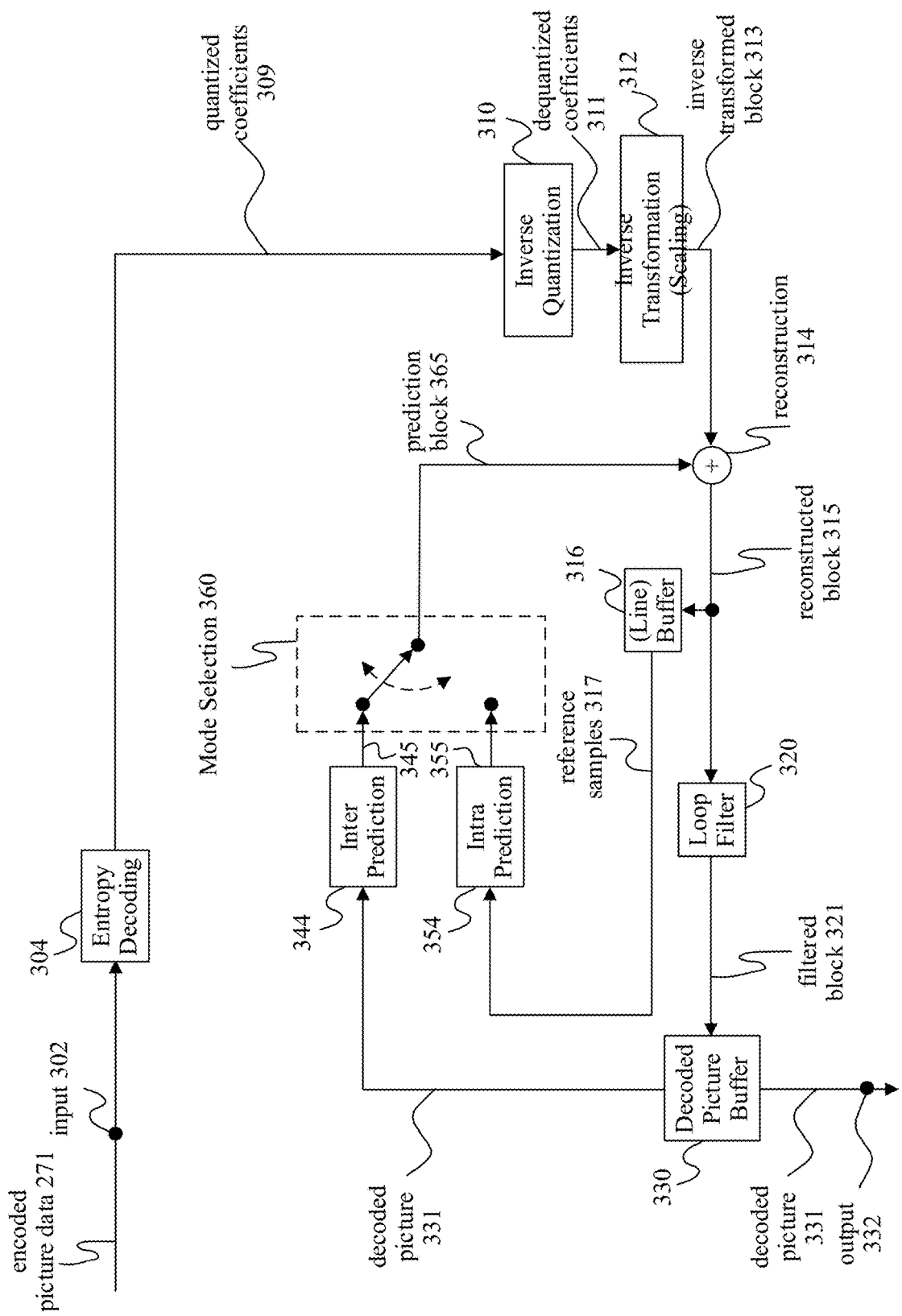
FIG. 3 is a block diagram illustrating an example of a video decoder that may implement examples of the invention.

FIG. 1B is an illustrative diagram of an example video coding system 40 including encoder 200 of FIG. 2 and/or decoder 300 of FIG. 3 according to an exemplary embodiment. The system 40 can implement techniques of this present application. e.g, the merge estimation in the inter prediction. In the illustrated implementation, video coding system 40 may include imaging device(s) 41, video encoder 20, video decoder 300 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 200 and video decoder 30, video coding system 40 may include only video encoder 200 or only video decoder 300 in various practical scenario.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 200 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 200 as implemented via logic circuitry 47 to embody the various modules as discussed with respect to FIG. 2 and/or any other encoder system or subsystem described herein. The logic circuitry may be configured to perform the various operations as discussed herein.

Video decoder 300 may be implemented in a similar manner as implemented via logic circuitry 47 to embody the various modules as discussed with respect to decoder 300 of FIG. 3 and/or any other decoder system or subsystem described herein. In some examples, video decoder 300 may be implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video decoder 300 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 300 coupled to antenna 42 and configured to decode the encoded bitstream. The display device 45 configured to present video frames.

FIG. 2 is a block diagram illustrating an example of video encoder 200 that may implement the techniques of the present application. Video encoder 200 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

FIG. 2 shows a schematic/conceptual block diagram of an example video encoder 200 that is configured to implement the techniques of the present disclosure. In the example of FIG. 2, the video encoder 200 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter estimation 242, inter prediction unit 244, an intra estimation 252, an intra prediction unit 254 and a mode selection unit 262. Inter prediction unit 244 may further include a motion compensation unit (not shown). A video encoder 200 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 200, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 300 in FIG. 3).

The encoder 200 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 200 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In HEVC and other video coding specifications, to generate an encoded representation of a picture, a set of coding tree units (CTUs) may be generated. Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

In HEVC, a CTU is split into CUs by using a quad-tree structure denoted as coding tree to adapt to various local characteristics. The decision whether to code a picture area using inter-picture (temporal) or intra-picture (spatial) prediction is made at the CU level. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A coding block is an N×N block of samples. In some examples, a CU may be the same size of a CTU. Each CU is coded with one coding mode, which could be, e.g., an intra coding mode or an inter coding mode. Other coding modes are also possible. Encoder 200 receives video data. Encoder 200 may encode each CTU in a slice of a picture of the video data. As part of encoding a CTU, prediction processing unit 260 or another processing unit (Including but not limited to unit of encoder 200 shown in FIG. 2) of encoder 200 may perform partitioning to divide the CTBs of the CTU into progressively-smaller blocks 203. The smaller blocks may be coding blocks of CUs.

Syntax data within a bitstream may also define a size for the CTU. A slice includes a number of consecutive CTUs in coding order. A video frame or image or picture may be partitioned into one or more slices. As mentioned above, each tree block may be split into coding units (CUs) according to a quad-tree. In general, a quad-tree data structure includes one node per CU, with a root node corresponding to the treeblock (e.g., CTU). If a CU is split into four sub-CUs, the node corresponding to the CU includes four child nodes, each of which corresponds to one of the sub-CUs. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. For each respective non-root node of the plurality of nodes, the respective non-root node corresponds to a sub-CU of a CU corresponding to a parent node in the tree structure of the respective non-root node. Each respective non-leaf node has one or more child nodes in the tree structure.

Each node of the quad-tree data structure may provide syntax data for the corresponding CU. For example, a node in the quad-tree may include a split flag, indicating whether the CU corresponding to the node is split into sub-CUs.

Syntax elements for a CU may be defined recursively, and may depend on whether the CU is split into sub-CUs. If a CU is not split further, it is referred as a leaf-CU. If a block of CU is split further, it may be generally referred to as a non-leaf-CU. Each level of partitioning is a quad-tree split into four sub-CUs. The black CU is an example of a leaf-node (i.e., a block that is not further split).

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). The term "block" is used to refer to any of a CU, PU, or TU, in the context of HEVC, or similar data structures in the context of other standards (e.g., macroblocks and sub-blocks thereof in H.264/AVC).

In HEVC, each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU. One of key feature of the HEVC structure is that it has the multiple partition conceptions including CU, PU, and TU. PUs may be partitioned to be non-square in shape. Syntax data associated with a CU may also describe, for example, partitioning of the CU into one or more PUs. A TU can be square or non-square (e.g., rectangular) in shape, syntax data associated with a CU may describe, for example, partitioning of the CU into one or more TUs according to a quad-tree. Partitioning modes may differ between whether the CU is skip or direct mode encoded, intra-prediction mode encoded, or inter-prediction mode encoded.

While VVC (Versatile Video Coding) removes the separation of the PU and TU concepts, and supports more flexibility for CU partition shapes. A size of the CU corresponds to a size of the coding node and may be square or non-square (e.g., rectangular) in shape. The size of the CU may range from 4×4 pixels (or 8×8 pixels) up to the size of the tree block with a maximum of 128×128 pixels or greater (for example, 256×256 pixels).

After encoder 200 generates a predictive block (e.g., luma, Cb, and Cr predictive block) for CU, encoder 200 may generate a residual block for the CU. For instance, encoder 100 may generate a luma residual block for the CU. Each sample in the CU's luma residual block indicates a difference between a luma sample in the CU's predictive luma block and a corresponding sample in the CU's original luma coding block. In addition, encoder 200 may generate a Cb residual block for the CU. Each sample in the Cb residual block of a CU may indicate a difference between a Cb sample in the CU's predictive Cb block and a corresponding sample in the CU's original Cb coding block. Encoder 100 may also generate a Cr residual block for the CU. Each sample in the CU's Cr residual block may indicate a difference between a Cr sample in the CU's predictive Cr block and a corresponding sample in the CU's original Cr coding block.

In some examples, encoder 100 skips application of the transforms to the transform block. In such examples, encoder 200 may treat residual sample values in the same way as transform coefficients. Thus, in examples where encoder 100 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), encoder 200 may quantize the coefficient block to possibly reduce the amount of data used to represent the coefficient block, potentially providing further compression. Quantization generally refers to a process in which a range of values is compressed to a single value. After encoder 200 quantizes a coefficient block, encoder 200 may entropy encode syntax elements indicating the quantized transform coefficients. For example, encoder 200 may perform Context-Adaptive Binary Arithmetic Coding (CABAC) or other entropy coding techniques on the syntax elements indicating the quantized transform coefficients.

Encoder 200 may output a bitstream of encoded picture data 271 that includes a sequence of bits that forms a representation of coded pictures and associated data. Thus, the bitstream comprises an encoded representation of video data.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

In the QTBT, a CU can have either a square or rectangular shape. For example, a coding tree unit (CTU) is first partitioned by a quadtree structure. The quadtree leaf nodes can be further partitioned by a binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different color components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). When the quadtree node has size equal to MinQTSize, no further quadtree is considered. If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

In addition, the QTBT scheme supports the ability for the luma and chroma to have a separate QTBT structure. Currently, for P and B slices, the luma and chroma CTBs in one CTU may share the same QTBT structure. However, for I slices, the luma CTB is partitioned into CUs by a QTBT structure, and the chroma CTBs may be partitioned into chroma CUs by another QTBT structure. This means that a CU in an I slice consists of a coding block of the luma component or coding blocks of two chroma components, and a CU in a P or B slice consists of coding blocks of all three colour components.

The encoder 200 applies a rate-distortion optimization (RDO) process for the QTBT structure to determine the block partitioning.

In addition, a block partitioning structure named multi-type-tree (MTT) is proposed in U.S. Patent Application Publication No. 20170208336 to replace QT, BT, and/or QTBT based CU structures. The MTT partitioning structure is still a recursive tree structure. In MTT, multiple different partition structures (e.g., three or more) are used. For example, according to the MTT techniques, three or more different partition structures may be used for each respective non-leaf node of a tree structure, at each depth of the tree structure. The depth of a node in a tree structure may refer to the length of the path (e.g., the number of splits) from the node to the root of the tree structure. A partition structure may generally refer to how many different blocks a block may be divided into. A Partition structure may be a quad-tree partitioning structure may divide a block into four blocks, a binary-tree partitioning structure may divide a block into two blocks, or a triple-tree partitioning structure may divide a block into three blocks, furthermore, triple-tree partitioning structure may be without dividing the block through the center. A partition structure may have multiple different partition types. A partition type may additionally define how a block is divided, including symmetric or asymmetric partitioning, uniform or non-uniform partitioning, and/or horizontal or vertical partitioning.

In MTT, at each depth of the tree structure, encoder 200 may be configured to further split sub-trees using a particular partition type from among one of three more partitioning structures. For example, encoder 100 may be configured to determine a particular partition type from QT, BT, triple-tree (TT) and other partitioning structures. In one example, the QT partitioning structure may include square quad-tree or rectangular quad-tree partitioning types. Encoder 200 may partition a square block using square quad-tree partitioning by dividing the block, down the center both horizontally and vertically, into four equal-sized square blocks. Likewise, encoder 200 may partition a rectangular (e.g., non-square) block using rectangular quad-tree partition by dividing the rectangular block, down the center both horizontally and vertically, into four equal-sized rectangular blocs.

The BT partitioning structure may include at least one of horizontal symmetric binary-tree, vertical symmetric binary-tree, horizontal non-symmetric binary-tree, or vertical non-symmetric binary-tree partition types. For the horizontal symmetric binary-tree partition type, encoder 200 may be configured to split a block, down the center of the block horizontally, into two symmetric blocks of the same size. For the vertical symmetric binary-tree partition type, encoder 200 may be configured to split a block, down the center of the block vertically, into two symmetric blocks of the same size. For the horizontal non-symmetric binary-tree partition type, encoder 100 may be configured to split a block, horizontally, into two blocks of differing size. For example, one block may be ¼ the size of the parent block and the other block may be ¾ the size of the parent blocks, similar to the PART 2N×nU or PART_2N×nD partition type. For the vertical non-symmetric binary-tree partition type, encoder 100 may be configured to split a block, vertically, into two blocks of differing size. For example, one block may be ¼ the size of the parent block and the other block may be ¾ the size of the parent blocks, similar to the PART_nL×2N or PART_nR×2N partition type. In other examples, an asymmetric binary-tree partition type may divide a parent block into different size fractions. For example, one sub-block may be ⅜ of the parent block and the other sub-block may be ⅝ of the parent block. Of course, such a partition type may be either vertical or horizontal.

The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric triple-tree, vertical even/uniform symmetric triple-tree, horizontal uneven/non-uniform symmetric triple-tree, vertical uneven/non-uniform symmetric triple-tree, horizontal uneven/non-uniform asymmetric triple-tree, or vertical uneven/non-uniform asymmetric triple-tree partition types.

In general, an uneven/non-uniform symmetric triple-tree partition type is a partition type that is symmetric about a center line of the block, but where at least one of the resultant three blocks is not the same size as the other two. One preferred example is where the side blocks are ¼ the size of the block, and the center block is ½ the size of the block. An even/uniform symmetric triple-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric triple-tree partition type is a partition type that is not symmetric about a center line of the block, and where at least one of the resultant blocks is not the same size as the other two.

In examples where a block (e.g., at a sub-tree node) is split to a non-symmetric triple-tree partition type, encoder 200 and/or decoder 300 may apply a restriction such that two of the three partitions have the same size. Such a restriction may correspond to a limitation to which encoder 200 must comply when encoding video data. Furthermore, in some examples, encoder 200 and decoder 300 may apply a restriction whereby the sum of the area of two partitions is equal to the area of the remaining partition when splitting according to a non-symmetric triple-tree partition type.

In some examples, encoder 200 may be configured to select from among all the of the aforementioned partition types for each of the QT, BT, and TT partition structures. In other examples, encoder 200 may be configured to only determine a partition type from among a subset of the aforementioned partition types. For example, a subset of the above-discussed partition types (or other partition types) may be used for certain block sizes or for certain depths of a quadtree structure. The subset of supported partition types may be signaled in the bitstream for use by decoder 200 or may be predefined such that encoder 200 and decoder 300 may determine the subsets without any signaling.

In other examples, the number of supported partitioning types may be fixed for all depths in all CTUs. That is, encoder 200 and decoder 300 may be preconfigured to use the same number of partitioning types for any depth of a CTU. In other examples, the number of supported partitioning types may vary and may be dependent on depth, slice type, or other previously coded information. In one example, at depth 0 or depth 1 of the tree structure, only the QT partition structure is used. At depths greater than 1, each of the QT, BT, and TT partition structures may be used.

In some examples, encoder 200 and/or decoder 300 may apply preconfigured constraints on supported partitioning types in order to avoid duplicated partitioning for a certain region of a video picture or region of a CTU. In one example, when a block is split with non-symmetric partition type, encoder 200 and/or decoder 300 may be configured to not further split the largest sub-block that is split from the current block. For example, when a square block is split according to a non-symmetric partition type (similar to the PART_2N×nU partition type), the largest sub-block among all sub-blocks (similar to the largest sub-block of PART_2N×nU partition type) is the noted leaf node and cannot be further split. However, the smaller sub-block (similar to the smaller sub-block of PART_2N×nU partition type) can be further split.

As another example where constraints on supported partitioning types may be applied to avoid duplicated partitioning for a certain region, when a block is split with non-symmetric partition type, the largest sub-block that is split from the current block cannot be further split in the same direction. For example, when a square block is split non-symmetric partition type (similar to the PART_2N×nU partition type), encoder 200 and/or decoder 300 may be configured to not split the large sub-block among all sub-blocks (similar to the largest sub-block of PART_2N×nU partition type) in the horizontal direction.

As another example where constraints on supported partitioning types may be applied to avoid difficulty in further splitting, encoder 200 and/or decoder 300 may be configured to not split a block, either horizontally or vertically, when the width/height of a block is not a power of 2 (e.g., when the width height is not 2, 4, 8, 16, etc.).

The above examples describe how encoder 200 may be configured to perform MTT partitioning. Decoder 300 may also then apply the same MTT partitioning as was performed by encoder 200. In some examples, how a picture of video data was partitioned by encoder 200 may be determined by applying the same set of predefined rules at decoder 300. However, in many situations, encoder 200 may determine a particular partition structure and partition type to use based on rate-distortion criteria for the particular picture of video data being coded. As such, in order for decoder 300 to determine the partitioning for a particular picture, encoder 200 may signal syntax elements in the encoded bitstream that indicate how the picture, and CTUs of the picture, are to be partitioned. Decoder 300 may parse such syntax elements and partition the picture and CTUs accordingly.

In one example, the prediction processing unit 260 of video encoder 200 may be configured to perform any combination of the partitioning techniques described above, especially, for the motion estimation, and the details will be described later.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 200 as shown in FIG. 2 is configured encode the picture 201 block by block, e.g. the encoding and prediction is performed per block 203.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 300 (and the corresponding inverse transform, e.g. by inverse transform processing unit 212 at a decoder 300) and corresponding scaling factors for the forward transform, e.g. by transform processing unit 206, at an encoder 200 may be specified accordingly.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding inverse dequantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 200 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 200 (respectively loop filter unit 220) may be configured to output loop filter parameters (such as sample adaptive offset information), e.g. directly or entropy encoded via the entropy encoding unit 270 or any other entropy coding unit, so that, e.g., a decoder 300 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 200 will be explained in more detail.

As described above, the encoder 200 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit and motion compensation (MC) unit (not shown in FIG. 2). The motion estimation unit is configured to receive or obtain the picture block 203 (current picture block 203 of the current picture 201) and a decoded picture 331, or at least one or a plurality of previously reconstructed blocks, e.g. reconstructed blocks of one or a plurality of other/different previously decoded pictures 331, for motion estimation. E.g. a video sequence may comprise the current picture and the previously decoded pictures 331, or in other words, the current picture and the previously decoded pictures 331 may be part of or form a sequence of pictures forming a video sequence. The encoder 200 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV). Merging is an important motion estimation tool used in HEVC and inherited to VVC. For performing the merge estimation, the first thing should be done is construct a merge candidate list where each of the candidate contains all motion data including the information whether one or two reference picture lists are used as well as a reference index and a motion vector for each list. The merge candidate list is constructed based on the following candidates: a. up to four spatial merge candidates that are derived from five spatial neighboring blocks; b. one temporal merge candidate derived from two temporal, co-located blocks; c. additional merge candidates including combined bi-predictive candidates and zero motion vector candidates.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 271. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 200 can be used to encode the video stream. For example, a non-transform based encoder 200 can quantize the residual signal directly without the transform processing unit 206 for certain blocks or frames. In another implementation, an encoder 200 can have the quantization unit 208 and the inverse quantization unit 210 combined into a single unit.

FIG. 3 shows an exemplary video decoder 300 that is configured to implement the techniques of this present application. The video decoder 300 configured to receive encoded picture data (e.g. encoded bitstream) 271, e.g. encoded by encoder 200, to obtain a decoded picture 331. During the decoding process, video decoder 300 receives video data, e.g. an encoded video bitstream that represents picture blocks of an encoded video slice and associated syntax elements, from video encoder 200.

In the example of FIG. 3, the decoder 300 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 300 may, in some examples, perform a decoding pass generally reciprocal to the encoding pass described with respect to video encoder 200 from FIG. 2.

The entropy decoding unit 304 is configured to perform entropy decoding to the encoded picture data 271 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 300 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 300 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 300 is configured to output the decoded picture 311, e.g. via output 312, for presentation or viewing to a user.

Other variations of the video decoder 300 can be used to decode the compressed bitstream. For example, the decoder 300 can produce the output video stream without the loop filtering unit 320. For example, a non-transform based decoder 300 can inverse-quantize the residual signal directly without the inverse-transform processing unit 312 for certain blocks or frames. In another implementation, the video decoder 300 can have the inverse-quantization unit 310 and the inverse-transform processing unit 312 combined into a single unit.

Figure 4:
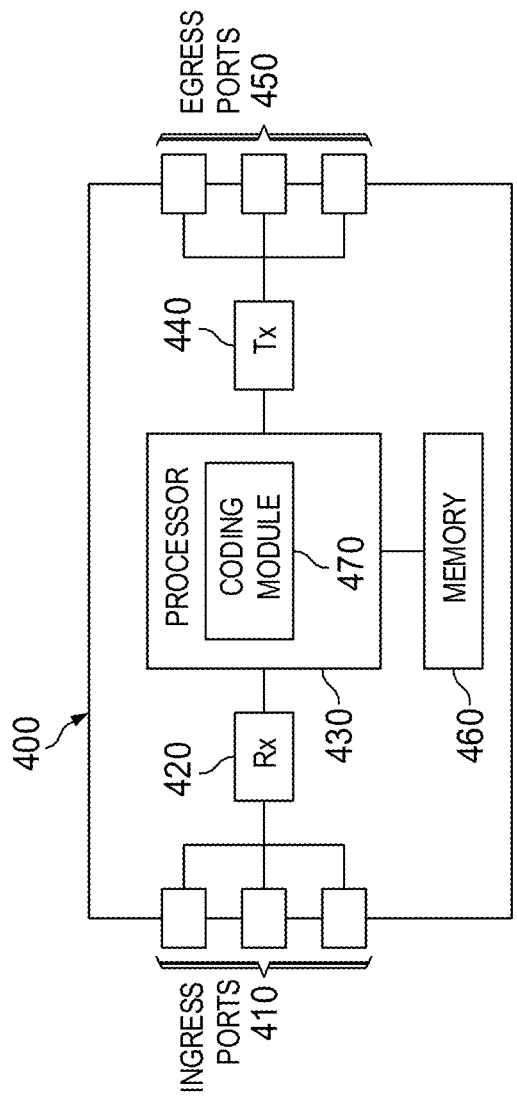
FIG. 4 is a schematic diagram of a video coding device.

FIG. 4 is a schematic diagram of a network device 400 (e.g., a coding device) according to an embodiment of the disclosure. The network device 400 is suitable for implementing the disclosed embodiments as described herein. In an embodiment, the network device 400 may be a decoder such as video decoder 300 of FIG. 1A or an encoder such as video encoder 200 of FIG. 1A. In an embodiment, the network device 400 may be one or more components of the video decoder 300 of FIG. 1A or the video encoder 200 of FIG. 1A as described above.

The network device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The network device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the network device 400 and effects a transformation of the network device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
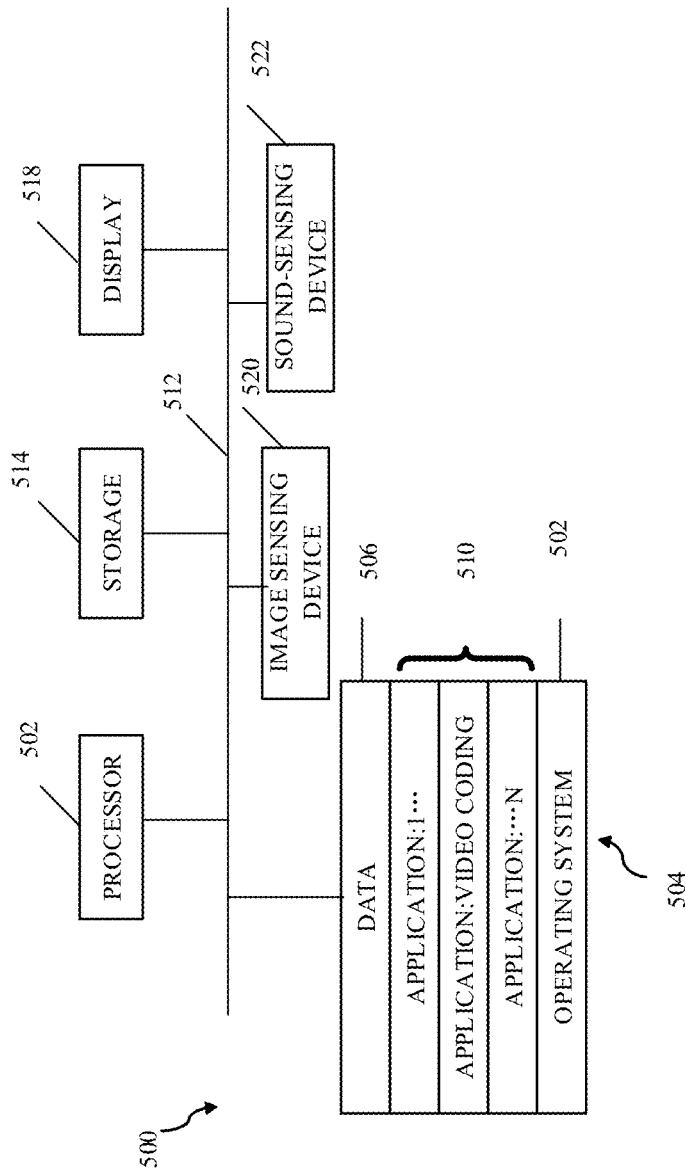
FIG. 5 is a simplified block diagram of an apparatus 500 that may be used as either or both of the source device 12 and the destination device 14 from FIG. 1A according to an exemplary example.

FIG. 5 is a simplified block diagram of an apparatus 500 that may be used as either or both of the source device 12 and the destination device 14 from FIG. 1A according to an exemplary embodiment. The apparatus 500 can implement techniques of this present application. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Figure 6A:
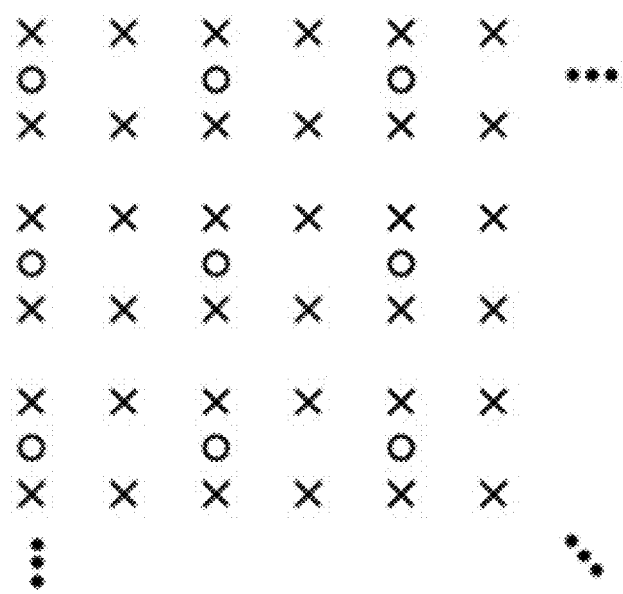
FIG. 6A is a conceptual diagram illustrating nominal vertical and horizontal relative locations of luma and chroma samples.

In 4:2:0 sampling, each of the two chroma arrays has half the height and half the width of the luma array. The nominal vertical and horizontal relative locations of luma and chroma samples in pictures are shown in FIG. 6A.

Figures 8A, 8B:
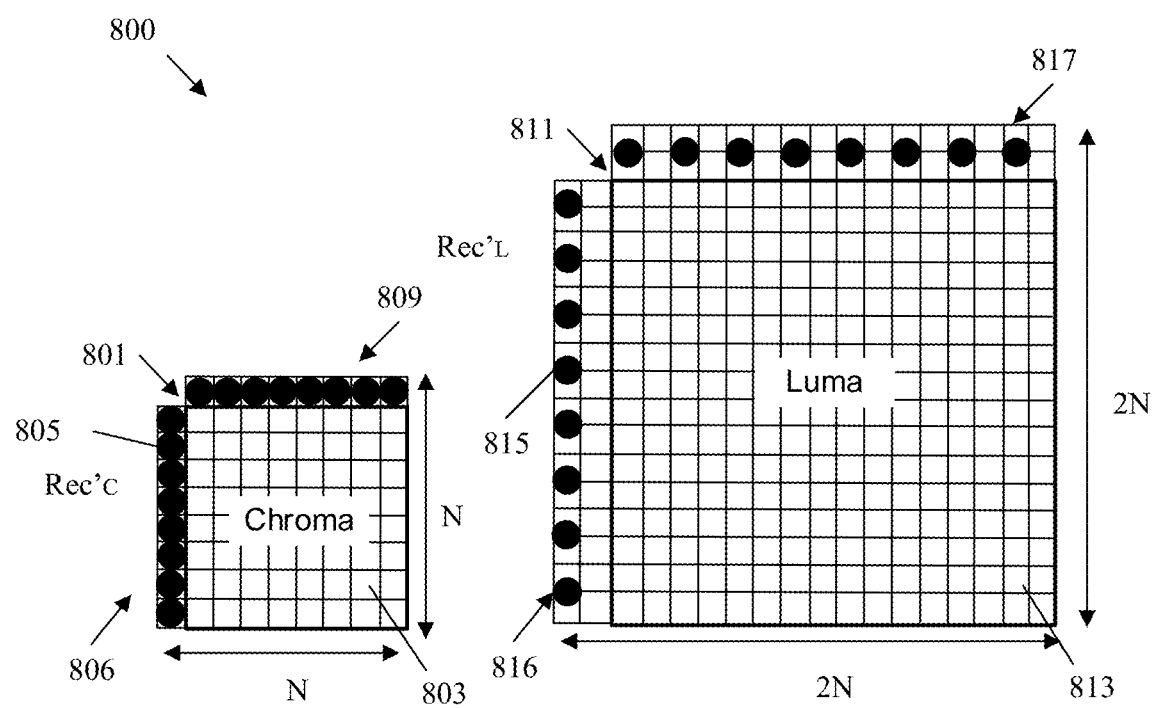
FIG. 8A and FIG. 8B are illustrations of the locations of the left and top reference samples of the current luma and chroma blocks involved in the CCLM mode.

FIG. 8A and FIG. 8B are conceptual diagrams illustrating example locations from which scaling parameters used to scale the down sampled, reconstructed luma block are derived. For example, each of FIG. 8A and FIG. 8B illustrates an example of 4:2:0 sampling, and the scaling parameters are a and R.

In general, when LM prediction mode is applied, video encoder 20 and video decoder 30 may invoke the following steps. Video encoder 20 and video decoder 30 may downsample the neighboring luma samples. Video encoder 20 and video decoder 30 may derive the linear parameters (i.e., α and β) (also referred to as scaling parameters). Video encoder 20 and video decoder 30 may downsample the current luma block and derive the prediction (e.g., predictive block) from the downsampled luma block and linear parameters. There may be various ways in which to downsample.

Figure 6B:
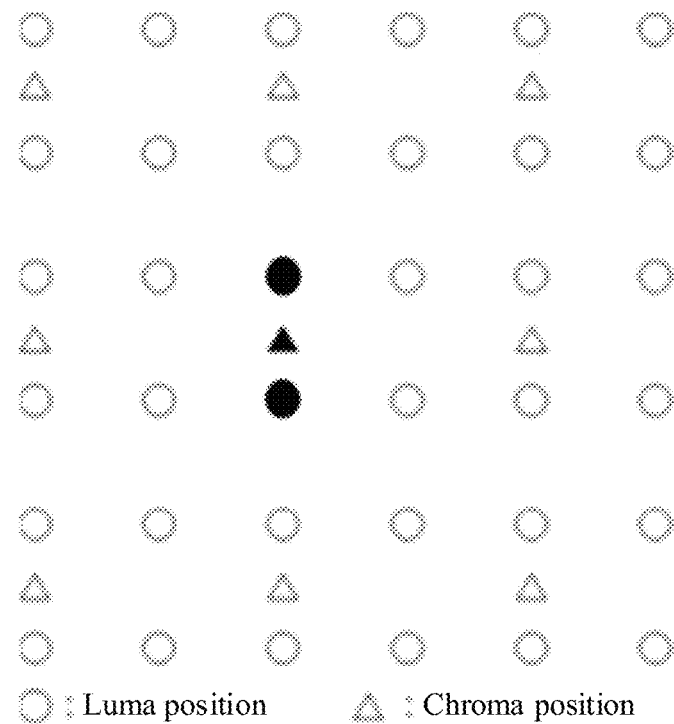
FIG. 6B is a conceptual diagram illustrating an example of luma positions and chroma positions for downsampling samples of a luma block for generating a predictive block.

FIG. 6B is a conceptual diagram illustrating an example of luma positions and chroma positions for downsampling samples of a luma block for generating a predictive block for a chroma block. As depicted in FIG. 6B, a chroma sample, represented by the filled-in (i.e., solid black) triangle, is predicted from two luma samples, represented by the two filled-in circles, by applying a [1, 1] filter. The [1, 1] filter is one example of a 2-tap filter.

Figure 6C:
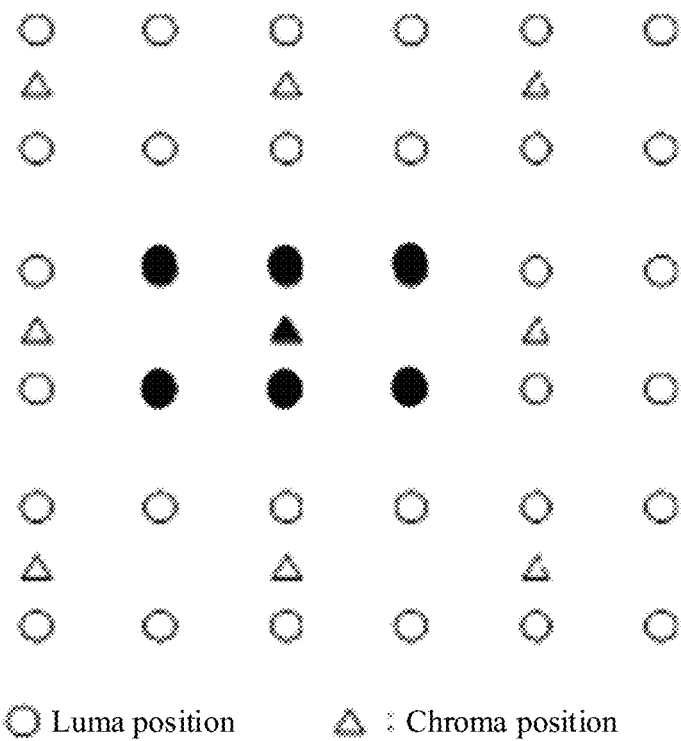
FIG. 6C is a conceptual diagram illustrating another example of luma positions and chroma positions for down-sampling samples of a luma block for generating a predictive block.

FIG. 6C is a conceptual diagram illustrating another example of luma positions and chroma positions for downsampling samples of a luma block for generating a predictive block. As depicted in FIG. 6C, a chroma sample, represented by the filled in (i.e., solid black) triangle, is predicted from six luma samples, represented by the six filled in circles, by applying a 6-tap filter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 6D:
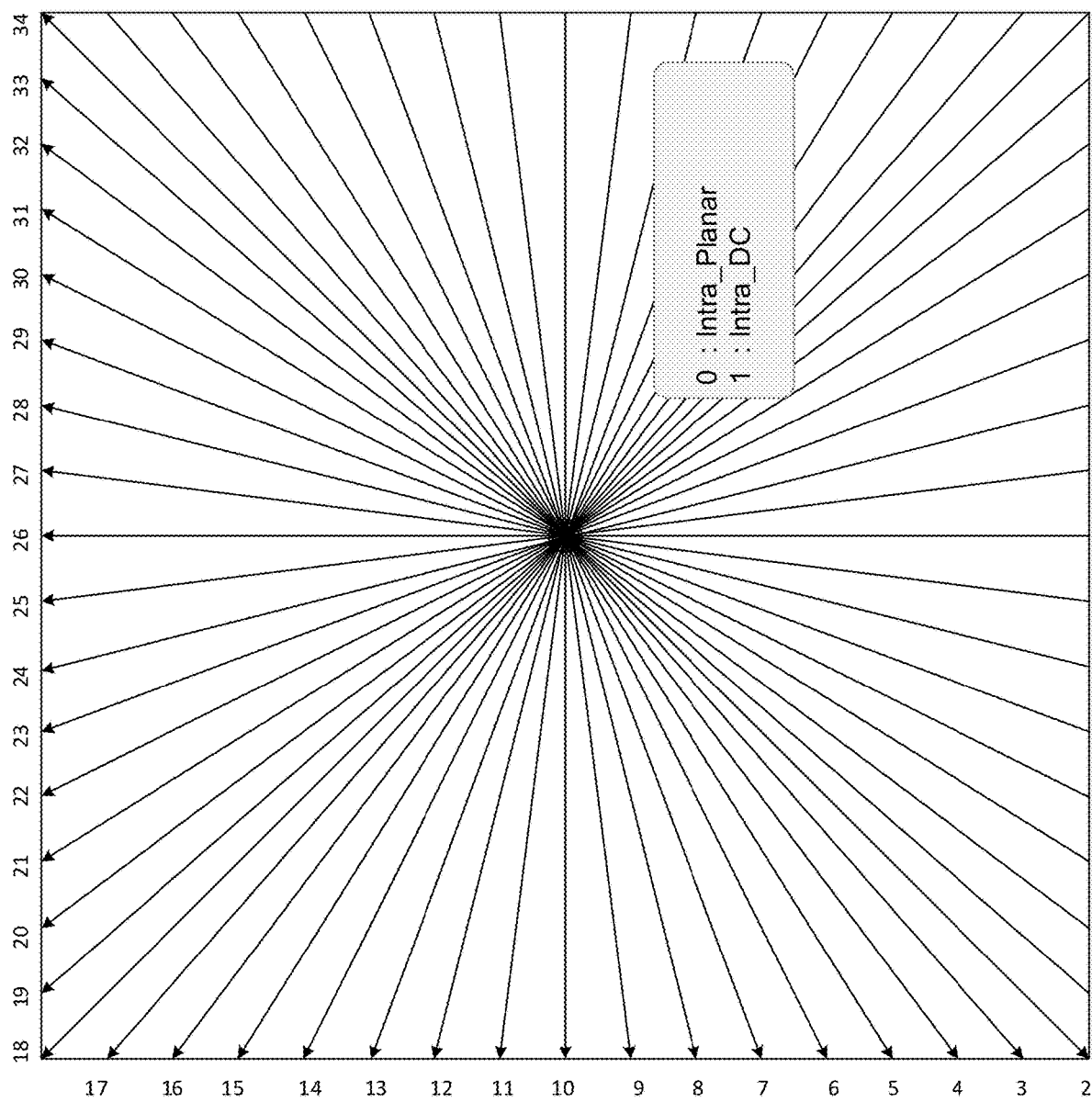
FIG. 6D is an illustration of intra-prediction modes of H.265/HEVC.

Video compression techniques such as motion compensation, intra prediction and loop filters have been proved to be effective and thus adopted into various video coding standards, such as H.264/AVC and H.265/HEVC. Intra prediction can be used when there is no available reference picture, or when inter predication coding is not used for the current block or picture, for instance in an I frame or an I slice. The reference samples of intra prediction are usually derived from previously coded (or reconstructed) neighboring blocks in the same picture. For example, both in H.264/AVC and H.265/HEVC, the boundary samples of adjacent blocks are used as reference for intra prediction. In order to cover different texture or structural character, there are many different intra prediction modes. In each mode, a different prediction signal derivation method is used. For example, H.265/HEVC supports a total of 35 intra prediction modes, as shown in FIG. 6D.

Intra Prediction Algorithm Description of H.265/HEVC

For intra prediction, the decoded boundary samples of adjacent blocks are used as reference. The encoder selects the best luma intra prediction mode of each block (i.e. the mode that provides the most accurate prediction for the current block) from 35 options: 33 directional prediction modes, a DC mode and a Planar mode. The mapping between the intra prediction direction and the intra prediction mode number is specified in FIG. 6D. It should be noted that 65 or even more intra prediction modes are developed in the latest video coding technology, for instance, VVC (versatile video coding), which can capture arbitrary edge directions presented in natural video. Among these prediction modes, the mode having the horizontal direction (e.g. mode 10 in FIG. 6D) is also referred to as the "horizontal mode," and the mode having the vertical direction (e.g. mode 26 in FIG. 6D) is also referred to as the "vertical mode."

Figure 7:
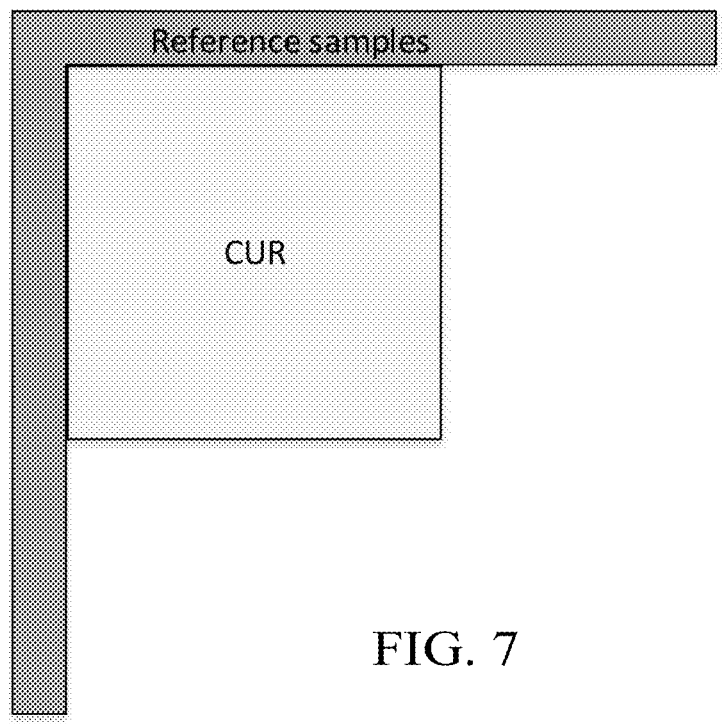
FIG. 7 is an illustration of reference samples of a current block.

FIG. 7 illustrates reference samples of a block. As shown in FIG. 7, the block "CUR" is a current block to predict, the dark samples along the boundary of the current block are the reference samples used to predict the current block. These reference samples are samples in the reconstructed blocks adjacent to the current block, also referred to as neighboring blocks. The block "CUR" can be a luma block or a chroma block depending on the type of block to be predicted. The prediction signal can be derived by mapping the reference samples according to a specific method which is indicated by the intra prediction mode.

Reference Sample Substitution

Some or all of the reference samples may not be available for intra prediction due to several reasons. For example, samples outside of the picture, slice or tile are considered unavailable for prediction. In addition, when constrained intra prediction is enabled, reference samples belonging to inter-predicted PUs are omitted in order to avoid error propagation from potentially erroneously received and reconstructed prior pictures. As used herein, a reference sample of a current coding block is available if it is not outside the current picture, slice or title, if the reference sample can been reconstructed before the current coding block is decoded, and/or if the reference samples is not omitted due to a coding decision at the encoder. In HEVC, it allows the use of all its prediction modes after substituting the non-available reference samples. For the extreme case with none of the reference samples available, all the reference samples are substituted by a nominal average sample value for a given bit depth (e.g., 128 for 8-bit data). If there is at least one reference sample marked as available for intra prediction, the unavailable reference samples are substituted by using the available reference samples. The unavailable reference samples are substituted by scanning the reference samples in clock-wise direction and using the latest available sample value for the unavailable ones. If the first sample in clock-wise direction scanning is not available, it is will be substituted by the first encountered available reference sample when scanning the samples in the order of clock-wise direction. Here, the "substitution" also can be called padding, and substituted samples also can be called padded samples.

Constrained Intra Prediction

Constrained intra prediction is a tool to avoid spatial noise propagations caused by spatial intra prediction with encoder-decoder mismatched reference pixels. The encoder-decoder mismatched reference pixels can appear when packet loss happens in transmitting inter-coded slices. They can also appear when lossy decoder-side memory compression is used. When constrained intra prediction is enabled, inter-predicted samples are marked as not available or un-available for intra prediction, and those unavailable samples can be padded with a padding method as disclosed above for performing the full intra prediction estimation in encoding side or intra prediction in decoding side.

Cross-Component Linear Model Prediction (CCLM)

Cross-component linear model prediction (CCLM), also referred to as cross-component intra-prediction (CCIP), is one type of the intra prediction modes that are used to reduce the cross-component redundancy during the intra prediction mode. FIG. 8A and FIG. 8B are schematic diagrams illustrating an example mechanism of performing a CCLM intra-prediction. Each of FIG. 8A and FIG. 8B illustrates an example of 4:2:0 sampling, and shows an example of the locations of the samples of the current block involved in the CCLM mode and its left and top neighboring samples. The white squares are samples of the current block, and the shaded circles are reconstructed samples of neighboring blocks. FIG. 8A illustrates an example of the neighboring reconstructed pixels of a chroma block. FIG. 8B illustrates an example of the neighboring reconstructed pixels of a co-located luma block. If the video format is YUV4:2:0, then there are one 16×16 luma block and two 8×8 chroma blocks.

CCLM intra-prediction may be performed by an intra estimation unit 254 of an encoder 200 and/or an intra prediction unit 354 of a decoder 300. CCLM intra-prediction predicts chroma samples 803 in a chroma block 801. The chroma samples 803 appear at integer positions shown as the squares. The prediction is based in part on neighboring reference samples, which are depicted as black circles. The chroma samples 803 are not predicted solely based on the neighboring chroma reference samples 805. The chroma samples 803 are also predicted based on luma reference samples 813 and neighboring luma reference samples 815. Specifically, a CU contains a luma block 811 and two chroma blocks 801. A model is generated that correlates the chroma samples 803 and the luma reference samples 813 in the same CU. Linear coefficients for the model are determined by comparing the neighboring luma reference samples 815 to the neighboring chroma reference samples 805.

As the luma reference samples 813 are reconstructed, the luma reference samples 813 are denoted as reconstructed luma samples (Rec'L). As the neighboring chroma reference samples 805 are reconstructed, the neighboring chroma reference samples 805 are denoted as reconstructed neighboring chroma samples (Rec'C).

As shown, the luma block 811 contains four times the samples as the chroma block 801. In the examples shown in FIG. 8A and FIG. 8B, the chroma block 801 contains N by N samples while the luma block 811 contains 2N by 2N samples. Hence, the luma block 811 is four times the resolution of the chroma block 801. For the prediction to operate on the luma reference samples 813 and the neighboring luma reference samples 815, the luma reference samples 813 and the neighboring luma reference samples 815 are down-sampled to provide an accurate comparison with the neighboring chroma reference samples 805 and the chroma samples 803. Down-sampling is the process of reducing the resolution of a group of sample values. For example, when YUV4:2:0 format is used, the luma samples may be down-sampled by a factor of four (e.g., width by two, and height by two). YUV is a color encoding system that employs a color space in terms of luma components Y and two chrominance components U and V.

In the CCLM prediction, the chroma samples are predicted based on the down-sampled corresponding reconstructed luma samples (current luma block) using a linear model as follows:

$$\text{pred}_C(i,j) = \alpha \cdot \text{rec}_L'(i,j) + \beta \quad (1)$$

where $\text{pred}_C(i,j)$ represents the predicted chroma samples and $\text{rec}'_L(i,j)$ represents the down-sampled corresponding reconstructed luma samples. Parameters $\alpha$ and $\beta$ can be derived by minimizing the regression error between the neighbouring reconstructed luma and chroma samples around the current luma block and current chroma block as follows:

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad (2)$$

$$\beta = \frac{\sum C(n) - \alpha \cdot \sum L(n)}{N} \quad (3)$$

where L(n) represents the down-sampled top and left neighbouring reconstructed luma samples, C (n) represents the top and left neighboring reconstructed chroma samples, and the value of N is equal to the samples used to derive the coefficients. For a coding block with a square shape, the above two equations are applied directly. This regression error minimization computation is also performed as part of the decoding process, not just as an encoder search operation, so no syntax is used to convey the α and β values.

Figure 9:
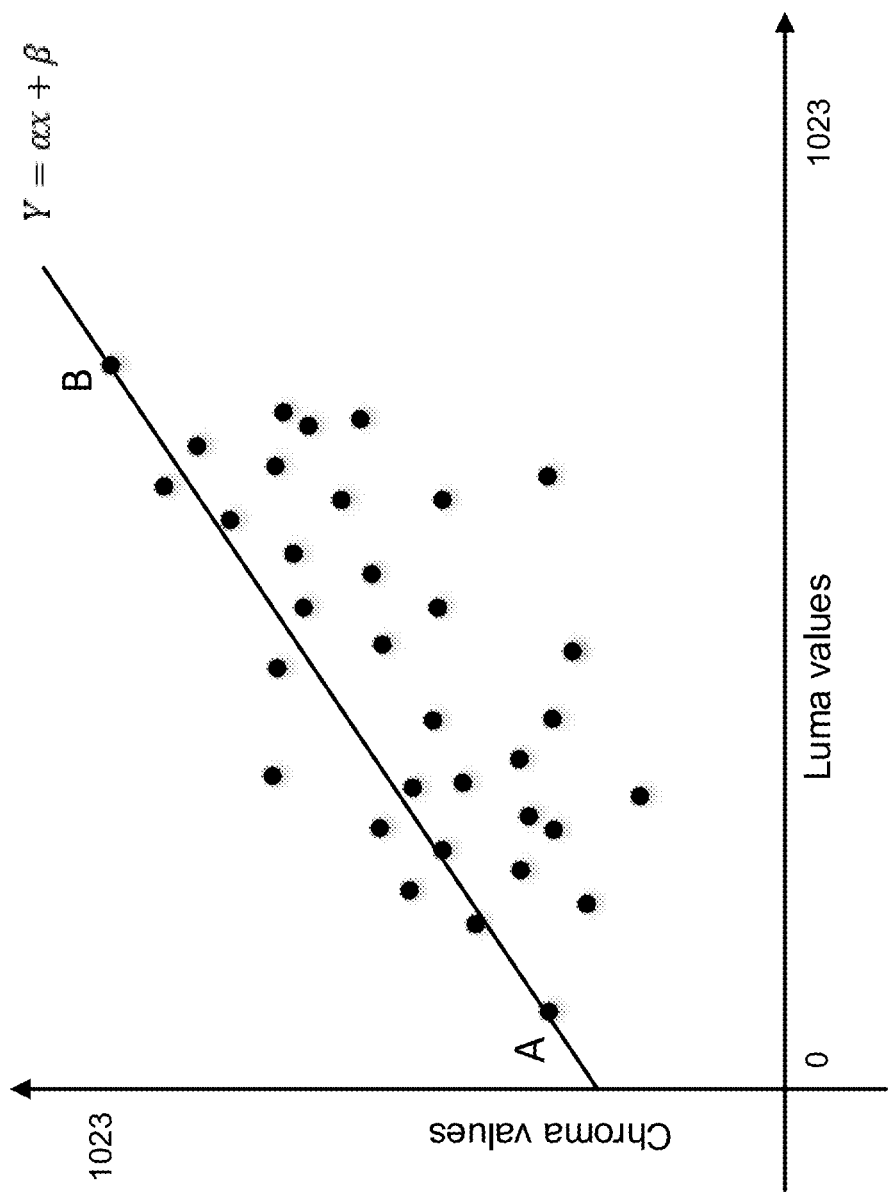
FIG. 9 is an illustration of the straight line between minimum and maximum luma values.

Besides using the above method of minimizing regression error (also referred to as least square (LS) method), the linear model coefficients α and β can also be derived using maximum and minimum luma sample values. This latter method is also referred to as MaxMin method. In the MaxMin method, after the top and left neighboring reconstructed luma samples are down-sampled, a one-to-one relationship is obtained for each of these neighboring reconstructed luma samples with the top and left neighboring reconstructed chroma samples. The linear model coefficients parameters α and β can thus be derived by using pairs of the luma and chroma samples based on the one-to-one relationship. The pairs of the luma and chroma samples are obtained by identifying the minimum and maximum values in the down-sampled neighboring reconstructed top and left luma samples and then identifying the corresponding samples from the neighboring reconstructed top and left chroma templates. The pairs of luma and chroma samples are as depicted as (A, B) in FIG. 9. The linear model parameters α and β are obtained according to the following equation:

$$\alpha = \frac{y_B - y_A}{x_B - x_A} \quad (4)$$

$$\beta = y_A - \alpha x_A, \quad (5)$$

where ($x_A$, $y_A$) are the coordinates of A and ($x_B$, $y_B$) are the coordinate of B in FIG. 9.

The CCLM luma-to-chroma prediction mode is added as one additional chroma intra prediction mode. At the encoder side, one more rate-distortion (RD) cost check for the chroma components is added for selecting the chroma intra prediction mode.

Figure 10:
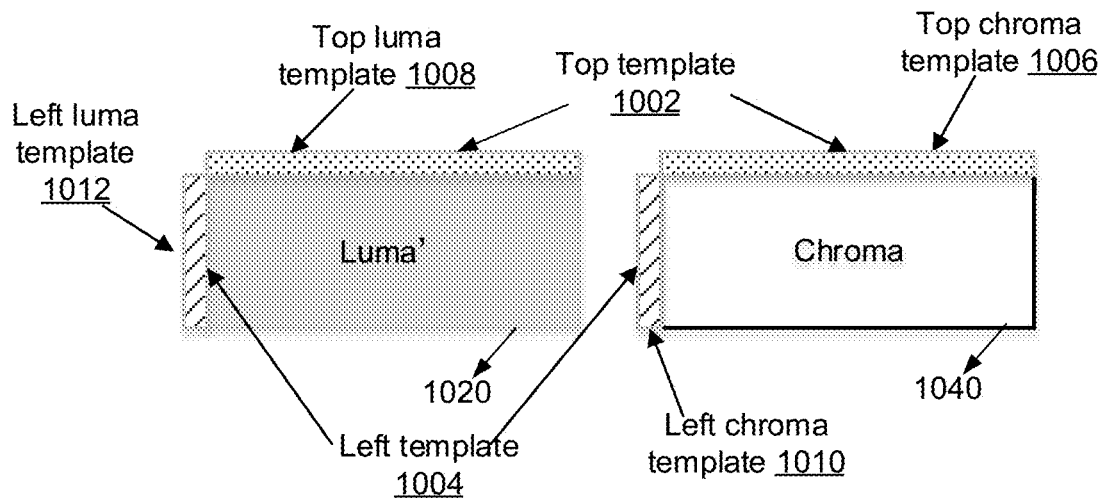
FIG. 10 is an illustration of the templates of the chroma block (which include reference samples) and the corresponding down-sampled luma block.

For simplicity, in this document, the term "template" is used to denote the neighboring reconstructed chroma samples and the down-sampled neighboring reconstructed luma samples. These neighboring reconstructed chroma samples and the down-sampled neighboring reconstructed luma samples are also referred to as reference samples of the template. FIG. 10 is an illustration of the templates of the chroma block and the corresponding down-sampled luma block. In the example shown in FIG. 10, luma' 1020 is the down-sampled version of the current luma block and has a same spatial resolution as the chroma block 1040. In other words, luma' 1020 is a down-sampled collocated luma block of the chroma block 1040. The top template 1002 includes the top neighboring reconstructed chroma samples above the current chroma block 1040 and the corresponding down-sampled top neighboring reconstructed luma samples of Luma' 1020. The down-sampled top neighboring reconstructed luma samples of Luma' 1020 are obtained based on neighboring samples above the luma block. As used here, neighboring samples above the luma block may include either neighboring samples immediately above the luma block, the neighboring samples that are not adjacent to the luma block, or both. The left template 1004 includes the left neighboring reconstructed chroma samples and the corresponding down-sampled left neighboring reconstructed luma samples. The top neighboring reconstructed chroma samples is also referred to as the "top chroma template," such as the top chroma template 1006. The corresponding down-sampled top neighboring reconstructed luma samples are referred to as the "top luma template," such as the top luma template 1008. The left neighboring reconstructed chroma samples are also referred to as the "left chroma template," such as the left chroma template 1010. The corresponding down-sampled left neighboring reconstructed luma samples are referred to as the "left luma template," such as the left luma template 1012. The elements contained in a template are referred as the reference samples of that template.

Figure 11:
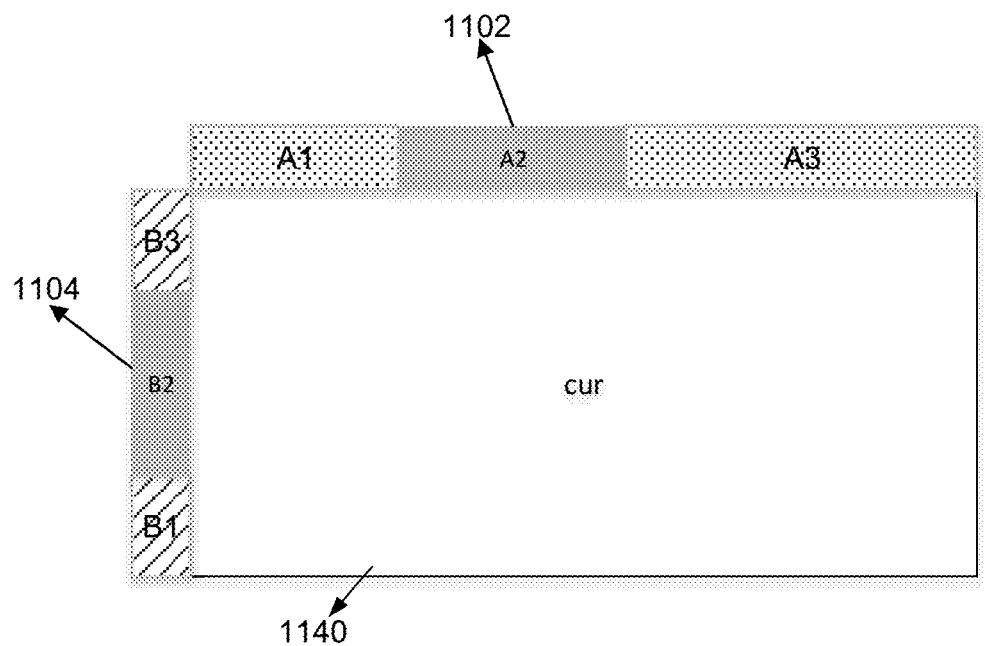
FIG. 11 is an illustration of an example of template that contains unavailable reference samples.

In the existing CCLM application, for the top or the left template, if there exists one reference sample which is marked as unavailable, then the whole template will not be used. FIG. 11 is an illustration of an example of a template that contains unavailable reference samples. In the example shown in FIG. 11, for a chroma block 1140, if there exist unavailable reference samples in the top template, such as the reference samples in A2 1102, then the top template will not be used for the linear model coefficients derivation. Similarly, if there exists one reference sample that is unavailable in left template, like the reference samples in B2 1104, then the left template will not be used for linear model coefficients derivation. This will degrade the coding performance of intra prediction.

Multi-Directional Linear Model

Figure 12:
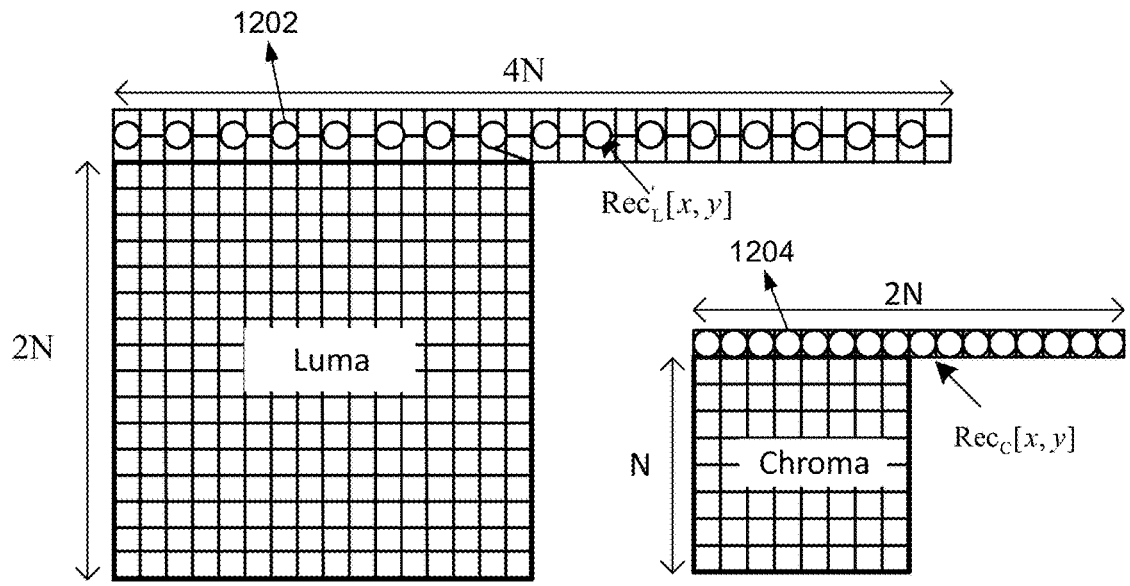
FIG. 12 is an illustration of the reference samples used in the CCLM_T mode.
Figure 13:
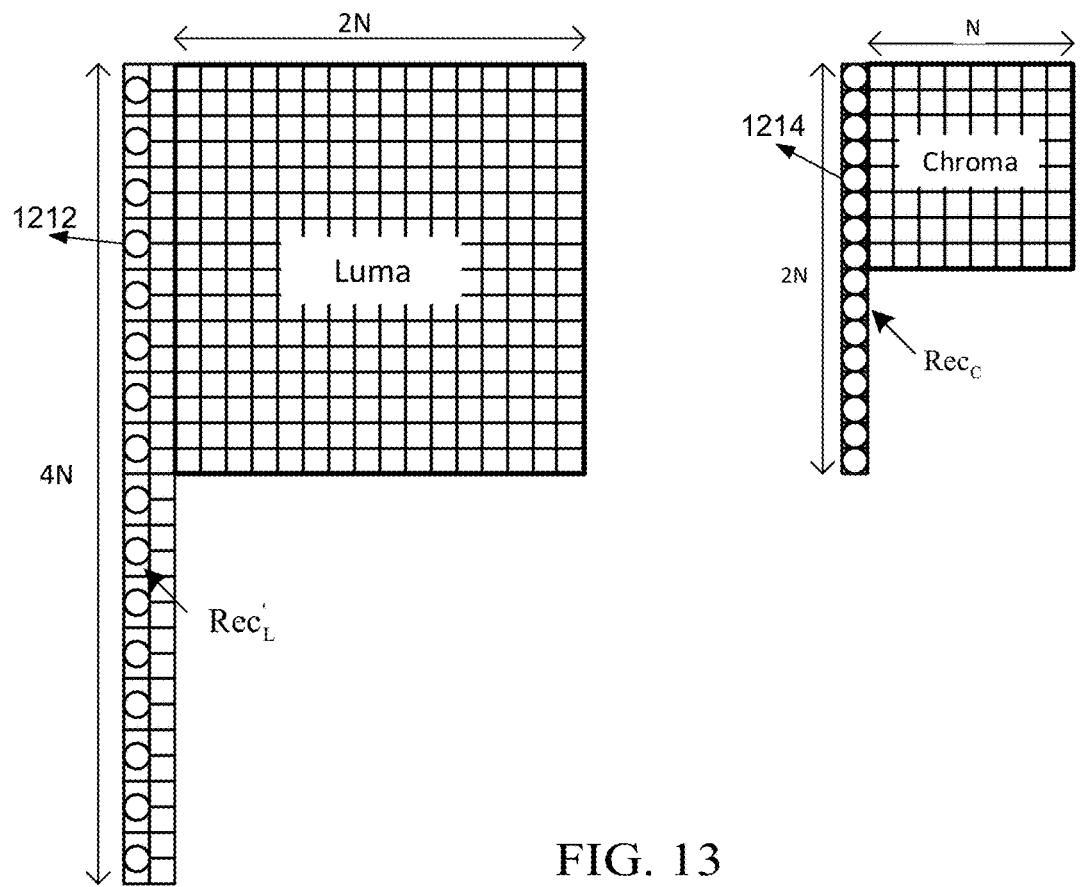
FIG. 13 is an illustration of the reference samples used in the CCLM_L mode.

In addition to being used to calculate the linear model coefficients together, the reference samples in the top template and left template can also be used in another two CCLM modes, i.e. CCLM_T and CCLM_L modes. CCLM_T and CCLM_L can also be referred to collectively as multi-directional linear model (MDLM). FIG. 12 is an illustration of the reference samples used in the CCLM_T mode and FIG. 13 is an illustration of the reference samples used in the CCLM_L mode. As shown in FIG. 12, in the CCLM_T mode, only reference samples in the top template, such as reference samples 1202 and 1204, are used to calculate the linear model coefficients. As shown in FIG. 13, in the CCLM_L mode, only reference samples in the left template, such as reference samples 1212 and 1214, are used to calculate the linear model coefficients. The number of references samples used in each of these modes are W+H, where W is the width of the chroma block and H is the height of the chroma block.

The CCLM mode and the MDLM mode (i.e. the CCLM_T mode and the CCLM_L mode) can be used together, or, alternatively. For example, only the CCLM mode is used in the codec, only MDLM is used in the codec, or both CCLM and MDLM are used in the codec. In the last case where both CCLM and MDLM are used, the 3 modes (i.e. CCLM, CCLM_T, CCLM_L) are added as 3 additional chroma intra prediction modes. At the encoder side, 3 more RD cost checks for the chroma components are added for selecting the chroma intra prediction mode. In the existing method for MDLM, the model parameters or model coefficients are derived using the LS method. If the number of available reference samples is not enough, padding operation is used to copy the farthest pixel values or fetch sample values in the available reference samples.

Using the LS method to obtain the linear model coefficients for the MDLM modes, however, leads to high computational complexity. In addition, in the existing MDLM modes, the positions of some template samples may be far from current block, especially for non-square blocks. For example, the right-most reference sample in the top template and the bottom reference sample in the left template are far from the current block. As such, these reference samples will have less correlation with current block, rendering the prediction of the chroma block less efficient. The technologies presented herein can reduce the complexity of MDLM, and improve the correlation between the template samples and the current block.

In one example, when using the MaxMin method to determine the model coefficients, besides using the reference samples from the top template and the left template jointly, reference samples in only one portion of the template is used, either the left template or the top template. For example, in the MaxMin method, only the reference samples in the top luma template are examined to determine the maximum luma value and the minimum luma value. Alternatively, only reference samples in the left luma template are examined to determine the maximum luma value and the minimum luma value. After the sample positions of the maximum and minimum luma values are determined, the corresponding chroma sample values can be obtained based on the location of the minimum and maximum luma values.

Figure 14:
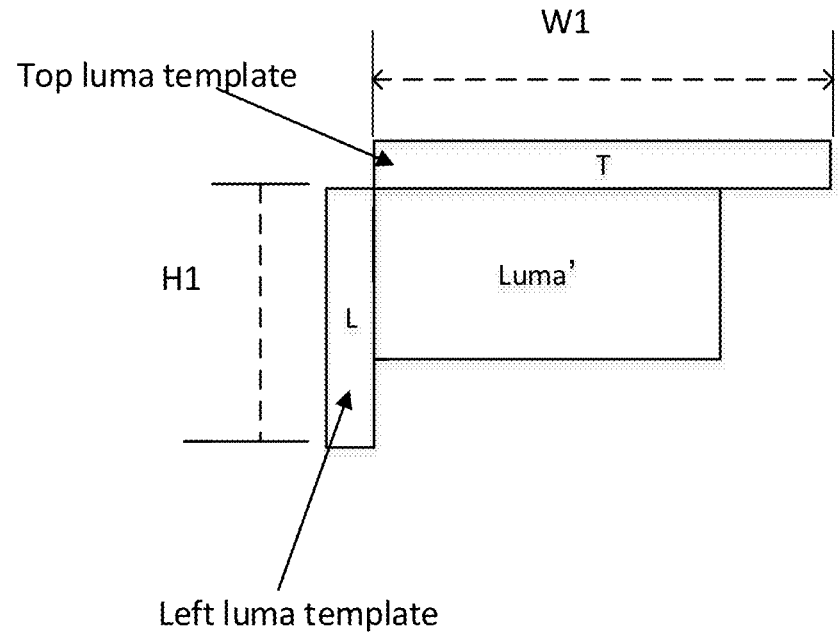
FIG. 14 is a schematic diagram illustrating an example of using a top template that is larger than the width of a down-sampled luma block of the current luma block or a left template that is larger than the height of the down-sampled luma block of the current luma block to determine the model coefficients. The top template includes reference samples that are located above the down-sampled luma block. The left template includes reference samples that are located left to the down-sampled luma block.
Figure 15:
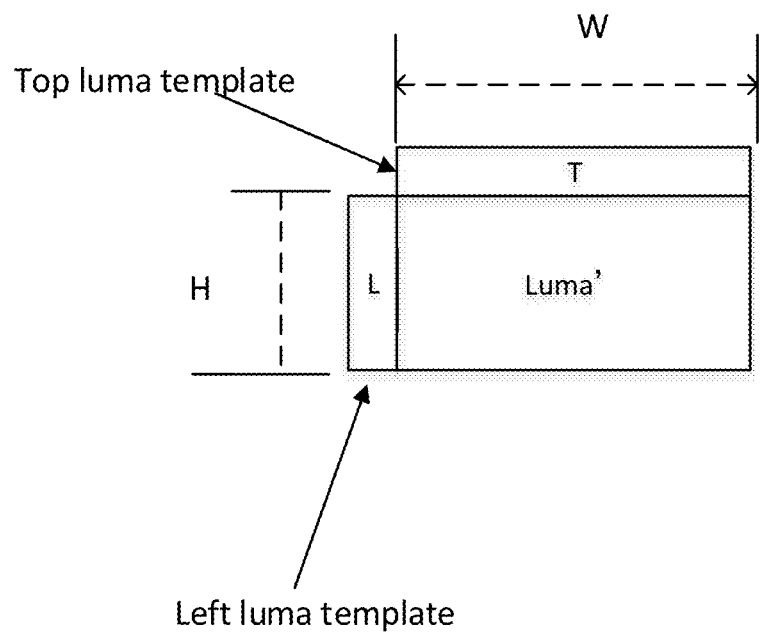
FIG. 15 is a schematic diagram illustrating an example of using a top template that has the same size as the width a down-sampled luma block of the current luma block or a left template that has the same size as the height of the down-sampled luma block of the current luma block to determine the model coefficients.

FIG. 14 is a schematic diagram illustrating an example of reference samples used to determine the maximum and minimum luma values. In the example shown in FIG. 14, the number of reference samples in the top luma template, denoted as W1, is larger than the width of the current chroma block, denoted as W. The number of reference samples in the left luma template, denoted as H1, is larger than the height of the current chroma block, denoted as H. FIG. 15 is a schematic diagram illustrating another example of reference samples used to determine the maximum and minimum luma values. In the example shown in FIG. 15, the number of top luma references samples is equal to the width of current chroma block W and the number of left luma reference samples is equal to the height of current chroma block H.

To summarize, in addition to the LS method, the MaxMin method also can be used for the MDLM mode. In other words, MaxMin method can be used to derive the model coefficients for CCLM_T mode, and CCLM_L mode. Because MaxMin method has a lower computational complexity than the LS method, the proposed method improves the MDLM by reducing its computational complexity. Further, existing MaxMin method uses both top template and left template for the CCLM mode. The proposed method employs either the top template or the left template to derive the model coefficients, which further reduce the computational complexity of the mode.

According to further examples of the technologies presented herein, the reference samples in the template are selected to increase the correlation between the reference samples and the current block. For the top template, up to W2 reference samples will be used. For the left template, up to H2 reference samples will be used. In this way, reference samples that are further than the W2 reference samples in the top template or the H2 reference samples in the left template are not used since they are less correlated with the current block.

Figure 16:
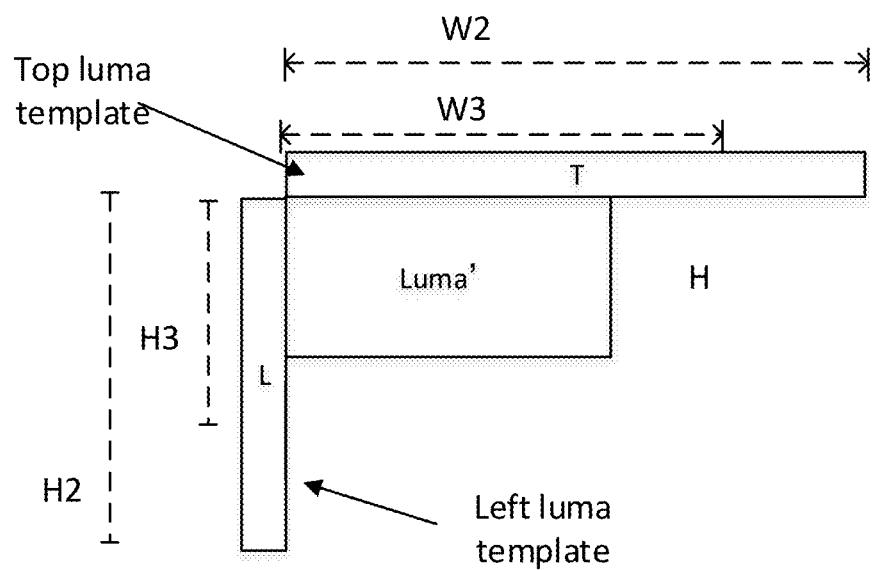
FIG. 16 is a schematic diagram illustrating an example of using available reference samples to determine the model coefficients for intra prediction.

In addition, when the MaxMin method is used to derive the model coefficients, only available reference samples are used and padding is not used to substitute the unavailable reference samples. For example, only available samples in the top luma template will be examined to determine the maximum and minimum luma values for the CCLM_T mode. Because W2 references samples are used in the top template, the number of available samples, denoted as W3, will be equal to or less than W2. Likewise, the available samples in the left luma template will be examined to determine the maximum and minimum values for the CCLM_L mode and the number of available samples, denoted as H3, may be equal to or less than H2. The relationship between W2 and W3 and H2 and H3 are shown in FIG. 16, where W3<=W2 and H3<=H2. In one example, W2=2×W and H2=2×H.

Alternatively, W2 and H2 can each take the value of W+H. In other words, up to W+H reference samples in the top luma template can be used to derive the model coefficients for the CCLM_T mode, and up to W+H reference samples in the left luma template can be used to derive the model coefficients for the CCLM_L mode. Among these reference samples, only available luma template samples in this range (i.e. W+H for both CCLM_T and CCLM_L) will be examined to determine the maximum and minimum luma value. In this example, the available samples in the top luma template (equal to or less than W+H) will be examined to determine the maximum and minimum values for the CCLM_T mode. The available samples in the left luma template (equal to or less than W+H) will be examined to determine the maximum and minimum values for the CCLM_L mode.

Compared with the existing MDLM method where exactly W+H reference samples are used to derive the model coefficients for the CCLM_T mode and the CCLM_L mode, up to 2×W or W+H reference samples are used to derive the model coefficients for CCLM_T mode, and up to 2×H or W+H reference samples are used to derive the model coefficients for CCLM_L mode in the proposed methods. In addition, only available luma reference samples in the examined sample range (2×W or W+H for CCLM_T, and 2×H or W+H for CCLM_L) will be used to determine the maximum and minimum value. In the above proposed methods, determining the maximum and minimum luma values in the luma template can be speed up by sampling the reference samples with a step size of more than 1, such as 2, 4 or another value.

Down-Sampling Method

As discussed above, since the spatial resolution of a luma component of a picture is larger than that of the chroma components, the luma component needs to be down-sampled to the resolution of chroma part for the MDLM mode. For example, for YUV4:2:0 format, the luma component needs to be down-sampled by 4 (width by 2, and height by 2) to match the resolution of the chroma component. A down-sampled luma block that corresponds to a chroma block (which has the same spatial resolution as the chroma block) can be utilized to perform the prediction for the chroma block using the MDLM mode. The size of the down-sampled luma block is equal to the size of the chroma block (because a luma block is down-sampled to the size of chroma block).

Figure 17:
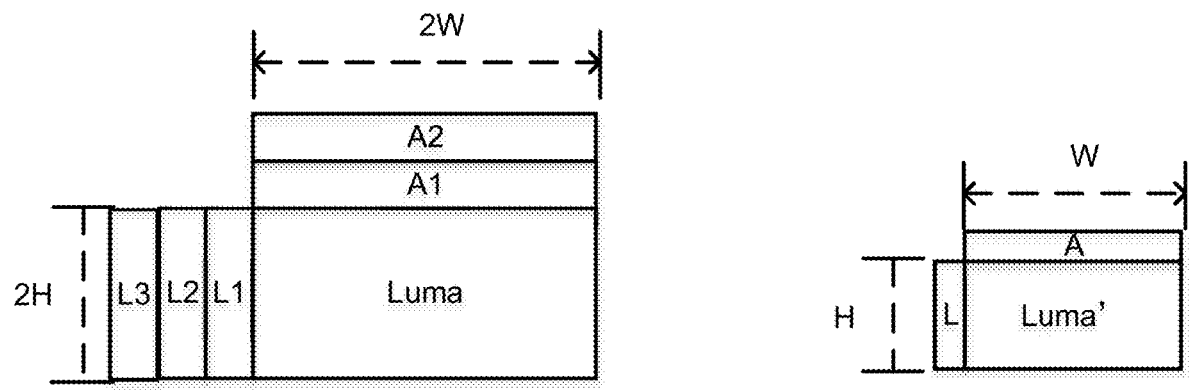
FIG. 17 is a schematic diagram illustrating an example of down-sampling luma samples using multiple rows or columns of neighboring luma samples.

The reference samples in the luma template likewise need to be down-sampled in order to derive the linear model coefficients for the MDLM modes. For the CCLM_T mode, top neighboring reconstructed luma samples are down-sampled to generate reference samples for the top template that correspond to the reference samples in the top chroma template, i.e. the top neighboring reconstructed chroma samples. The down-sampling of the top neighboring reconstructed luma samples typically involves multiple rows of top neighboring reconstructed luma samples. FIG. 17 is a schematic diagram illustrating an example of down-sampling luma samples using multiple rows or columns of neighboring luma samples. As shown in FIG. 17, for a luma block, two top neighboring rows A1 and A2 may be used during the down-sampling to obtain the down-sampled neighboring row A. Denote A[i] as the $i^{th}$ sample in A, A1[i] as the $i^{th}$ sample in A1 and A2[i] as the $i^{th}$ sample in A2, a 6-tap down-sampling filter can be used as following:

$$A[i]=(A2[2i]*2+A2[2i-1]+A2[2i+1]+A1[2i]*2+A1[2i-1]+A1[2i+1]+4)>>3;$$

Figure 18:
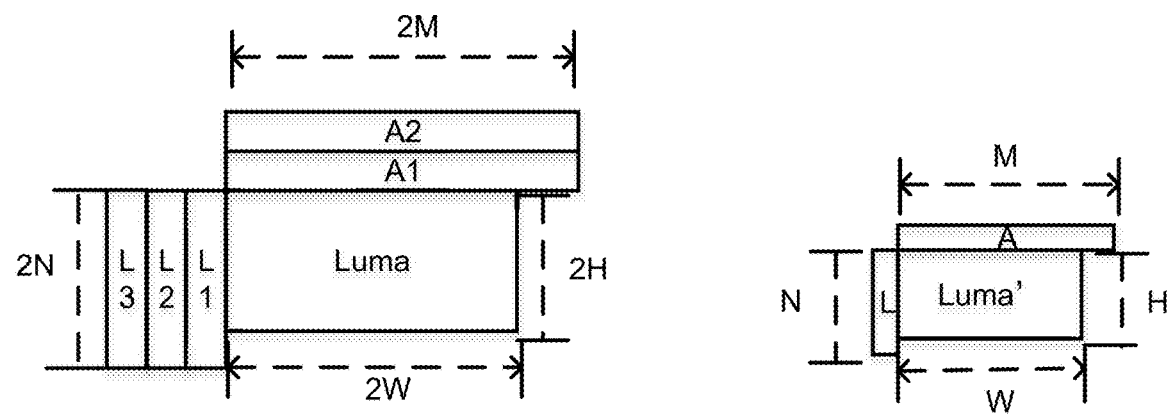
FIG. 18 is a schematic diagram illustrating another example of down-sampling luma samples using multiple rows or columns of neighboring luma samples.

The number of neighboring samples can also be larger than the size of current blocks. For example, as shown in FIG. 18, the number of top neighboring samples of the down-sampled luma block can be M, where M is larger than the width of the down-sampled block, W.

In the existing down-sampling method as described above, multiple rows of top neighboring reconstructed luma samples are used to generate the down-sampled top neighboring reconstructed luma samples. This increases the size of the line buffer when compared with regular intra mode prediction, and thus increases the memory cost.

Figure 19:
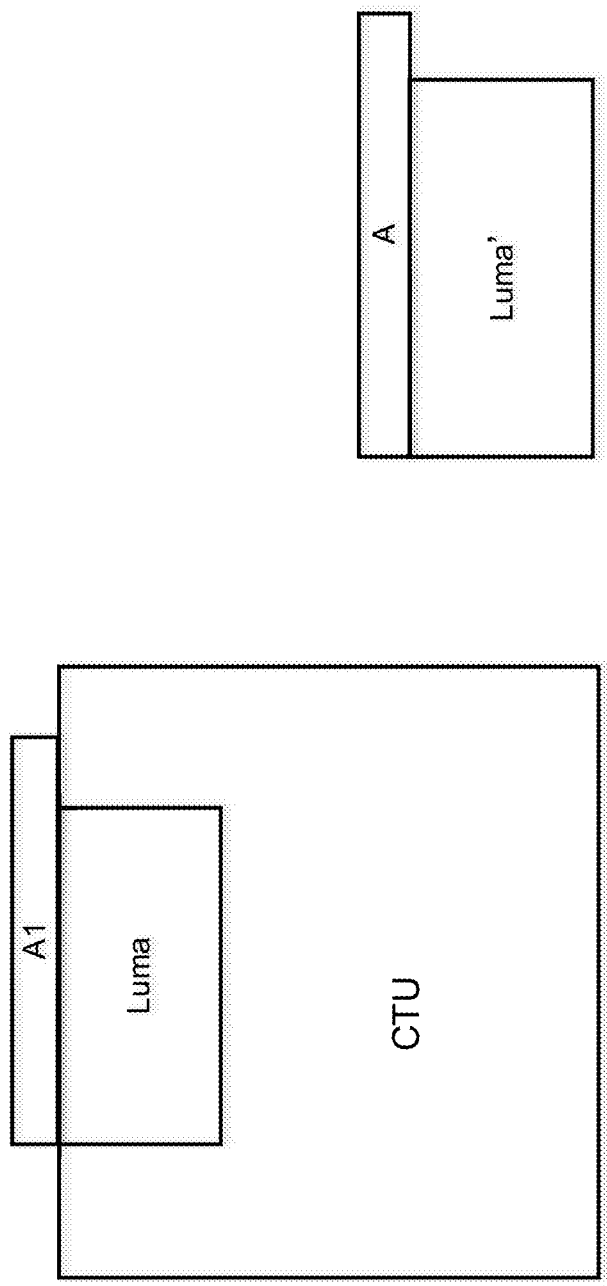
FIG. 19 is a schematic diagram illustrating an example of down-sampling using a single row of neighboring luma sample for a luma block that is at the top boundary of a CTU.

The technologies presented herein reduces the memory usage of down-sampling by employing only one row of top neighboring reconstructed luma samples for CCLM_T mode if the current block is at the top boundary of a current coding tree unit CTU (i.e. a top row of the current chroma block is overlapped with a top row of the current CTU). FIG. 19 is a schematic diagram illustrating an example of down-sampling using a single row of neighboring luma sample for a luma block that is at the top boundary of a CTU. As shown in FIG. 19, only A1 (containing one row of neighboring reconstructed luma samples) is used to generate the down-sampled top neighboring reconstructed luma samples in A.

It should be understood that while the above description focuses on the top neighboring reconstructed luma samples for CCLM_T mode, similar method can be applied to the left neighboring reconstructed luma samples for CCLM_L mode. For example, instead of using multiple columns of left neighboring reconstructed luma samples for down-sampling, a single column of left neighboring reconstructed luma samples are used in down-sampling to generate the reference samples in the left template of the down-sampled luma block, if the current block is at the left boundary of the CTU (i.e. the left row of the current chroma block is overlapped with the left row of the CTU).

Determining Availability of Reference Samples

In the above examples, the luma template is used to determine the availability of reference samples for determining the maximum and minimum luma values. In some scenarios, however, an available luma reference sample does not have a corresponding chroma reference sample. For instance, luma blocks and chroma blocks may be coded separately. It is thus like that when a reconstructed luma block is available, the corresponding chroma block is still not available. As a result, an available luma reference sample does not have a corresponding available chroma reference sample, which might lead to coding errors.

The technologies presented herein address this problem by determining the availability of reference samples in a template via examining the availability of the reference samples in the chroma template. In some examples, a chroma reference sample is available if the chroma reference sample is not outside the current picture, slice or title, and the reference sample has been reconstructed. In some examples, a chroma reference sample is available if the chroma reference sample is not outside the current picture, slice or title, the reference sample has been reconstructed, the reference sample is not omitted based on an encoding decision, and so on. The available reference samples of the current chroma block may be available reconstructed neighboring samples of the chroma block. Luma reference samples corresponding to the available chroma reference samples are utilized to determine the maximum and minimum luma values. For example, if L reference samples in a chroma template are available, then reference samples in the luma template that correspond to the L available chroma reference samples will be used to determine the maximum and minimum luma values. The luma reference sample(s) that corresponds to a chroma reference sample can be determined by identifying a luma reference sample located in the same position in the luma template as the chroma reference sample located in the chroma template (i.e. co-located luma reference sample (position (x, y)), such as the luma reference sample(s) that corresponds to a chroma reference sample may include neighboring luma reference sample (position (x−1, y)), luma reference sample (position (x, y)) and neighboring luma reference sample (position (x+1, y)). The luma reference samples with the maximum and minimum luma values and chroma reference samples that correspond to the luma reference samples associated with the maximum and minimum luma values are then used to determine the model coefficients as described above.

In an example, the L available chroma reference samples may be used to determine the model coefficients, e.g. L=4. In another example, a portion of the L available chroma reference samples or a part of the L available chroma reference samples are used to determine the model coefficients. For instance, a fixed number of available chroma reference samples are selected from the L available chroma reference samples. Luma reference samples that correspond to the selected chroma reference samples are identified and used to determine the model coefficients along with the selected chroma reference samples. For example, if the selected chroma reference samples are four available chroma reference samples, 24 neighboring reconstructed Luma samples that correspond to the four available chroma reference samples are identified. The luma reference samples used to determine the model coefficients are obtained by down-sampling the 24 neighboring reconstructed Luma samples, wherein a 6 tap filter is used for the down-sampling process.

In the example shown in FIG. 16, the top template sample range for the CCLM_T mode is W2. Then, the availability of the reference samples in the top chroma template of the current chroma block is determined. If W3 chroma reference samples are available (W3<=W2), then the corresponding W3 or fewer luma reference samples will be obtained. These obtained luma reference samples and chroma reference samples will be used to derive the model coefficients for the CCLM_T mode.

Similarly, the example shown in FIG. 16 has the left template sample range as H2 for the CCLM_L mode. The availability of the reference samples in the left chroma template of the current chroma block is examined. If H3 chroma reference samples are available (H3<=H2), then the corresponding H3 or fewer luma reference samples will be obtained. These obtained luma reference samples and chroma reference samples will be used to derive the model coefficients for the CCLM_L mode. The availability of the reference samples for the CCLM mode can be determined similarly, i.e. determining the availability of reference samples in both the top and left chroma template and then finding the corresponding luma reference samples to determine the model coefficients as discussed above.

The details of the proposed method are described in Table 1 in the format of the specification of INTRA_CCLM, INTRA_CCLM_L, or INTRA_CCLM_T intra prediction mode. Table 2 shows an alternative implementation of the methods proposed herein.

TABLE 1

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- chroma neighbouring samples p[ x ][ y ].

TABLE 1-continued

- If predModeIntra equal to INTRA_CCLM, x = −1, y = 0..nTbH − 1 and x = 0..nTbW − 1, y = −1.
- Otherwise, if predModeIntra equal to INTRA_CCLM_L, x = −1, y = 0..nTbH *2− 1.
- Otherwise, if predModeIntra equal to INTRA_CCLM_T, x = 0..nTbW *2 − 1, y = − 1.

Output of this process are predicted samples predSamples[ x ][ y ], with x = 0..nTbW − 1, y = 0..nTbH − 1.
The current luma location ( xTbY, yTbY ) is derived as follows:

$$( xTbY, yTbY ) = ( xTbC << 1, yTbC << 1 ) \qquad (1)$$

The variables availL, availT and availTL are derived as follows:
- The availability of left neighbouring samples derivation process for a block is invoked with the current chroma location ( xCurr, yCurr ) set equal to ( xTbC, yTbC ) and the neighbouring chroma location (xTbC − 1, yTbC ) as inputs, and the output is assigned to availL.
- The availability of top neighbouring samples derivation process for a block is invoked with the current chroma location ( xCurr, yCurr ) set equal to ( xTbC, yTbC ) and the neighbouring chroma location (xTbC , yTbC − 1) as inputs, and the output is assigned to availT.
- The availability of top-left neighbouring samples derivation process for a blockis invoked with the current chroma location ( xCurr, yCurr ) set equal to ( xTbC, yTbC ) and the neighbouring chroma location ( xTbC − 1, yTbC − 1 ) as inputs, and the output is assigned to availTL.
- If predModeIntra equal to INTRA_CCLM_T, the number of available top-right neighbouring samples derivation process for a block is invoked with the current chroma location ( xCurr, yCurr ) set equal to ( xTbC, yTbC ) and the nTbW as inputs, and the output is assigned to nSampTopRight, to get the number of available samples in the range of (xTbC+ nTbW, yTbC-1 ) to ( xTbC+ 2*nTbW-1, yTbC-1 ) Otherwise, nSamplesTopRight is 0.
- If predModeIntra equal to INTRA_CCLM_L, the number of available left-below neighbouring samples derivation process for a block is invoked with the current chroma location ( xCurr, yCurr ) set equal to ( xTbC, yTbC ) and the nTbH as inputs, and the output is assigned to nSampLeftBelow. To get the number of available samples in the range of (xTbC- 1, yTbC+ nTbH) to ( xTbC -1, yTbC+2* nTbH -1 ) .Otherwise, nSampLeftBelow is 0.

The number of available neighbouring chroma samples on the top and top-right is nTopSamp, and the number of available neighbouring chroma samples on the left and left-below is nLeftSamp , which are derived as follows:
- If predModeIntra equal to INTRA_CCLM:

$$nTopSamp = ( availT ? nTbW : 0 ) \qquad (2)$$
$$nLeftSamp = ( availL ? nTbH : 0 ) \qquad (3)$$

- Otherwise, if predModeIntra equal to INTRA_CCLM_L:

$$nTopSamp = 0 \qquad (4)$$
$$nLeftSamp = ( availL ? nTbH + nSampLeftBelow : 0 ) \qquad (5)$$

- Otherwise, if predModeIntra equal to INTRA_CCLM_T:

$$nTopSamp = ( availT ? nTbW + nSampTopRight: 0 ) \qquad (6)$$
$$nLeftSamp = 0 \qquad (7)$$

The prediction samples predSamples[ x ][ y ] withx = 0..nTbW − 1, y = 0..nTbH − 1 are derived as follows:
- If both nTopSamp and nLeftSamp are equal to0, the following applies:

$$predSamples[ x ][ y ] = 1 << ( BitDepthC − 1 ) \qquad (8)$$

- Otherwise, the following ordered steps apply:
  1. The collocated luma samples pY[ x ][ y ] with x = 0..nTbW * 2 − 1, y= 0..nTbH * 2 − 1 are set equal to the reconstructed luma samples prior to the deblocking filter process at the locations ( xTbY + x, yTbY + y ).
  2. The neighbouring luma samples samples pY[ x ][ y ] are derived as follows:
     - The neighbouring left luma samples pY [ x ][ y ] with x = −1..−3, y = 0..2 * nLeftSamp − 1, are set equal to the reconstructed luma samples prior to the deblocking filter process at the locations ( xTbY + x , yTbY +y ).
     - The neighbouring top luma samples pY[ x ][ y ] with x = 0..2 * nTopSamp − 1, y = −1, −2, are set equal to the reconstructed luma samples prior to the deblocking filter process at the locations ( xTbY+ x, yTbY + y ).
     - When availTL is equal to TRUE, the neighbouring top-left luma samples pY[ x ][ y ] with x = −1, y = −1, −2, are set equal to the reconstructed luma samples prior to the deblocking filter process at the locations ( xTbY+ x, yTbY + y ).
  3. The down-sampled collocated luma samples pDsY[ x ][ y ] with x = 0..nTbW − 1, y = 0..nTbH − 1 are derived as follows:
     - pDsY[ x ][ y ] with x = 1..nTbW − 1, y = 0..nTbH − 1 is derived as follows:

$$pDsY[ x ][ y ] = ( pY[ 2 * x − 1 ][2 * y ] + pY[ 2 * x − 1 ][2 * y + 1 ] + 2* pY[ 2 * x ][ 2 * y ] + 2*pY[ 2 * x ][ 2 * y + 1 ] + pY[ 2 * x + 1 ][ 2 * y ] + pY[ 2 * x + 1 ][ 2 * y + 1 ] + 4 ) >> 3 \qquad (9)$$

- If availL is equal to TRUE, pDsY[ 0 ][ y ] with y = 0..nTbH − 1 is derived as follows:

$$pDsY[ 0 ][ y ] = ( pY[ −1 ][ 2 * y ] + pY[ −1][2 * y + 1 ] + 2* pY[ 0 ][ 2*y ] + 2*pY[ 0 ][ 2*y + 1 ] + pY[ 1 ][ 2 * y ] + pY[ 1 ][ 2 * y + 1 ] + 4 ) >> 3 \qquad (10)$$

- Otherwise, pDsY[ 0 ][ y ] with y = 0..nTbH - 1 is derived as follows:

$$pDsY[ 0 ][ y ] = ( pY[ 0 ][ 2 * y ] + pY[ 0 ][ 2 * y + 1 ] + 1 ) >> 1 \qquad (11)$$

4. The down-sampled neighbouring left luma samples pLeftDsY[ y ] with y = 0..nLeftSamp − 1 are derived as follows:

$$pLeftDsY[ y ] = ( pY[ −1 ][ 2 * y ] + pY[ −1 ][ 2 * y + 1 ] + 2* pY[ −2 ][ 2 * y ] + 2*pY [ −2 ][ 2 * y + 1 ] + pY[ −3 ][ 2 * y ] + pY[ −3 ][ 2 * y + 1 ] + 4 ) >> 3 \qquad (12)$$

5. The down-sampled neighbouring top luma samples pTopDsY[ x ] with x = 0..nTopSamp − 1 are specified as follows:
     - pTopDsY[ x ] with x = 1..nTbW − 1 is derived as follows:

$$pTopDsY[ x ] = ( pY[ 2 * x − 1 ][ −2 ] + pY[ 2 * x − 1 ][ −1 ] + 2* pY[ 2 * x ][ −2 ] + 2*pY[ 2 * x ][ −1 ] + \qquad (13)$$

TABLE 1-continued pY[ 2 * x + 1 ][ -2 ] + pY[ 2 * x + 1 ][ -1 ] + 4 ) >> 3
- If availTL is equal to TRUE, pTopDsY[ 0 ] is derived as follows:
  pTopDsY[ 0 ] = ( pY[ -1 ][ -2 ] + pY[ -1 ][ -1 ] +
  2*pY[ 0 ][ -2 ] + 2*pY[ 0 ][ -1 ] +                                          (14)
  pY[ 1 ][ -2 ] + pY[ 1 ][ -1 ] + 4 ) >> 3
- Otherwise, pTopDsY[ 0 ] is derived as follows:
  pTopDsY[ 0 ] = ( pY[ 0 ][ -2 ] + pY[ 0 ][ -1 ] + 1 ) >> 1                    (15)

6. The variables nS, xS, yS, k0, k1 are derived as follows:
   - If predModeIntra equal to INTRA_CCLM:
     nS = ( ( availL && availT ) ? Min( nTbW, nTbH ) : ( availL ? nTbH : nTbW ) )
     xS = 1 << ( ( ( nTbW > nTbH ) && availL && availT ) ? ( Log2( nTbW ) - Log2( nTbH ) ) : 0 )
     yS = 1 << ( ( ( nTbH > nTbW ) && availL && availT ) ? ( Log2( nTbH ) - Log2( nTbW ) ) : 0 )
   - Otherwise, if predModeIntra equal to INTRA_CCLM_L:
     nS = nLeftSamp
     xS = 1
     yS = 1
   - Otherwise, if predModeIntra equal to INTRA_CCLM_T:
     nS = nTopSamp
     xS = 1
     yS = 1

7. The variables MinLuma, MaxLuma, ChromaForMinLuma and ChromaForMaxLuma are derived as follows:
   - The variable MinLuma is set equal to 1 << (BitDepth$_Y$) +1 and the variable MaxLuma is set equal to -1
   - If availT is equal to TRUE, the variables MinLuma, MaxLuma, ChromaForMinLuma and ChromaForMaxLuma with x = 0..nS - 1 are derived as follows:
     - If ( MinLuma > pTopDsY[ x * xS ] ), the following applies:
       MinLuma = pTopDsY[ x * xS ]
       ChromaForMinLuma = p[ x * xS ][ -1 ]
     - If (MaxC < pTopDsY[ x * xS ]), the following applies:
       MaxLuma = pTopDsY[ x * xS ]
       ChromaForMaxLuma = p[ x * xS ][ -1 ]
   - If availL is equal to TRUE, the variables MinLuma, MaxLuma, ChromaForMinLuma and ChromaForMaxLuma with y = 0..nS - 1 are derived as follows:
     - If (MinLuma > pTopDsY[ y * yS ]), the following applies:
       MinLuma = pTopDsY[ y * yS ]
       ChromaForMinLuma = p[ -1 ][ y * yS ]
     - If (MaxLuma < pTopDsY[ y * yS ]), the following applies:
       MaxLuma = pTopDsY[ y * yS ]
       ChromaForMaxLuma = p[ -1 ][ y * yS ]

8. The variables a, b, and k are derived as follows:
   shift = (BitDepthC > 8) ? BitDepthC - 9 : 0
   add = shift ? 1 << (shift - 1): 0
   diff = (MaxLuma - MinLuma + add) >> shift
   k = 16
   - If (diff > 0)
     div = ((ChromaForMaxLuma - ChromaForMinLuma) * (Floor((65536 * 65536) /
     diff) - Floor(65536 / diff) * 65536) + 32768) >> 16                       (16)
     a = (((ChromaForMaxLuma - ChromaForMinLuma) * Floor(65536 / diff) + div +
     add) >> shift)                                                            (17)
   - Otherwise
     a = 0
   b = ChromaForMinLuma - ((a * MinLuma) >> k)                                  (18)

9. The prediction samples predSamples[ x ][ y ] with x = 0..nTbW - 1, y = 0.. nTbH - 1 are derived as follows:
   predSamples[ x ][ y ] = Clip1C( ( ( pDsY[ x ][ y ] * a ) >> k ) + b )        (19)

TABLE 2

Inputs to this process are:
- the intra prediction mode predModeIntra,
- a sample location (xTbC, yTbC) of the top-left sample of the current transform block relative to the top-left sample of the current picture,
- a variable nTbW specifying the transform block width,
- a variable nTbH specifying the transform block height,
- chroma neighbouring samples p[x][y]
  - If predModeIntra equal to INTRA_CCLM, x = -1, y = 0..nTbH - 1 and
    x = 0..nTbW - 1, y = - 1.
  - Otherwise, if predModeIntra equal to INTRA_CCLM_L, x = -1, y = 0..nTbH + nTbW- 1.
  - Otherwise, if predModeIntra equal to INTRA_CCLM_T, x = 0.. nTbH + nTbW - 1, y = - 1.
- If predModeIntra equal to INTRA_CCLM_T, the number of available top-right neighbouring samples derivation process for a block is invoked with the current chroma location ( xCurr, yCurr ) set equal to ( xTbC, yTbC ) and the nTbH+ nTbW as inputs, and

TABLE 2-continued the output is assigned to nSampTopRight. to get the number of available samples in the range of ( xTbC+ nTbW, yTbC-1 ) to ( xTbC+ nTbW+ nTbH -1, yTbC-1 ) .Otherwise, nSamplesTopRight is 0.
If predModeIntra equal to INTRA_CCLM_L, the number of available left-below neighbouring samples derivation process for a block is invoked with the current chroma location ( xCurr, yCurr ) set equal to ( xTbC, yTbC ) and the nTbH+ nTbW as inputs, and the output is assigned to nSampLeftBelow. To get the number of available samples in the range of ( xTbC-1, yTbC+ nTbH) to (xTbC -1, yTbC+ nTbW+ nTbH -1 ). Otherwise, nSampLeftBelow is 0.

Binarization of MDLM Modes

In order to encode the MDLM mode in the bitstream of a video signal, binarization of the MDLM modes need to be performed so that the selected MDLM mode can be encoded in the bitstream and the decoder can determine the selected mode for decoding. The existing binarization method has not included the two chroma modes of MDLM, namely, CCLM_L and CCLM_T. Here, a new chroma mode coding method is proposed.

Tables 3 and 4 provide the details of the binarization of these two chroma modes. In Table 3, 77 indicate the CCLM mode and intra chromapred mode index is 4; 78 indicates CCLM_L mode and the intra chromapred mode index is 5; 79 indicates the CCLM_T mode and the intra chromapred mode index is 6. If intra chromapred mode index equals to 7, the selected mode is a DM mode. The remaining indexes values 0, 1, 2, 3 represents the planar mode, the vertical mode, the horizontal mode and the DC mode, respectively.

TABLE 3

Specification of IntraPredModeC[xCb][yCb] depending on intra_chroma_pred_mode[xCb][yCb] and IntraPredModeY [xCb][yCb] when sps_cclm_enabled_flag is equal to 1

| intra_chroma_pred_mode | IntraPredModeY[xCb][yCb] | | | | |
|---|---|---|---|---|---|
| [xCb][yCb] | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 77 | 77 | 77 | 77 | 77 |
| 5 | 78 | 78 | 78 | 78 | 78 |
| 6 | 79 | 79 | 79 | 79 | 79 |
| 7 | 0 | 50 | 18 | 1 | X |

TABLE 4

An example of binarization for intra_chroma_pred_mode when sps_cclm_enabled_flag is equal to 1

| Value of intra_chroma_pred_mode | Bin string |
|---|---|
| 7 | 0 |
| 4 | 10 |
| 5 | 1110 |
| 6 | 1111 |
| 0 | 11000 |
| 1 | 11001 |
| 2 | 11010 |
| 3 | 11011 |

Table 4 shows an example of the bit strings or syntax elements used for each of the chroma intra-prediction modes. As shown in Table 4, the syntax element for the DM mode (with index 7) is 0; the syntax element for the CCLM mode (with index 4) is 10; the syntax element for the CCLM_L mode (with index 5) is 1110; the syntax element for the CCLM_T mode (with index 6) is 1111; the syntax element for the Planar mode (with index 0) is 11000; the syntax element for the vertical mode (with index 1) is 11001; the syntax element for the horizontal mode (with index 2) is 11010; and the syntax element for the DC mode (with index 3) is 11011. Table 5 shows another example of the bit strings or syntax elements used for each of the chroma intra-prediction modes. Depending on the coding mode selected by the encoder, the corresponding syntax element is included in the bitstream of the encoded video.

TABLE 5

Another example of binarization for intra_chroma_pred_mode when sps_cclm_enabled_flag is equal to 1

| Value of intra_chroma_pred_mode | Bin string |
|---|---|
| 7 | 00 |
| 4 | 10 |
| 5 | 110 |
| 6 | 111 |
| 0 | 0100 |
| 1 | 0101 |
| 2 | 0110 |
| 3 | 0111 |

When a video encoder, such as the video encoder 20 in FIG. 1 performs intra prediction for a chroma block of the video signal based on an intra chroma prediction mode, the video encoder selects an intra chroma predication mode and generates a bitstream for the video signal by including the syntax element indicating the selected intra chroma prediction mode into the bitstream. The video encoder can select the intra chroma prediction mode from multiple sets of modes. For example, the modes can include a first set of modes containing the derived mode (DM) or a cross component linear model (CCLM) prediction mode, or both. The modes can also include a second set of modes containing at least one of a CCLM_L mode or a CCLM_T mode. The modes can further include a third set of modes which may include at least one of a vertical mode, a horizontal mode, a DC mode or a Planar mode.

In some examples, the number of bits of the syntax element of the intra chroma prediction mode if the intra chroma prediction mode is selected from the first set of modes is smaller than the number of bits of the syntax element if the intra chroma prediction mode is selected from the second set of modes. Further, the number of bits of the syntax element of the intra chroma prediction mode if the intra chroma prediction mode is selected from the second set of modes is smaller than the number of bits of the syntax element if the intra chroma prediction mode is selected from the third set of modes. In some examples, the syntax elements for the various intra chroma prediction modes are selected according to the examples shown in Table 4 or Table 5.

When a decoder receives the encoded bitstream of a video signal to decode the video, the decoder, such as the video decoder 30 in FIG. 1, parses the syntax elements from the bitstream of the video signal and determines the intra chroma prediction mode used for a chroma block based on a syntax element selected from the parsed syntax elements. Based on the determined intra chroma prediction mode, the decoder performs intra prediction for the current chroma block of the video signal.

Figure 20:
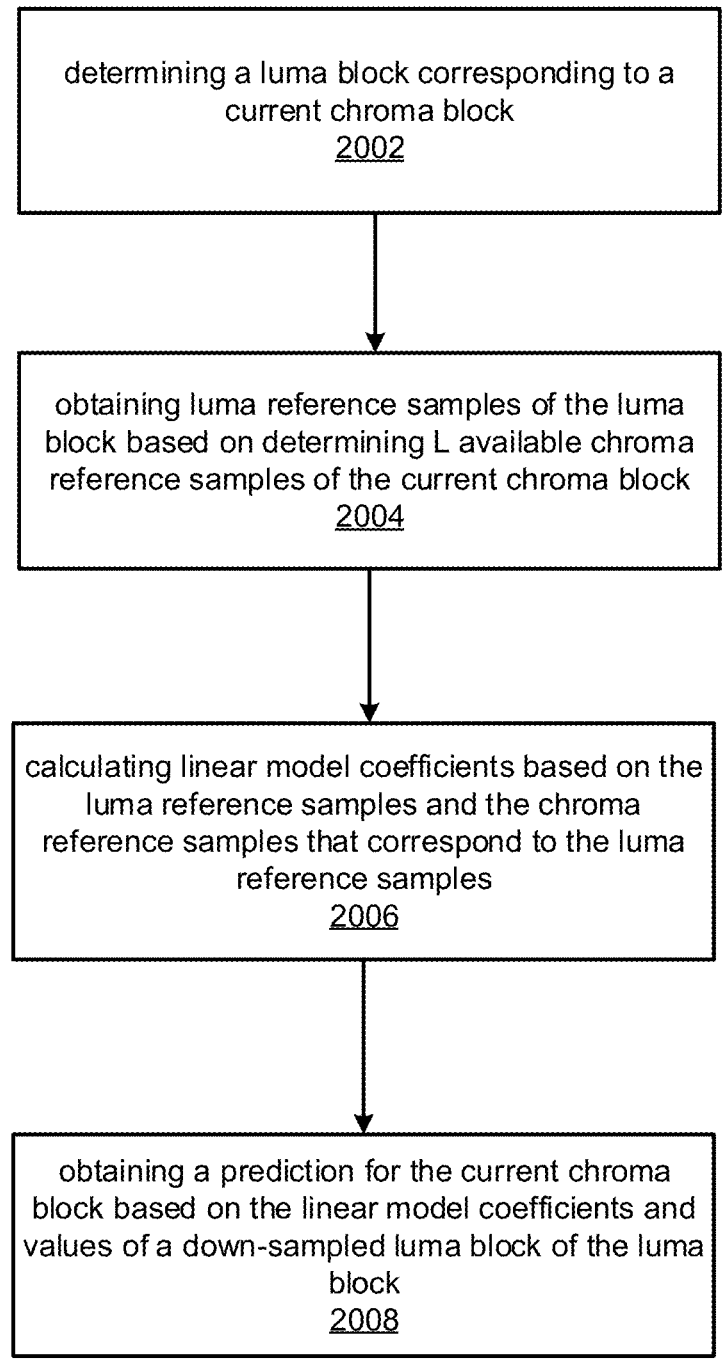
FIG. 20 is a flowchart of a method for performing intra prediction using a linear model according to some aspects of the present disclosure.

FIG. 20 is a flowchart of a method for performing intra prediction using a linear model according to some aspects of the present disclosure. At block 2002, a luma block (such as luma block 811) that corresponds to a current chroma block (such as chroma block 801) is determined.

At block 2004, luma reference samples of the luma block are obtained based on determining L available chroma reference samples of the current chroma block. The obtained luma reference samples of the luma block are down-sampled luma reference samples. In some examples, the obtained luma reference samples of the luma block are down-sampled luma reference samples obtained by down-sampling neighboring luma samples that are selected based on the L available chroma reference samples (such as, based on a part or a whole of the L available chroma reference samples). In other words, the obtained luma reference samples of the luma block are down-sampled luma reference samples obtained by down-sampling neighboring luma samples that correspond to the available chroma reference samples. In some examples, the obtained luma reference samples correspond to the L available chroma reference samples. In additional examples, the obtained luma reference samples correspond to a portion of the L available chroma reference samples. It can be understood that the correspondence between the obtained luma reference samples (i.e. the down-sampled luma reference samples) and the L available chroma reference samples" may be not limited to "one-to-one correspondence", it also can be understood that the correspondence between the obtained luma reference samples (i.e. the down-sampled luma reference samples) and the L available chroma reference samples" may be "M-to-N correspondence". For example, M=4, N=4, or M=4, N>4.

In some examples, the chroma reference samples of the current chroma block comprises neighboring reconstructed samples of the current chroma block. The L available chroma reference samples are determined from the neighboring reconstructed samples. Likewise, the neighboring samples of the luma block are also neighboring reconstructed samples of the luma block. The obtained luma reference samples of the luma block are obtained by down-sampling the neighboring reconstructed samples that are selected based on the L available chroma reference samples. Such as L=4.

In some examples, a chroma reference sample is available if the chroma reference sample is not outside the current picture, slice or title and the reference sample has been reconstructed. In some examples, a chroma reference sample is available if the chroma reference sample is not outside the current picture, slice or title, the reference sample has been reconstructed, the reference sample is not omitted based on an encoding decision, and so on. The available reference samples of the current chroma block may be available reconstructed neighboring samples of the chroma block. Luma reference samples corresponding to the available chroma reference samples are obtained.

In some examples, the L available chroma reference samples are determined by determining L top neighboring chroma samples of the current chroma block are available, where 1<=L<=W2 and L and W2 are positive integer. W2 indicates a top reference sample range, and L top neighboring chroma samples are used as the available chroma reference samples. In some examples, W2 equals to either 2*W or W+H. Here, W represents the width of the current chroma block and H represents the height of the current chroma block.

In other examples, the L available chroma reference samples are determined by determining L left neighboring chroma samples of the current chroma block that are available. Here, 1<=L<=H2 and L and H2 are positive integer. H2 indicates a left reference sample range. The L left neighboring chroma samples are used as the available chroma reference samples. In some examples, H2 equals to either 2*H or W+H. W represents a width of the current chroma block and H represents a height of the current chroma block.

In further examples, the L available chroma reference samples are determined by determining L1 top neighboring chroma samples and L2 left neighboring chroma samples of the current chroma block that are available. Here, 1<=L1<=W2, and 1<=L2<=H2. W2 indicates a top reference sample range, and H2 indicates a left reference sample range. L1, L2, W2 and H2 are positive integer and L1+L2=L. In these examples, the L1 top neighboring chroma samples and the L2 left neighboring chroma samples are used as the available chroma reference samples.

In one example, the luma reference samples are obtained by down-sampling only the neighboring samples that are above the luma block and that are selected based on the L available chroma reference samples. In another example, the luma reference samples are obtained by down-sampling only the neighboring samples that are left to the luma block and that are selected based on the L available chroma reference samples.

In the above examples, the down-sampled luma block of the luma block is obtained by down-sampling a reconstructed luma block of the luma block that corresponds to the current chroma block. In some cases, such as when the luma reference samples are obtained based on only neighboring samples above the luma block and when a top row of the current chroma block is overlapped with a top row of a current coding tree unit (CTU), only one row of neighboring reconstructed luma samples of the reconstructed version of the luma block are used to obtain the luma reference samples.

At block 2006, the linear model coefficients used for cross-component prediction are calculated based on the luma reference samples obtained at step 2004 and chroma reference samples that correspond to the luma reference samples. In some examples, the chroma reference samples that correspond to the luma reference samples are chroma reference samples that are co-located with the luma reference samples.

At block 2008, a prediction of the current chroma block is generated based on the calculated linear model coefficients and the values of a down-sampled luma block obtained by down-sampling the luma block (such as the luma block 811).

Figure 21:
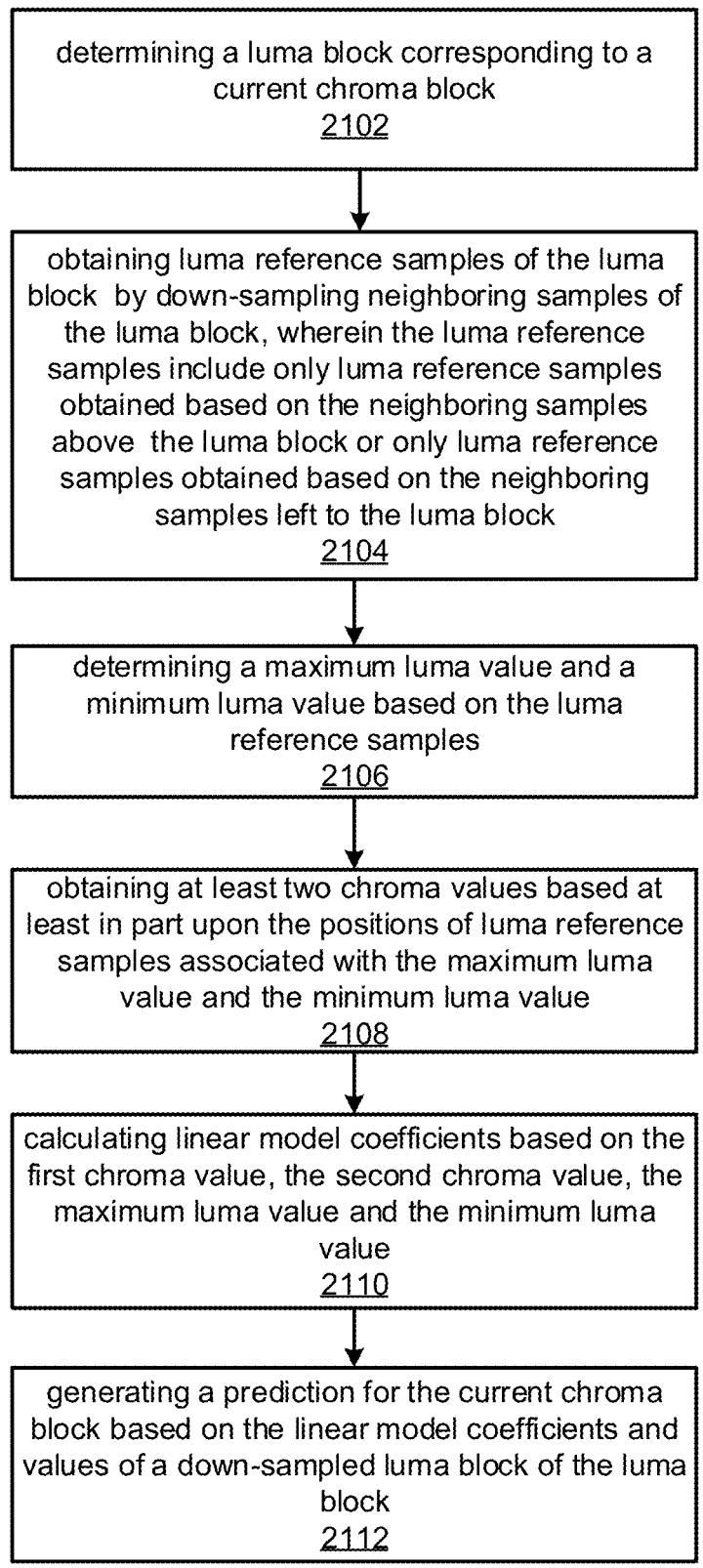
FIG. 21 is a flowchart of a method for performing intra prediction using a linear model according to other aspects of the present disclosure.

FIG. 21 is a flowchart of a method of a cross-component linear model (CCLM) prediction according to other aspects of the present disclosure. At block 2102, a luma block (such as luma block 811) that corresponds to a current chroma block (such as chroma block 801) is determined.

At block 2104, luma reference samples of the luma block are obtained by down-sampling neighboring samples of the luma block. In some examples, the luma reference samples include only luma reference samples obtained based on the neighboring samples above the luma block. In other examples, the luma reference samples include only luma reference samples obtained based on the neighboring samples left to the luma block.

At block 2106, a maximum luma value and a minimum luma value are determined based on the luma reference samples.

At block 2108, a first chroma value is obtained based at least in part upon one or more positions of one or more luma reference samples associated with the maximum luma value. A second chroma value is also obtained based at least in part upon one or more positions of one or more luma reference samples associated with the minimum luma value.

At block 2110, linear model coefficients are calculated based on the first chroma value, the second chroma value, the maximum luma value and the minimum luma value.

At block 2112, a prediction for the current chroma block is generated based on the linear model coefficients and values of a down-sampled luma block of the luma block.

Figure 22:
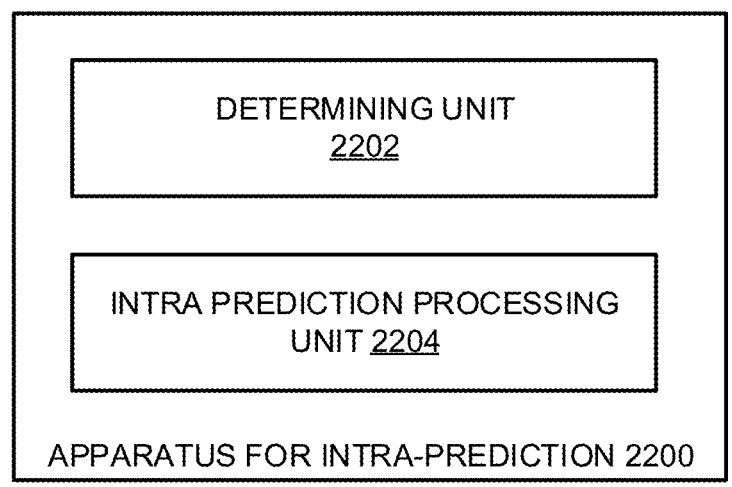
FIG. 22 is a block diagram showing an example structure of an apparatus for performing intra prediction using a linear model.

FIG. 22 is a block diagram showing an example structure of an apparatus 2200 for performing intra prediction using a linear model. The apparatus 2200 may include a determining unit 2202 and an intra prediction processing unit 2204. In an example, the apparatus 2200 may be corresponding to the intra prediction unit 254 in FIG. 2. In another example, the apparatus 2200 may be corresponding to the intra prediction unit 354 in FIG. 3.

The determining unit 2202 is configured to determine a luma block (such as block 811) corresponding to a current chroma block (such as chroma block 801). The determining unit 2202 is further configured to obtain luma reference samples of the luma block based on determining L available chroma reference samples of the current chroma block. The obtained luma reference samples of the luma block are down-sampled luma reference samples.

In some examples, the chroma reference samples of the current chroma block comprises neighboring reconstructed samples of the current chroma block. The L available chroma reference samples are determined from the neighboring reconstructed samples. Likewise, the neighboring samples of the luma block are also neighboring reconstructed samples of the luma block. The obtained luma reference samples of the luma block are obtained by down-sampling the neighboring reconstructed samples of the luma block. In some examples, the obtained luma reference samples of the luma block are down-sampled luma reference samples obtained by down-sampling the neighboring reconstructed samples of the luma block that are selected based on the L available chroma reference samples. In some examples, the obtained luma reference samples of the luma block are down-sampled luma reference samples obtained by down-sampling the neighboring reconstructed samples that correspond to the L available chroma reference samples.

In some examples, a chroma reference sample is available if the chroma reference sample is not outside the current picture, slice or title, the reference sample has been reconstructed, the reference sample is not omitted based on an encoding decision, and so on. The available reference samples of the current chroma block may be available reconstructed neighboring samples of the chroma block. Luma reference samples corresponding to the available chroma reference samples are obtained.

In some examples, the L available chroma reference samples are determined by determining L top neighboring chroma samples of the current chroma block are available, where $1 \leq L \leq W2$ and L and W2 are positive integer. W2 indicates a top reference sample range, and L top neighboring chroma samples are used as the available chroma reference samples. In some examples, W2 equals to either $2*W$ or $W+H$. Here, W represents the width of the current chroma block and H represents the height of the current chroma block.

In other examples, the L available chroma reference samples are determined by determining L left neighboring chroma samples of the current chroma block that are available. Here, $1 \leq L \leq H2$ and L and H2 are positive integer. H2 indicates a left reference sample range. The L left neighboring chroma samples are used as the available chroma reference samples. In some examples, H2 equals to either $2*H$ or $W+H$. W represents a width of the current chroma block and H represents a height of the current chroma block.

In further examples, the L available chroma reference samples are determined by determining L1 top neighboring chroma samples and L2 left neighboring chroma samples of the current chroma block that are available. Here, $1 \leq L1 \leq W2$, and $1 \leq L2 \leq H2$. W2 indicates a top reference sample range, and H2 indicates a left reference sample range. L1, L2, W2 and H2 are positive integer and $L1+L2=L$. In these examples, the L1 top neighboring chroma samples and the L2 left neighboring chroma samples are used as the available chroma reference samples.

In one example, the luma reference samples are obtained by down-sampling only the neighboring samples that are above the luma block and that are selected based on the L available chroma reference samples. In another example, the luma reference samples are obtained by down-sampling only the neighboring samples that are left to the luma block and that are selected based on the L available chroma reference samples.

In the above examples, the down-sampled luma block of the luma block is obtained by down-sampling a reconstructed luma block of the luma block that corresponds to the current chroma block. In some cases, such as when the luma reference samples are obtained based on only neighboring samples above the luma block and when a top row of the current chroma block is overlapped with a top row of a current coding tree unit (CTU), only one row of neighboring reconstructed luma samples of the reconstructed version of the luma block are used to obtain the luma reference samples.

The intra prediction processing unit 2204 is configured to calculate linear model coefficients (such as $\alpha$ and $\beta$) based on the luma reference samples and chroma reference samples that correspond to the luma reference samples. The intra prediction processing unit 2204 is further configured to obtain a prediction for the current chroma block based on the linear model coefficients and values of a down-sampled luma block of the luma block.

Figure 23:
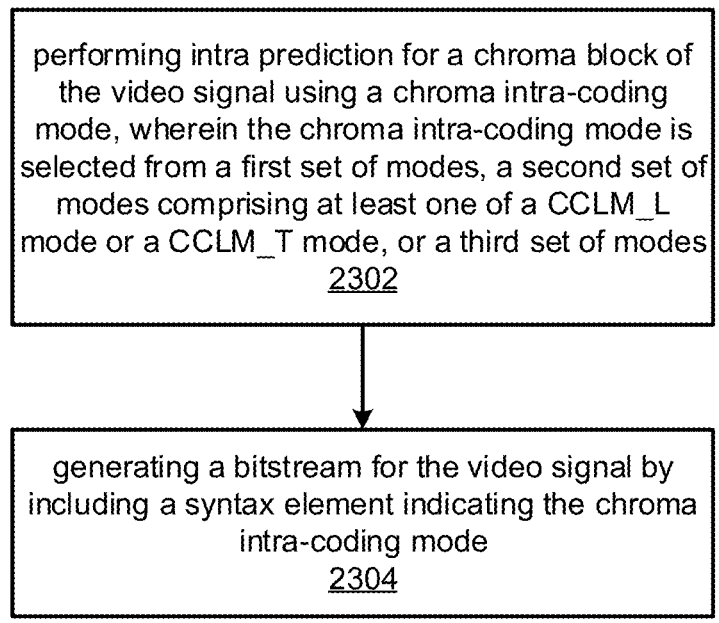
FIG. 23 is a flowchart of a method of coding a chroma intra-coding mode in a bitstream for a video signal according to some aspects of the present disclosure.

FIG. 23 is a flowchart of a method of coding a chroma intra-coding mode in a bitstream for a video signal according to some aspects of the present disclosure.

At block 2302, intra prediction for a chroma block of the video signal is performed based on an intra chroma prediction mode. The intra chroma prediction mode can be selected from multiple modes. In some examples, the multiple modes includes three sets: a first set of modes including at least one of a derived mode (DM) or a cross component linear model (CCLM) prediction mode, a second set of modes comprising at least one of a CCLM_L mode or a CCLM_T mode, or a third set of modes including at least one of a vertical mode, a horizontal mode, a DC mode or a Planar mode.

At block 2304, a bitstream for the video signal is generated by including a syntax element indicating the intra chroma prediction mode into the bitstream. In some examples, the number of bits of the syntax element if the intra chroma prediction mode is selected from the first set of modes is smaller than the number of bits of the syntax element if the intra chroma prediction mode is selected from the second set of modes. The number of bits of the syntax element if the intra chroma prediction mode is selected from the second set of modes is smaller than the number of bits of the syntax element if the intra chroma prediction mode is selected from the third set of modes.

In one example, the syntax element for the DM mode is 0. The syntax element for the CCLM mode is 10. The syntax element for the CCLM_L mode is 1110. The syntax element for the CCLM_T mode is 1111. The syntax element for the Planar mode is 11000. The syntax element for the Vertical mode is 11001. The syntax element for the Horizontal mode is 11010. The syntax element for the DC mode is 11011.

In another example, the syntax element for the DM mode is 00. The syntax element for the CCLM mode is 10. The syntax element for the CCLM_L mode is 110. The syntax element for the CCLM_T mode is 111. The syntax element for the Planar mode is 0100. The syntax element for the Vertical mode is 0101. The syntax element for the Horizontal mode is 0110. The syntax element for the DC mode is 0111.

Figure 24:
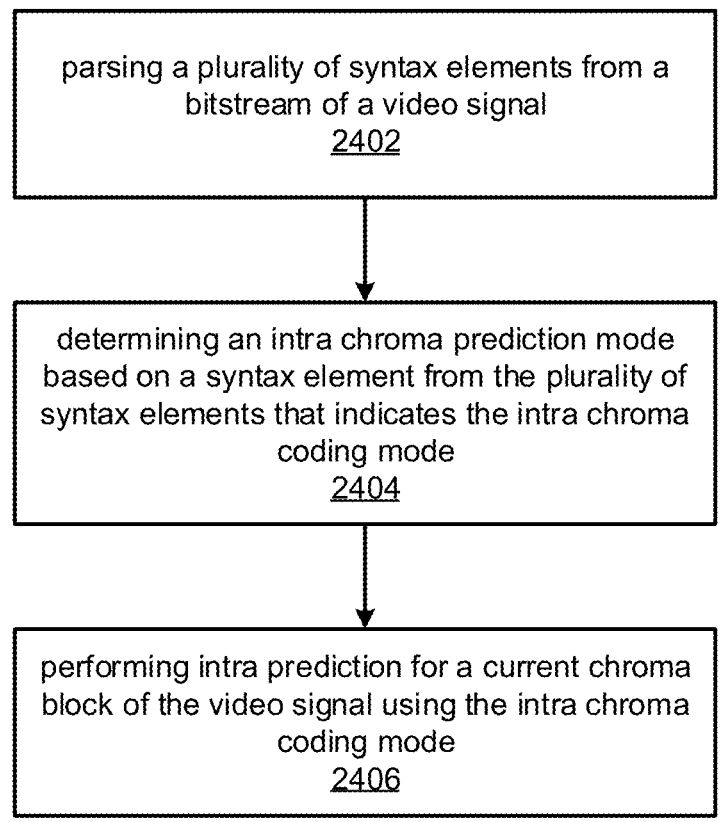
FIG. 24 is a flowchart of a method of decoding a chroma intra-coding mode in a bitstream for a video signal according to some aspects of the present disclosure.

FIG. 24 is a flowchart of a method of decoding a chroma intra-coding mode in a bitstream for a video signal according to some aspects of the present disclosure.

At block 2402, multiple syntax elements are parsed from a bitstream of a video signal. At block 2404, an intra chroma prediction mode is determined based on a syntax element from the multiple syntax elements that indicates the intra chroma prediction mode. In some examples, the intra chroma prediction mode is determined from multiple modes. For example, the multiple modes includes three sets: a first set of modes including at least one of a derived mode (DM) or a cross component linear model (CCLM) prediction mode, a second set of modes comprising at least one of a CCLM_L mode or a CCLM_T mode, or a third set of modes including at least one of a vertical mode, a horizontal mode, a DC mode or a Planar mode. Among these sets of intra chroma prediction mode, the number of bits of the syntax element if the intra chroma prediction mode is selected from the first set of modes is smaller than the number of bits of the syntax element if the intra chroma prediction mode is selected from the second set of modes. The number of bits of the syntax element if the intra chroma prediction mode is selected from the second set of modes is smaller than the number of bits of the syntax element if the intra chroma prediction mode is selected from the third set of modes.

At block 2406, intra prediction is performed for a current chroma block of the video signal based on the intra chroma prediction mode.

Figure 25:
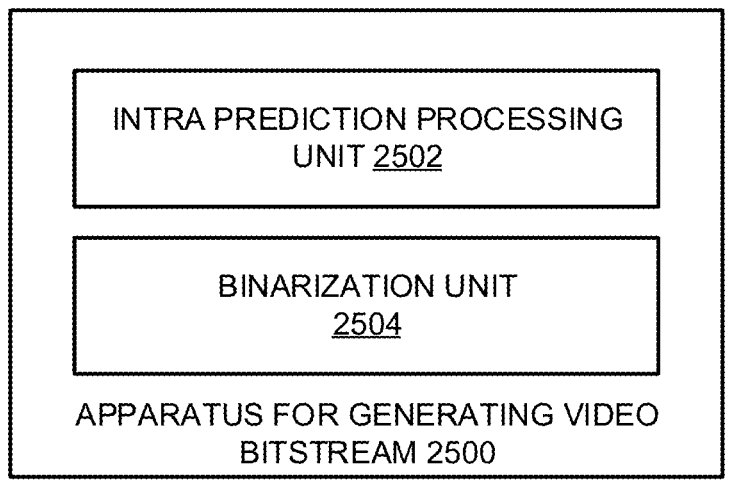
FIG. 25 is a block diagram showing an example structure of an apparatus for generating a video bitstream.

FIG. 25 is a block diagram showing an example structure of an apparatus 2500 for generating a video bitstream. The apparatus 2500 may include an intra prediction processing unit 2502 and a binarization unit 2504. In an example, the intra prediction processing unit 2502 may be corresponding to the intra prediction unit 254 in FIG. 2. In an example, the binarization unit 2504 may be corresponding to the entropy encoding unit 270 in FIG. 2.

The intra prediction processing unit 2502 is configured to perform intra prediction for a chroma block of the video signal based on an intra chroma prediction mode. The intra chroma prediction mode is selected from a first set of modes, a second set of modes, or a third set of modes. The first set of modes includes at least one of a derived mode (DM) or a cross component linear model (CCLM) prediction mode. The second set of modes includes at least one of a CCLM_L mode or a CCLM_T mode. The third set of modes includes at least one of a vertical mode, a horizontal mode, a DC mode or a Planar mode.

The binarization unit 2504 is configured to generate a bitstream for the video signal by including a syntax element indicating the intra chroma prediction mode. The number of bits of the syntax element if the intra chroma prediction mode is selected from the first set of modes is smaller than the number of bits of the syntax element if the intra chroma prediction mode is selected from the second set of modes, and the number of bits of the syntax element if the intra chroma prediction mode is selected from the second set of modes is smaller than the number of bits of the syntax element if the intra chroma prediction mode is selected from the third set of modes.

In one example, the syntax element for the DM mode is 0. The syntax element for the CCLM mode is 10. The syntax element for the CCLM_L mode is 1110. The syntax element for the CCLM_T mode is 1111. The syntax element for the Planar mode is 11000. The syntax element for the Vertical mode is 11001. The syntax element for the Horizontal mode is 11010. The syntax element for the DC mode is 11011.

In another example, the syntax element for the DM mode is 00. The syntax element for the CCLM mode is 10. The syntax element for the CCLM_L mode is 110. The syntax element for the CCLM_T mode is 111. The syntax element for the Planar mode is 0100. The syntax element for the Vertical mode is 0101. The syntax element for the Horizontal mode is 0110. The syntax element for the DC mode is 0111.

Figure 26:
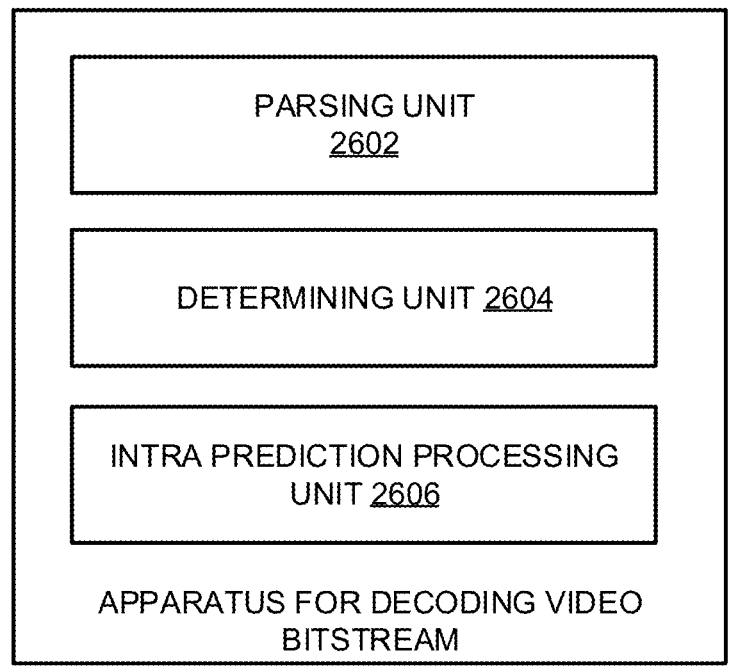
FIG. 26 is a block diagram showing an example structure of an apparatus for decoding a video bitstream.

FIG. 26 is a block diagram showing an example structure of an apparatus 2600 for decoding a video bitstream. The apparatus may include an parsing unit 2602, a determining unit 2604, and an intra prediction processing unit 2606. In an example, the parsing unit 2602 may be corresponding to the entropy encoding unit 304 in FIG. 3. In an example, the determining unit 2604 and the intra prediction processing unit 2606 may be corresponding to the intra prediction unit 354 in FIG. 3.

The parsing unit 2602 is configured to parse syntax elements from a bitstream of a video signal. The determining unit 2604 is configured to determine an intra chroma prediction mode based on the syntax element from the plurality of syntax elements. The intra chroma prediction mode is determined from one of a first set of modes, a second set of modes, or a third set of modes. The first set of modes includes at least one of a derived mode (DM) or a cross component linear model (CCLM) prediction mode. The second set of modes includes at least one of a CCLM_L mode or a CCLM_T mode. The third set of modes includes at least one of a vertical mode, a horizontal mode, a DC mode or a Planar mode.

The number of bits of the syntax element if the intra chroma prediction mode is selected from the first set of modes is smaller than the number of bits of the syntax element if the intra chroma prediction mode is selected from the second set of modes, and the number of bits of the syntax element if the intra chroma prediction mode is selected from the second set of modes is smaller than the number of bits of the syntax element if the intra chroma prediction mode is selected from the third set of modes.

In one example, the syntax element for the DM mode is 0. The syntax element for the CCLM mode is 10. The syntax element for the CCLM_L mode is 1110. The syntax element for the CCLM_T mode is 1111. The syntax element for the Planar mode is 11000. The syntax element for the Vertical mode is 11001. The syntax element for the Horizontal mode is 11010. The syntax element for the DC mode is 11011.

In another example, the syntax element for the DM mode is 00. The syntax element for the CCLM mode is 10. The syntax element for the CCLM_L mode is 110. The syntax element for the CCLM_T mode is 111. The syntax element for the Planar mode is 0100. The syntax element for the Vertical mode is 0101. The syntax element for the Horizontal mode is 0110. The syntax element for the DC mode is 0111.

The intra prediction processing unit 2606 is configured to perform intra prediction for a current chroma block of the video signal based on the intra chroma prediction mode.

The following references are incorporated by reference for better understanding the current disclosure: JCTVC-H0544, description for MDLM, JVET-G1001, description for CCLM or LM, section 2.2.4, and JVET-K0204, description for deriving the model coefficient using the max and min value.

Following is an explanation of the applications of the encoding method as well as the decoding method as shown in the above-mentioned embodiments, and a system using them.

Figure 27:
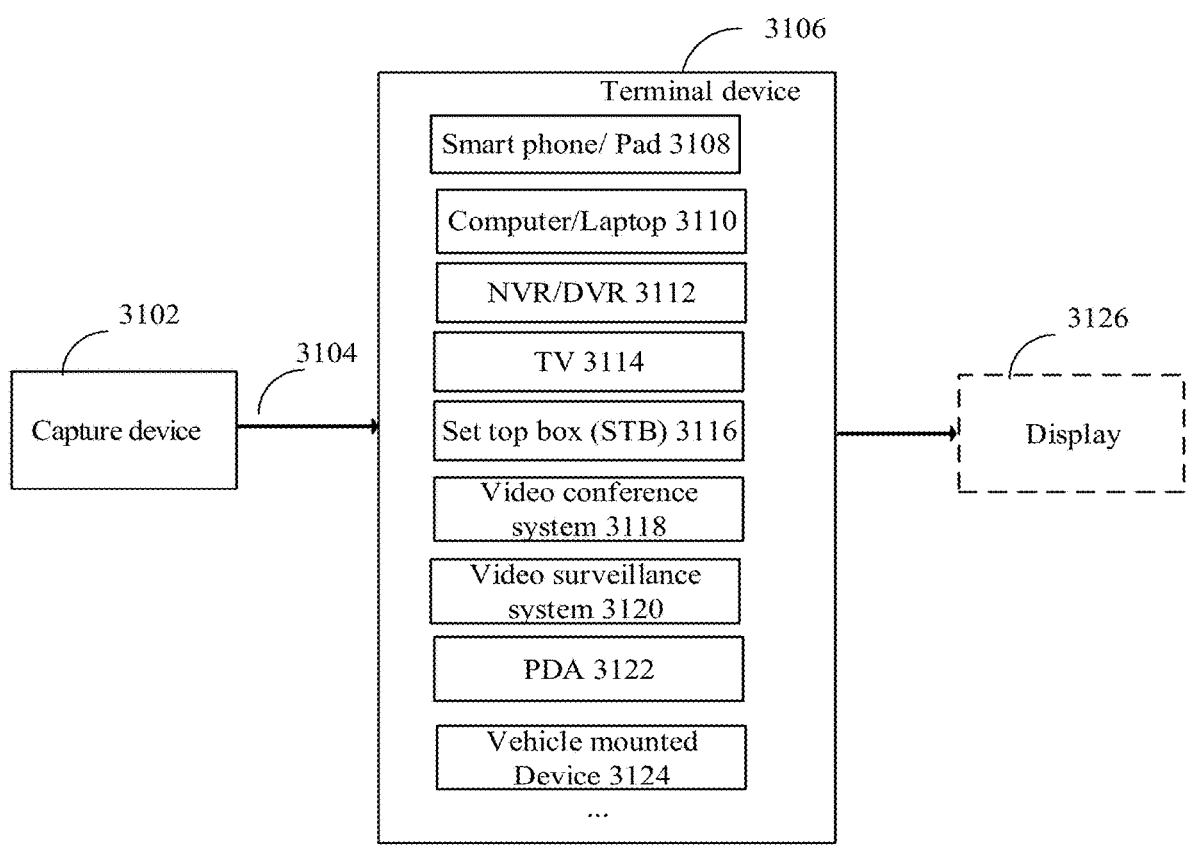
FIG. 27 is a block diagram showing an example structure of a content supply system which provides a content delivery service.

FIG. 27 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 28:
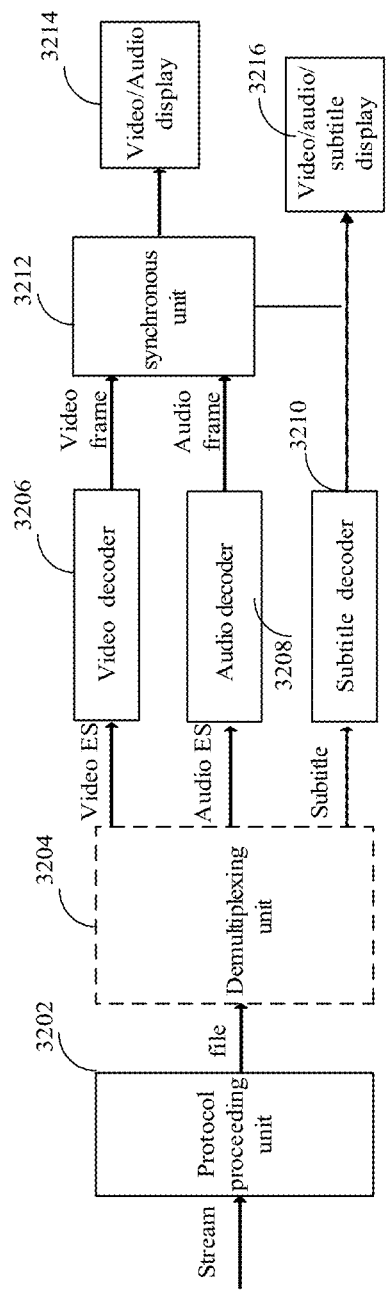
FIG. 28 is a block diagram showing a structure of an example of a terminal device.

FIG. 28 is a diagram showing a structure of an example of the terminal device 3106. After the terminal device 3106 receives stream from the capture device 3102, the protocol processing unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol processing unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 28) before feeding it to the synchronous unit 3212. Similarly, the audio frame may store in a buffer (not shown in FIG. 28) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method for encoding video data implemented by an encoding device, comprising:
    performing intra prediction for a current chroma block of the video data based on a chroma intra prediction mode, wherein the intra prediction for the current chroma block is performed by
        determining a luma block corresponding to the current chroma block of the video data;
        determining L available chroma reference samples of the current chroma block by checking availability of top neighboring chroma samples of the current chroma block, wherein L is a positive integer;
        obtaining luma reference samples of the luma block based on the determined L available chroma reference samples of the current chroma block, wherein the obtained luma reference samples of the luma block are down-sampled luma reference samples;
        calculating linear model coefficients based on the luma reference samples and chroma reference samples that correspond to the luma reference samples; and
        obtaining a prediction for the current chroma block based on the linear model coefficients and sample values of a down-sampled luma block of the luma block; and
    generating a bitstream for the video data by including a syntax element indicating the chroma intra prediction mode.

2. The method of claim 1, wherein the determining L available chroma reference samples comprises:
    determining that the L top neighboring chroma samples of the current chroma block are available by checking the availability of the top neighboring chroma samples within a top reference sample range, wherein $1<L<W2$ and W2 indicates the top reference sample range, and L and W2 are positive integers, and wherein the L top neighboring chroma samples are used as the available chroma reference samples.

3. The method of claim 2, wherein W2 equals to either 2*W or W+H, and wherein W represents a width of the current chroma block and H represents a height of the current chroma block.

4. The method of claim 1, wherein the luma reference samples are obtained
    by down-sampling only neighboring samples that are above the luma block and that are selected based on the determined L available chroma reference samples.

5. The method of claim 1, wherein the down-sampled luma block of the luma block is obtained by down-sampling a reconstructed luma block of the luma block that corresponds to the current chroma block.

6. The method of claim 4, wherein only one row of neighboring reconstructed luma samples of the reconstructed version of the luma block are used to obtain the luma reference samples when the luma reference samples are obtained based on only neighboring samples above the luma block and when a top row of the current chroma block is overlapped with a top row of a current coding tree unit (CTU).

7. The method of claim 1, wherein the calculating linear model coefficients based on the luma reference samples and the chroma reference samples that correspond to the luma reference samples, comprises:
   determining a maximum luma value and a minimum luma value based on the luma reference samples;
   obtaining a first chroma value based at least in part upon a position of a luma reference sample associated with the maximum luma value;
   obtaining a second chroma value based at least in part upon a position of a luma reference sample associated with the minimum luma value;
   calculating linear model coefficients based on the first chroma value, the second chroma value, the maximum luma value and the minimum luma value.

8. The method of claim 7, wherein the obtaining the first chroma value based at least in part upon a position of the luma reference sample associated with the maximum luma value comprises obtaining a first chroma value based at least in part upon one or more positions of one or more luma reference samples associated with the maximum luma value, and
   wherein the obtaining the second chroma value based at least in part upon the position of the luma reference sample associated with the minimum luma value comprises obtaining a second chroma value based at least in part upon one or more positions of one or more luma reference samples associated with the minimum luma value.

9. The method of claim 1, wherein the chroma intra prediction mode is a CCLM_T mode or a CCIP_T mode.

10. A method for decoding video data implemented by a decoding device, comprising:
    parsing from a bitstream a syntax element, wherein the syntax element indicates a chroma intra prediction mode; and
    performing intra prediction for a current chroma block of the video data based on the chroma intra prediction mode, wherein the intra prediction for the current chroma block is performed by:
       determining a luma block corresponding to the current chroma block;
       determining L available chroma reference samples of the current chroma block by checking availability of top neighboring chroma samples of the current chroma block, wherein L is a positive integer;
       obtaining luma reference samples of the luma block based on the determined L available chroma reference samples of the current chroma block, wherein the obtained luma reference samples of the luma block are down-sampled luma reference samples;
       calculating linear model coefficients based on the luma reference samples and chroma reference samples that correspond to the luma reference samples; and
       obtaining a prediction for the current chroma block based on the linear model coefficients and sample values of a down-sampled luma block of the luma block.

11. The method of claim 10, wherein the determining L available chroma reference samples comprises:
    determining that the L top neighboring chroma samples of the current chroma block are available by checking the availability of the top neighboring chroma samples within a top reference sample range, wherein $1<L<W2$ and W2 indicates the top reference sample range, and L and W2 are positive integers, and wherein the L top neighboring chroma samples are used as the available chroma reference samples.

12. The method of claim 11, wherein W2 equals to either $2*W$ or $W+H$, wherein W represents a width of the current chroma block and H represents a height of the current chroma block.

13. The method of claim 10, wherein the luma reference samples are obtained
    by down-sampling only neighboring samples that are above the luma block and that are selected based on the determined L available chroma reference samples.

14. The method of claim 10, wherein the down-sampled luma block of the luma block is obtained by down-sampling a reconstructed luma block of the luma block that corresponds to the current chroma block.

15. The method of claim 13, wherein only one row of neighboring reconstructed luma samples of the reconstructed version of the luma block are used to obtain the luma reference samples when the luma reference samples are obtained based on only neighboring samples above the luma block and when a top row of the current chroma block is overlapped with a top row of a current coding tree unit (CTU).

16. The method of claim 10, wherein the calculating linear model coefficients based on the luma reference samples and the chroma reference samples that correspond to the luma reference samples, comprises:
    determining a maximum luma value and a minimum luma value based on the luma reference samples;
    obtaining a first chroma value based at least in part upon a position of a luma reference sample associated with the maximum luma value;
    obtaining a second chroma value based at least in part upon a position of a luma reference sample associated with the minimum luma value;
    calculating linear model coefficients based on the first chroma value, the second chroma value, the maximum luma value and the minimum luma value.

17. The method of claim 16, wherein the obtaining a first chroma value based at least in part upon a position of a luma reference sample associated with the maximum luma value comprises obtaining a first chroma value based at least in part upon one or more positions of one or more luma reference samples associated with the maximum luma value, and
    wherein the obtaining a second chroma value based at least in part upon a position of a luma reference sample associated with the minimum luma value comprises obtaining a second chroma value based at least in part upon one or more positions of one or more luma reference samples associated with the minimum luma value.

18. The method of claim 10, wherein the chroma intra prediction mode is a CCLM_T mode or a CCIP_T mode.

19. An encoding device, comprising:
at least one processor; and
one or more memories coupled to the at least one processor and storing programming instructions for execution by the at least one processor to cause the encoding device to:
perform intra prediction for a current chroma block of the video data based on a chroma intra prediction mode, wherein the intra prediction for the current chroma block is performed by:
  determine a luma block corresponding to the current chroma block;
  determine L available chroma reference samples of the current chroma block by checking availability of top neighboring chroma samples of the current chroma block, wherein L is a positive integer;
  obtain luma reference samples of the luma block based on the determined L available chroma reference samples of the current chroma block, wherein the obtained luma reference samples of the luma block are down-sampled luma reference samples;
  calculate linear model coefficients based on the luma reference samples and chroma reference samples that correspond to the luma reference samples; and
  obtain a prediction for the current chroma block based on the linear model coefficients and sample values of a down-sampled luma block of the luma block; and
generating a bitstream for the video data by including a syntax element indicating the chroma intra prediction mode.

20. A decoding device, comprising:
at least one processor; and
one or more memories coupled to the at least one processor and storing programming instructions for execution by the at least one processor to cause the decoding device to
parse from a bitstream a syntax element, wherein the syntax element indicates a chroma intra prediction mode; and
perform intra prediction for a current chroma block of the video data based on the chroma intra prediction mode, wherein the intra prediction for the current chroma block is performed by:
  determine a luma block corresponding to the current chroma block;
  determine L available chroma reference samples of the current chroma block by checking availability of top neighboring chroma samples of the current chroma block, wherein L is a positive integer;
  obtain luma reference samples of the luma block based on the determined L available chroma reference samples of the current chroma block, wherein the obtained luma reference samples of the luma block are down-sampled luma reference samples;
  calculate linear model coefficients based on the luma reference samples and chroma reference samples that correspond to the luma reference samples; and
obtaining a prediction for the current chroma block based on the linear model coefficients and sample values of a down-sampled luma block of the luma block.

21. A non-transitory computer-readable medium carrying program instructions which, when executed by a computer device or a processor, cause the computer device or the processor to perform operations of:
parsing from a bitstream a syntax element, wherein the syntax element indicates a chroma intra prediction mode; and
performing intra prediction for a current chroma block of the video data based on the chroma intra prediction mode, wherein the intra prediction for the current chroma block is performed by
  determining a luma block corresponding to the current chroma block;
  determining L available chroma reference samples of the current chroma block by checking availability of top neighboring chroma samples of the current chroma block, wherein L is a positive integer;
  obtaining luma reference samples of the luma block based on the determined L available chroma reference samples of the current chroma block, wherein the obtained luma reference samples of the luma block are down-sampled luma reference samples;
  calculating linear model coefficients based on the luma reference samples and chroma reference samples that correspond to the luma reference samples; and
  obtaining a prediction for the current chroma block based on the linear model coefficients and sample values of a down-sampled luma block of the luma block.

22. A non-transitory computer-readable medium carrying program instructions which, when executed by a computer device or a processor, cause the computer device or the processor to perform the operations of:
performing intra prediction for a current chroma block of video data based on a chroma intra prediction mode, wherein the intra prediction for the current chroma block is performed by
  determining a luma block corresponding to the current chroma block;
  determining L available chroma reference samples of the current chroma block by checking availability of top neighboring chroma samples of the current chroma block, wherein L is a positive integer;
  obtaining luma reference samples of the luma block based on the determined L available chroma reference samples of the current chroma block, wherein the obtained luma reference samples of the luma block are down-sampled luma reference samples;
  calculating linear model coefficients based on the luma reference samples and chroma reference samples that correspond to the luma reference samples; and
  obtaining a prediction for the current chroma block based on the linear model coefficients and sample values of a down-sampled luma block of the luma block; and
generating a bitstream for the video data by including a syntax element indicating the chroma intra prediction mode.

* * * * *